US008577054B2

(12) United States Patent
Hiroe

(10) Patent No.: US 8,577,054 B2

(45) Date of Patent: Nov. 5, 2013

(54) SIGNAL PROCESSING APPARATUS, SIGNAL PROCESSING METHOD, AND PROGRAM

(75) Inventor: Atsuo Hiroe, Kanagawa (JP)

(73) Assignee: Sony Corporation (JP)

( * ) Notice: Subject to any disclaimer, the term of this patent is extended or adjusted under 35 U.S.C. 154(b) by 898 days.

(21) Appl. No.: 12/661,635

(22) Filed: Mar. 22, 2010

(65) Prior Publication Data

US 2010/0278357 A1 Nov. 4, 2010

(30) Foreign Application Priority Data

Mar. 30, 2009 (JP) ................................ P2009-081379

(51) Int. Cl.

*H04R 3/00* (2006.01)
*H04B 15/00* (2006.01)
*H04B 1/02* (2006.01)
*G01S 3/80* (2006.01)

(52) U.S. Cl.

USPC ............ 381/92; 381/94.3; 381/111; 367/119; 367/138

(58) Field of Classification Search

USPC ............ 381/26, 94.1, 94.2, 94.3, 92, 57, 313; 367/118, 119, 121, 123, 124, 125, 138; 700/94

See application file for complete search history.

(56) References Cited

U.S. PATENT DOCUMENTS

| | | | | |
|---|---|---|---|---|
| 6,002,776 | A * | 12/1999 | Bhadkamkar et al. | 381/66 |
| 7,039,546 | B2 | 5/2006 | Sawada et al. | |
| 7,788,066 | B2 * | 8/2010 | Taenzer et al. | 702/191 |
| 2006/0206315 | A1 | 9/2006 | Hiroe et al. | |
| 2009/0306973 | A1 * | 12/2009 | Hiekata et al. | 704/205 |

FOREIGN PATENT DOCUMENTS

| | | | |
|---|---|---|---|
| JP | 2005-049153 | A | 2/2005 |
| JP | 2006-154314 | A | 6/2006 |
| JP | 2006-238409 | A | 9/2006 |
| JP | 3881367 | B2 | 2/2007 |
| JP | 2007-295085 | A | 11/2007 |
| WO | WO-2004/079388 | A1 | 9/2004 |

OTHER PUBLICATIONS

Introducing Independent Component Analysis ( by Noboru Murata, Tokyo Denki University Press).

"Independent Component Analysis" (Aapo Hyvarinenn, et al. 2001, John Wiley & Sons, Inc.), 19.2: Blind Separation of Convolutive Mixtures, 19.2.4: Fourier Transform Methods).

(Continued)

*Primary Examiner* — Curtis Kuntz
*Assistant Examiner* — Daniel Sellers
(74) *Attorney, Agent, or Firm* — Lerner, David, Littenberg, Krumholz & Mentlik, LLP

(57) ABSTRACT

A signal processing apparatus includes a source separation module for producing respective separation signals corresponding to a plurality of sound sources by applying an ICA (Independent Component Analysis) to observation signals produced based on mixture signals from the sound sources, which are taken by source separation microphones, to thereby execute a separation process of the mixture signals, and a signal projection-back module for receiving observation signals of projection-back target microphones and the separation signals produced by the source separation module, and for producing projection-back signals as respective separation signals corresponding to the sound sources, which are taken by the projection-back target microphones. The signal projection-back module produces the projection-back signals by receiving the observation signals of the projection-back target microphones which differ from the source separation microphones.

12 Claims, 24 Drawing Sheets

(56) References Cited

OTHER PUBLICATIONS

Noburo Murata and Shiro Ikeda, "An On-line Algorithm for Blind Source Separation on Speech Signals." In Prosedings of 1998 International Symposium on Nonlinear Theory and its Applications (NOLTA '98), pp. 923-926, Crans-Montana, Switzerland 1998 (http://www.ism.ac.jp/shiro/papers/sonferences/nolta1998.pdf].

Murata: "An Approach to Blind Source Separation Based on Temporal Structure of Speech Signals", Neurocomputing, pp. 1.24 (32 pages), 2001. http://citeseerx.ist.psu.edu/viewdoc/download-?doi=10.1.1.43.8460&rep=rep1&type=pdf.

* cited by examiner

SIGNAL PROCESSING APPARATUS, SIGNAL PROCESSING METHOD, AND PROGRAM

CROSS-REFERENCE TO RELATED APPLICATION

The present application claims priority from Japanese Patent Application No. JP 2009-081379 filed in the Japanese Patent Office on Mar. 30, 2009, the entire content of which is incorporated herein by reference.

BACKGROUND OF THE INVENTION

1. Field of the Invention

The present invention relates to a signal processing apparatus, a signal processing method, and a program. More particularly, the present invention relates to a signal processing apparatus, a signal processing method, and a program for separating a mixture signal of plural sounds per (sound) source by an ICA (Independent Component Analysis), and for performing an analysis of sound signals at an arbitrary position by using separation signals, i.e., separation results, such as an analysis of sound signals to be collected by each of microphones installed at respective arbitrary positions (i.e., projection-back to individual microphones).

2. Description of the Related Art

There is an ICA (Independent Component Analysis) as a technique for separating individual source signals which are included in a mixture signal of plural sounds. The ICA is one type of multi-variate analysis, and it is a method for separating multi-dimensional signals based on statistical properties of signals. See, e.g., "NYUMON DOKURITSU SEIBUN BUNSEKI (Introduction—Independent Component Analysis)" (Noboru Murata, Tokyo Denki University Press) for details of the ICA per se.

The present invention relates to a technique for separating a mixture signal of plural sounds per (sound) source by the ICA (Independent Component Analysis), and for performing, e.g., projection-back to individual microphones installed at respective arbitrary positions by using separation signals, i.e., separation results. Such a technique can realize, for example, the following processes.

(1) The ICA is performed based on sounds collected by directional microphones, and separation signals obtained as the results of separating the collected sounds are projected back to omnidirectional microphones.

(2) The ICA is performed based on sounds collected by microphones which are arranged to be adapted for source separation, and separation signals obtained as the results of separating the collected sounds are projected back to microphones which are arranged to be adapted for DOA (Direction of Arrival) estimation or source position estimation.

The ICA for sound signals, in particular, the ICA in the time-frequency domain, will be described with reference to FIG. 1.

Assume a situation where, as illustrated in FIG. 1, a number N of sound sources are active to generate different sounds and a number n of microphones are used to observe those sounds. There are time delays and reflections until the sounds (source signals) generated from the sound sources arrive the microphones. Accordingly, a signal (observation signal) observed by a microphone j can be expressed as the following formula [1.1] by totalizing convolutions of the source signals and a transfer function for all the sound sources. Such mixtures are called "convolutive mixtures" hereinafter.

Also, observation signals of all the microphones can be expressed by the following single formula [1.2].

$$x_k(t) = \sum_{j=1}^{N}\sum_{l=0}^{L} a_{kj}(l)s_j(t-l) = \sum_{j=1}^{N}\{a_{kj} * s_j\} \quad [1.1]$$

$$x(t) = A^{[0]}s(t) + \ldots + A^{[L]}s(t-L) \quad [1.2]$$

where, \

$$s(t) = \begin{bmatrix} s_1(t) \\ \vdots \\ s_N(t) \end{bmatrix}, x(t) = \begin{bmatrix} x_1(t) \\ \vdots \\ x_n(t) \end{bmatrix}, A^{[l]} = \begin{bmatrix} a_{11}(l) & \ldots & a_{1N}(l) \\ \vdots & \ddots & \vdots \\ a_{n1}(l) & \ldots & a_{nN}(l) \end{bmatrix} \quad [1.3]$$

In the above formulae, x(t) and s(t) are column vectors having elements xk(t) and sk(t), respectively, and A[1] is an (n×N) matrix having elements akj(l). Note that n=N is assumed in the following description.

It is known that the convolution mixtures in the time domain can be expressed as instantaneous mixtures in the time-frequency domain. The ICA in the time-frequency domain utilizes such a feature.

Regarding the time-frequency domain ICA per se, see "19.2.4. Fourier Transform Method in 'Detailed Explanation: Independent Component Analysis'", Japanese Unexamined Patent Application Publication No. 2006-238409, "APPARATUS AND METHOD FOR SEPARATING AUDIO SIGNALS", etc.

The following description is made primarily about points related to embodiments of the present invention.

By subjecting both sides of the formula [1.2] to the short-time Fourier transform, the following formula [2.1] is obtained.

$$X(\omega, t) = A(\omega)S(\omega, t) \quad [2.1]$$

$$X(\omega, t) = \begin{bmatrix} X_1(\omega, t) \\ \vdots \\ X_n(\omega, t) \end{bmatrix} \quad [2.2]$$

$$A(\omega) = \begin{bmatrix} A_{11}(\omega) & \ldots & A_{1N}(\omega) \\ \vdots & \ddots & \vdots \\ A_{n1}(\omega) & \ldots & A_{nN}(\omega) \end{bmatrix} \quad [2.3]$$

$$S(\omega, t) = \begin{bmatrix} S_1(\omega, t) \\ \vdots \\ S_N(\omega, t) \end{bmatrix} \quad [2.4]$$

$$Y(\omega, t) = W(\omega)X(\omega, t) \quad [2.5]$$

$$Y(\omega, t) = \begin{bmatrix} Y_1(\omega, t) \\ \vdots \\ Y_n(\omega, t) \end{bmatrix} \quad [2.6]$$

$$W(\omega) = \begin{bmatrix} W_{11}(\omega) & \ldots & W_{1n}(\omega) \\ \vdots & \ddots & \vdots \\ W_{n1}(\omega) & \ldots & W_{nn}(\omega) \end{bmatrix} \quad [2.7]$$

In the above formula [2.1],

ω is index of frequency bin (ω=1 to M, M is a total number of frequency bins), and t is index of frame (t=1 to T, T is a total number of frames).

If ω is assumed to be fixed, the formula [2.1] can be regarded as representing instantaneous mixtures (i.e., mixtures without time delays). To separate the observation signal, therefore, a formula [2.5] for calculating separation signals [Y], i.e., separation results, is prepared and a separation matrix W(ω) is determined such that individual components of the separation results Y(ω,t) are most independent of one another.

The time-frequency domain ICA according to the related art has accompanied with the problem called "permutation problem", i.e., the problem that it is not consistent among bins which component is separated into which channel. However, the permutation problem has been substantially solved by the approach disclosed in Japanese Unexamined Patent Application Publication No. 2006-238409, "APPARATUS AND METHOD FOR SEPARATING AUDIO SIGNALS", which is a patent application made by the same inventor as in this application. Because the related-art approach is also used in embodiments of the present invention, the approach for solving the permutation problem, discloses in Japanese Unexamined Patent Application Publication No. 2006-238409, will be briefly described below.

In Japanese Unexamined Patent Application Publication No. 2006-238409, calculations of the following formulae [3.1] to [3.3] are iteratively executed until the separation matrix W(ω) is converged (or a predetermined number of times), for the purpose of obtaining the separation matrix W(ω):

$$Y(\omega, t) = W(\omega)X(\omega, t) \quad (t = 1, \ldots, T \quad \omega = 1, \ldots, M) \qquad [3.1]$$

$$\Delta W(\omega) = \{I + \langle \varphi_\omega(Y(t))Y(\omega, t)^H \rangle_t\}W(\omega) \qquad [3.2]$$

$$W(\omega) \leftarrow W(\omega) + \eta \Delta W(\omega) \qquad [3.3]$$

$$Y(t) = \begin{bmatrix} Y_1(1, t) \\ \vdots \\ Y_1(M, t) \\ \hline \vdots \\ \hline Y_n(1, t) \\ \vdots \\ Y_n(M, t) \end{bmatrix} = \begin{bmatrix} Y_1(t) \\ \vdots \\ Y_n(t) \end{bmatrix} \qquad [3.4]$$

$$\varphi_\omega(Y(t)) = \begin{bmatrix} \varphi_\omega(Y_1(t)) \\ \vdots \\ \varphi_\omega(Y_n(t)) \end{bmatrix} \qquad [3.5]$$

$$\varphi_\omega(Y_k(t)) = \frac{\partial}{\partial Y_k(\omega, t)} \log P(Y_k(t)) \qquad [3.6]$$

$P(Y_k(t))$: probability density function ($PDF$) of $Y_k(t)$ $$P(Y_k(t)) \propto \exp(-\gamma \|Y_k(t)\|_2) \qquad [3.7]$$

$$\|Y_k(t)\|_m = \left\{ \sum_{\omega=1}^{M} |Y_k(\omega, t)|^m \right\}^{1/m} \qquad [3.8]$$

$$\varphi_\omega(Y_k(t)) = -\gamma \frac{Y_k(\omega, t)}{\|Y_k(t)\|_2} \qquad [3.9]$$

$$W = \left[\begin{array}{cc|c|cc} W_{11}(1) & 0 & & W_{1n}(1) & 0 \\ & \ddots & \cdots & & \ddots \\ 0 & W_{11}(M) & & 0 & W_{1n}(M) \\ \hline & \vdots & \ddots & & \vdots \\ \hline W_{n1}(1) & 0 & & W_{nn}(1) & 0 \\ & \ddots & \cdots & & \ddots \\ 0 & W_{n1}(M) & & 0 & W_{nn}(M) \end{array}\right] \qquad [3.10]$$

-continued $$X(t) = \begin{bmatrix} X_1(1, t) \\ \vdots \\ X_1(M, t) \\ \hline \vdots \\ \hline X_n(1, t) \\ \vdots \\ X_n(M, t) \end{bmatrix} \qquad [3.11]$$

$$Y(t) = WX(t) \qquad [3.12]$$

Those iterated executions are referred to as "learning" hereinafter. Note that the calculations of the following formulae [3.1] to [3.3] are executed for all the frequency bins and the calculation of the formula [3.1] is executed for all frames of the accumulated observation signals. In the formula [3.2], t represents a frame number and $\langle \rangle_t$ represents a mean over frames within a certain zone. H attached to an upper right corner of Y(ω,t) represents a Hermitian transpose. The Hermitian transpose implies a process of taking a transpose of a vector or a matrix and converting an element to a conjugate complex number.

The separation signals Y(t), i.e., the separation results, are expressed by a formula [3.4] and are represented in the form of a vector including elements of all channels and all frequency bins for the separation results. Also, $\phi_\omega(Y(t))$ is a vector expressed by a formula [3.5]. Each element $\phi_\omega(Y_k(t))$ of that vector is called a score function which is a logarithmic differential (formula [3.6]) of a multi-dimensional (multivariate) probability density function (PDF) of $Y_k(t)$. For example, a function expressed by a formula [3.7] can be used as the multi-dimensional PDF. In that case, the score function $\phi_\omega(Y_k(t))$ can be expressed by a formula [3.9]. In the formula [3.9], $\|Y_k(t)\|_2$ represents an L-2 norm of the vector $Y_k(t)$ (i.e., a square-root of the square sum of all the elements). An L-m norm of $Y_k(t)$, i.e., the generalized expression of the L-2 norm, is defined as a formula [3.8]. Also, γ in the formulae [3.7] and [3.9] is a term for adjusting a scale of $Y_k(\omega,t)$, and a proper positive constant, e.g., sqrt(M) (square root of the number of frequency bins), is assigned to γ. Further, η in the formula [3.3] is called a learning rate or a learning coefficient and is a small positive value (e.g., about 0.1). The learning rate is used to reflect ΔW(ω), which is calculated based on the formula [3.2], upon the separation matrix W(ω) a little by a little.

Although the formula [3.1] represents separation for one frequency bin (see FIG. 2A), separation for all the frequency bins can be expressed by one formula (see FIG. 2B).

To that end, the separation results Y(t) for all the frequency bins, which are expressed by the formula [3.4], observation signals X(t) expressed by a formula [3.11], and a separation matrix W for all the frequency bins, which is expressed by a formula [3.10], are used. Thus, by using those vectors and matrix, the separation can be expressed by a formula [3.12]. In the explanation of embodiments of the present invention, the formulae [3.1] and [3.11] are selectively used as appropriate.

Representations denoted by $X_1$ to $X_n$ and $Y_1$ to $Y_n$ in FIGS. 2A and 2B are called spectrograms in each of which the results of the short-time Fourier transform (STFT) are arranged in a direction of the frequency bin and in a direction of the frame. The vertical direction indicates the frequency bin, and the horizontal direction indicates the frame. In the formulae [3.4] and [3.11], lower frequencies are put on the upper side. Conversely, in the spectrograms, lower frequencies are put on the lower side.

The time-frequency domain ICA further has the problem called "scaling problem". Namely, because scales (amplitudes) of the separation results differ from one another in individual frequency bins, balance among frequencies differs from that of source signals when re-converted to waveforms, unless the scale differences are properly adjusted. "Projection back to microphones", described below, has been proposed to solve the problem of "scaling".

[Projection Back to Microphones]

Projecting the separation results of the ICA back to microphones means determining respective components attributable to individual source signals from the collected sound signals, through analyzing sound signals collected by the microphones each set at a certain position. The respective components attributable to the individual source signals are equal to respective signals observed by the microphones when only one sound source is active.

For example, it is assumed that one separation signal $Y_k$ obtained as the signal separation result corresponds to a sound source 1 illustrated in FIG. 1. In that case, projecting the separation signal $Y_1$ back to the microphones 1 to n is equivalent to estimating signals observed by the individual microphones when only the sound source 1 is active. The signals after the projection-back include influences of, e.g., phase delays, attenuations, and reverberations (echoes) upon the source signals and hence differ from one another per microphone as a projection-back target.

In a configuration where a plurality of microphones 1 to n are set as illustrated in FIG. 1, there are plural (n) projection-back targets for one separation result. Such a signal providing a plurality of outputs for one input is called the SIMO (Single Input, Multiple Outputs) type. In the setting illustrated in FIG. 1, for example, because a number N of separation results exist corresponding to the number N of sources, there are (N×n) signals in total after the projection-back. However, when solution of the scaling problem is just intended, it is sufficient to project the separation results back to any one microphone or to project $Y_1$ to $Y_n$ back to the microphones 1 to n, respectively.

By projecting the separation results back to the microphone(s) as described above, signals having similar frequency scales to those of the source signals can be obtained. Adjusting the scales of the separation results in such a manner is called "rescaling".

SIMO-type signals are also used in other applications than the rescaling. For example, Japanese Unexamined Patent Application Publication No. 2006-154314 discloses a technique for obtaining separation results with a sense of sound localization by separating signals, which are observed by each of two microphones, into two SIMO signals (two stereoscopic signals). Japanese Unexamined Patent Application Publication No. 2006-154314 further discloses a technique for enabling separation results to follow changes of sound sources at a shorter frequency than the update interval of a separation matrix in the ICA by applying another type of source separation, i.e., a binary mask, to the separation results provided as the stereo signals.

Methods for producing the SIMO-type separation results and projection-back results will be described below. With one method, the algorithm of the ICA is itself modified so as to directly produce the SIMO-type separation results. Such a method is called "SIMO ICA". Japanese Unexamined Patent Application Publication No. 2006-154314 discloses that type of process.

With another method, after obtaining the ordinary separation results $Y_1$ to $Y_n$, the results of projection-back to the individual microphones are determined by multiplying proper coefficients. Such a method is called "Projection-back SIMO". In the following, the latter Projection-back SIMO more closely related to embodiments of the present invention will be described.

See the following references, for example, regarding general explanations of the Projection-back SIMO:

Noboru Murata and Shiro Ikeda, "An on-line algorithm for blind source separation on speech signals." In Proceedings of 1998 International Symposium on Nonlinear Theory and it's Applications (NOLTA'98), pp. 923-926, Crans-Montana, Switzerland, September 1998 (http://www.ism.ac.jp/~shiro/papers/conferences/nolta1988.pdf), and Murata et al.: "An approach to blind source separation based on temporal structure of speech signals", Neurocomputing, pp. 1.24, 2001. (http://citeseerx.ist.psu.edu/viewdoc/download?doi=10.1.1.43.8460&rep=rep1&type=pdf).

The Projection-back SIMO more closely related to embodiments of the present invention is described below.

The result of projecting a separation result $Y_k(\omega,t)$ back to a microphone i is written as $Y_k^{[i]}(\omega,t)$. A vector made up of $Y_k^{[1]}(\omega, t)$ to $Y_k^{[n]}(\omega, t)$ which are the results of projecting the separation result $Y_k(\omega,t)$ back to the microphones 1 to n, can be expressed by the following formula [4.1]. The second term of the right hand side of the formula [4.1] is a vector that is produced by setting other elements of $Y(\omega,t)$ expressed by the formula [2.6] than the k-th element to 0, and it represents the situation that only a sound source corresponding to $Y_k(\omega,t)$ is active. An inverse matrix of the separation matrix represents a spatial transfer function. Consequently, the formula [4.1] corresponds to a formula for obtaining signals observed by the individual microphones under the situation that only the sound source corresponding to $Y_k(\omega,t)$ is active.

$$\begin{bmatrix} Y_k^{[1]}(\omega,t) \\ \vdots \\ Y_k^{[n]}(\omega,t) \end{bmatrix} = W(\omega)^{-1} \begin{bmatrix} 0 \\ Y_k(\omega,t) \\ 0 \end{bmatrix} \quad [4.1]$$

$$= \mathrm{diag}(B_{k1}(\omega), \ldots , B_{kn}(\omega))Y_k(\omega,t) \quad [4.2]$$

$$W(\omega)^{-1} = B(\omega) = \begin{bmatrix} B_{11}(\omega) & \ldots & B_{1n}(\omega) \\ \vdots & \ddots & \vdots \\ B_{n1}(\omega) & \ldots & B_{nn}(\omega) \end{bmatrix} \quad [4.3]$$

$$\begin{bmatrix} Y_1^{[k]}(\omega,t) \\ \vdots \\ Y_n^{[k]}(\omega,t) \end{bmatrix} = \mathrm{diag}(B_{1k}(\omega), \ldots , B_{nk}(\omega))Y(\omega,t) \quad [4.4]$$

$$= \begin{bmatrix} B_{1k}(\omega) \\ \vdots \\ B_{nk}(\omega) \end{bmatrix} Y_k(\omega,t) \quad [4.2]$$

$$\begin{bmatrix} Y_1^{[k]}(\omega,t) \\ \vdots \\ Y_n^{[k]}(\omega,t) \end{bmatrix} = \mathrm{diag}(B_{k1}(\omega), \ldots , B_{kn}(\omega)) \quad [4.4]$$

The formula [4.1] can be rewritten to a formula [4.2]. In the formula [4.2], $B_{ik}(\omega)$ represents each element of $B(\omega)$ that is an inverse matrix of the separation matrix $W(\omega)$ (see a formula [4.3]).

Also, diag(•) represents a diagonal matrix having elements in the parenthesis as diagonal elements.

On the other hand, a formula expressing the projection-back of the separation results $Y_1(\omega,t)$ to $Y_n(\omega,t)$ to a microphone k is given by a formula [4.4]. Thus, the projection-back can be performed by multiplying the vector $Y(\omega,t)$ representing the separation results by a coefficient matrix $diag(B_{k1}(\omega), \ldots, B_{kn}(\omega))$ for the projection-back.

[Problems in Related-Art]

However, the above-described projection-back process in accordance with the formulae [4.1] to [4.4] is the projection-back to the microphones used in the ICA and is not adaptable for the projection-back to microphones not used in the ICA. Accordingly, there is a possibility that problems may occur when the microphones used in the ICA and the arrangement thereof are not optimum for other processes. The following two points will be discussed below as examples of the problems.

(1) Use of directional microphones (2).Combined use with DOA (Direction of Arrival) estimation and source position estimation (1) Use of Directional Microphones The reason why a plurality of microphones are used in the ICA resides in obtaining a plurality of observation signals in which a plurality of sound sources are mixed with one another at different degrees. At that time, the larger difference in the mixing degrees among the microphones, the more convenient for the separation and the learning. In other words, the larger difference in the mixing degrees among the microphones is more effective not only in increasing a ratio of an objective signal to interference sounds that remain in the separation results without being erased (i.e., Signal-to-Interference Ratio: SIR), but also in converging a learning process to obtain the separation matrix in a smaller number of times.

A method using directional microphones has been proposed to obtain the observation signals having the larger difference in the mixing degrees. See, e.g., Japanese Unexamined Patent Application Publication No. 2007-295085. More specifically, the proposed method is intended to make the mixing degrees differ from one another by using microphones each having high (or low) sensitivity in a particular direction.

However, a problem arises when the ICA is performed on signals observed by directional microphones and the separation results are projected back to the directional microphones. In other words, because directivity of each directional microphone differs depending on frequency, there is a possibility that sounds of the separation results may be distorted (or may have frequency balance differing from that of the source signals). Such a problem will be described below with reference to FIG. 3.

FIG. 3 illustrates an exemplary configuration of a simple directional microphone 300. The directional microphone 300 includes two sound collection devices 301 and 302 which are arranged at a device interval d between them. One of signal streams observed by the sound collection devices, e.g., a stream observed by the sound collection device 302 in the illustrated example, is caused to pass through a delay processing module 303 for generating a predetermined delay (D) and a mixing gain control module 304 for applying a predetermined gain (a) to the passing signal. The delayed signals and the signals observed by the sound collection device 301 are mixed with each other in an adder 305, whereby an output signal 306 can be generated which has sensitivity differing depending on direction. With such a configuration, for example, the directional microphone 300 realizes the so-called directivity, i.e., sensitivity increased in a particular direction.

By setting the delay $D=d/C$ (C is the sound velocity) and the mixing gain $a=-1$ in the configuration of the directional microphone 300 illustrated in FIG. 3, a directivity is formed so as to cancel sounds coming from the right side of the directional microphone 300 and to intensify sounds coming from the left side thereof. FIG. 4 illustrates the results of plotting the directivity (i.e., the relationship between an incoming direction and an output gain) for each of four frequencies (100 Hz, 1000 Hz, 3000 Hz, and 6000 Hz) on condition of d=0.04 [m] and C=340 [m/s]. In FIG. 4, a scale is adjusted per frequency such that output gains for sounds coming from the left side are all just 1. Also, it is assumed that sound collection devices 401 and 402 illustrated in FIG. 4 are respectively the same as the sound collection devices 301 and 302 illustrated in FIG. 3.

As illustrated in FIG. 4, the output gains are all just 1 for sounds (sounds A) incoming from the left side (front side of the directional microphone) as viewed in the direction in which the two sound collection devices 401 and 402 are arrayed at the interval, while the output gains are all just 0 for sounds (sounds B) incoming from the right side (rear side of the directional microphone) as viewed in the direction in which the two sound collection devices 401 and 402 are arrayed at the interval. In the other directions, however, the output gains differ with changes of frequency.

Further, when the sound wavelength corresponds to frequency is shorter than double of the device interval (d) (i.e., at frequency of 4250 [Hz] or higher on condition of d=0.04 [m] and C=340 [m/s]), a phenomenon called "spatial aliasing" occurs. Therefore, a direction in which sensitivity is low is additionally formed other than the right side. Looking at a plot of the directivity at 6000 Hz in FIG. 4, for example, the output gain also becomes 0 for a sound incoming from an oblique direction, such as denoted by "SOUNDS C", for example. Thus, an observation region where a sound of a particular frequency is not detected is generated in addition to the particular direction.

The presence of a null beam in the rightward direction in FIG. 4 causes the following problem. In the case of obtaining the observation signals by using a plurality of directional microphones each illustrated in FIG. 3 (namely, two sound collection devices being regarded as one microphone), separating the observation signals with the ICA, and projecting the separation results back to the directional microphones, the projection-back results become substantially null for the separation result corresponding to the sound source (sounds B) present on the right side of the directional microphone.

Further, a large difference in gain in the direction of the sounds C depending on frequency causes the following problem. When the separation result corresponding to the sounds C is projected back to the directional microphone illustrated in FIG. 4, signals are produced such that a component of 300 Hz is intensified in comparison with components of 100 Hz and 1000 Hz, while a component of 6000 Hz is suppressed.

With the method described in Japanese Unexamined Patent Application Publication No. 2007-295085, the problem of distortion in frequency components is avoided by radially arranging microphones each having directivity in the forward direction, and by previously selecting one of the microphones, which is oriented closest to the direction toward each sound source. In order to simultaneously minimize the influence of the distortion and obtain the observation signals differing in the mixing degree to a large extent, however, microphones each having a sharp directivity in the forward direction are to be installed in directions as many as possible.

(2) Combined Use with DOA (Direction of Arrival) Estimation and Source Position Estimation The DOA (Direction of Arrival) estimation is to estimate from which direction sounds arrive at each microphone. Also, specifying the positions of each sound source in addition to the DOA is called "source position estimation". The DOA estimation and the source position estimation are common to the ICA in terms of using a plurality of microphones. However, the microphone arrangement optimum for those estimations is not equal to that optimum for the ICA in all cases. For that reason, a contradictory dilemma may occur in the microphone arrangement in a system aiming to perform both the source separation and the DOA estimation (or the source position estimation).

The following description is made about methods for executing the DOA estimation and the source position estimation and then about the problem occurred when those estimations are combined with the ICA.

A method of estimating the DOA after projecting the separation result of the ICA back to individual microphones will be described with reference to FIG. 5. This method is the same as a method described in Japanese Patent No. 3881367.

Consider an environment in which two microphones 502 and 503 are installed at an interval (distance) d between them. It is assumed that a separation result $Y_k(\omega,t)$ 501, illustrated in FIG. 5, represents the separation result for one sound source, which has been obtained by executing a separation process on mixture signals from a plurality of sound sources. The results of projecting the separation result $Y_k(\omega,t)$ 501 back to the microphone i (denoted by 502) and the microphone i' (denoted by 503) illustrated in FIG. 5 are assumed to be $Y_k^{[i]}(\omega,t)$ and $Y_k^{[i']}(\omega,t)$, respectively. When the distance between the sound source and each microphone is much larger than the distance $d_{ii'}$ between the microphones, sound waves can be regarded as being approximate to plane waves, the difference between the distance from the sound source $Y_k(\omega,t)$ to the microphone i and the distance from the same source to the microphone i' can be expressed by $d_{ii'} \cos\theta_{kii'}$. That distance difference provides a path difference 505 illustrated in FIG. 5. Note that $\theta_{kii'}$ represents the DOA, namely it is an angle 504 formed by a segment interconnecting both the microphones and a segment extending from the sound source to a midpoint between the two microphones.

The DOA $\theta_{kii'}$ can be determined by obtaining the phase difference between Yk[i](ω,t) and Yk[i'](ω,t) which are the projection-back results. The relationship between Yk[i](ω,t) and Yk[i'](ω,t), i.e., the projection-back results, is expressed by the following formula [5.1]. Formulae for calculating the phase difference are expressed by the following formulae [5.2] and [5.3].

$$Y_k^{[i']}(\ ,t) \exp\left(-j\pi\frac{\omega-1}{M-1}\frac{d_{ii'}\cos\theta_{kii'}}{C}F\right)Y_k^{[i]}(\ ,t) \quad [5.1]$$

$t$: frame number $\omega$: frequency bin index $M$: total number of frequency bins $f$: imaginary unit $$\mathrm{angle}\left(\frac{Y_k^{[i]}(\ ,t)}{Y_k^{[i']}(\ ,t)}\right) = \mathrm{angle}\left(Y_k^{[i]}(\ ,t)\overline{Y_k^{[i']}(\ ,t)}\right) = \pi\frac{\omega-1}{M-1}\frac{d_{ii'}\cos\theta_{kii'}}{C}F \quad [5.2]$$

-continued $$\theta_{kii'}(\omega) = \mathrm{acos}\left(\frac{(M-1)C}{\pi(\omega-1)d_{ii'}F}\mathrm{angle}\left(Y_k^{[i]}(\ ,t)\overline{Y_k^{[i']}(\ ,t)}\right)\right) \quad [5.3]$$

$$= \mathrm{acos}\left(\frac{(M-1)C}{\pi(\omega-1)d_{ii'}F}\mathrm{angle}(B_{ik}(\ )\overline{B_{i'k}(\ )})\right) \quad [5.4]$$

In the above formulae;

angle( ) represents a phase of a complex number, and a cos( ) represents an inverse function of cos( )

As long as the projection-back is performed by using the above-described formula [4.1], the phase difference is given by a value not depending on the frame number t, but depending on only the separation matrix W(ω). Therefore, the formula for calculating the phase difference can be expressed by a formula [5.4].

On the other hand, Japanese Patent Application No. 2008-153483, which has been previously filed by the same applicant as in this application, describes a method of calculating the DOA without using an inverse matrix. A covariance matrix Σxy(ω) between the observation signals X(ω,t) and the separation results Y(ω,t) has properties analogous to those of the inverse of the separation matrix, i.e., W(ω)−1, in terms of calculating the DOA. Accordingly, by calculating the covariance matrix Σxy(ω) as expressed in the following formula [6.1] or [6.2], the DOA θkii' can be calculated based on the following formula [6.4]. In the formula [6.4], σik(ω) represents each component of Σxy(ω) as seen from a formula [6.3]. By using the formula [6.4], calculations of the inverse matrix are no longer necessary. Further, in a system running in real time, the DOA can be updated at a shorter interval (frame by frame at minimum) than in the case using the separation matrix based on the ICA.

$$\sum_{XY}(\omega) = \langle X(\omega,t)Y(\omega,t)^H\rangle_t \quad [6.1]$$

$$= \langle X(\omega,t)X(\omega,t)^H\rangle_t W(\ ,t)^H \quad [6.2]$$

$$\sum_{XY}(\omega) = \begin{bmatrix} \sigma_{11}(\omega) & \cdots & \sigma_{1n}(\omega) \\ \vdots & \ddots & \vdots \\ \sigma_{n1}(\omega) & \cdots & \sigma_{nn}(\omega) \end{bmatrix} \quad [6.3]$$

$$\theta_{kii'}(\omega) = \mathrm{acos}\left(\frac{(M-1)C}{\pi(\omega-1)d_{ii'}F}\mathrm{angle}(\sigma_{ik}(\ )\overline{\sigma_{i'k}(\ )})\right) \quad [6.4]$$

A method of estimating the source position from the DOA will be described below. Basically, once the DOA is determined for each of plural microphone pairs, the source position is also determined based on the principle of triangulation. See Japanese Unexamined Patent Application Publication No. 2005-49153, for example, regarding the source position estimation based on the principle of triangulation. The source position estimation will be described in brief below with reference to FIG. 6.

Microphones 602 and 603 are the same as the microphones 502 and 503 in FIG. 5. It is assumed that the DOA θkii' is already determined for each microphone pair 604 (including 602 and 603). Considering a cone 605 having an apex that is positioned at a midpoint between the microphones 602 and 603 and having an apical angle half of which is equal to θkii', the sound source exists somewhere on the surface of the cone 605. The source position can be estimated by obtaining respective cones 605 to 607 for the microphone pairs in a similar manner, and by determining a point of intersection of those cones (or a point where the surfaces of those cones come closest to one another). The forgoing is the method of estimating the source position based on the principle of triangulation.

Problems with the microphone arrangement in both the ICA and the DOA estimation (or the source position estimation) will be described below. The problems primarily reside in the following three points.

a) Number of microphones b) Interval between microphones c) Microphone changing in its position a) Number of Microphones Comparing the computational cost of the DOA estimation or the source position estimation with the computational cost of the ICA, the latter is much higher. Also, because the computational cost of the ICA is proportional to the square of the number n of microphones, the number of microphones may be restricted in some cases in view of an upper limit of the computational cost. As a result, the number of microphones necessary for the source position estimation, in particular, is not available in some cases. In the case of the number of microphone=2, for example, it is possible to separate two sound sources at most, and to estimate that each sound source exists on the surface of a particular cone. However, it is difficult to specify the source position.

b) Interval Between Microphones

To estimate the source position with high accuracy in the source position estimation, it is desired that the microphone pairs are positioned away from each other, for example, on substantially the same order as the distance between the sound source and the microphone. Conversely, two microphones constituting each microphone pair are desirably positioned so close to each other that a plane-wave assumption is satisfied.

In the ICA, however, using two microphones away from each other may be disadvantageous in some cases from the viewpoint of separation accuracy. Such a point will be described below.

Separation based on the ICA in the time-frequency domain is usually realized by forming a null beam (direction in which the gain becomes 0) in each of directions of interference sounds. In the environment of FIG. 1, for example, the separation matrix for separating and extracting the sound source 1 is obtained by forming the null beams in the directions toward the sources 2 to N, which are generating the interference sounds, so that signals in the direction toward the sound source 1, i.e., objective sounds, remain eventually.

Null beams can be formed at most n−1 (n: the number of microphones) in lower frequencies. In frequencies above C/(2d) (C: sound speed, and d: interval between the microphones), however, null beams are further formed in other directions than the predetermined ones due to a phenomenon called “spatial aliasing”. Looking at the directivity plot of 6000 Hz in FIG. 4, for example, null beams are formed in oblique directions, such as indicated by the sounds C, in addition to the sounds (indicated by B) incoming from the right side in the direction in which the sound collection devices are arrayed at the interval in FIG. 4 (i.e., incoming the rear side of the directional microphones). A similar phenomenon occurs in the separation matrix as well. As the distance d between the microphones increases, the spatial aliasing starts to generate at a lower frequency. Further, at a higher frequency, plural null beams are formed in other directions than the predetermined one. If any of the other directions of the null beams than the predetermined one coincides with the direction of the objective sounds, separation accuracy deteriorates.

Accordingly, the interval and the arrangement of the microphones used in the ICA are to be determined depending on a level of frequency up to which the separation is to be performed with high accuracy. In other words, the interval and the arrangement of the microphones used in the ICA may be contradictory to the arrangement of the microphones, which is necessary to ensure satisfactory accuracy in the source position estimation.

c) Microphone Changing in its Position

In the DOA estimation and the source position estimation, it is necessary that at least information regarding the relative positional relationship between the microphones is already known. In the source position estimation, absolute coordinates of each microphone are further necessary in addition to the relative position of the sound source with respect to the microphone when absolute coordinates of the sound source with respect to the fixed origin (e.g., the origin set at one corner of a room) are also estimated.

On the other hand, in the separation performed in the ICA, position information of the microphones is not necessary. (Although separation accuracy varies depending on the microphone arrangement, the position information of the microphones is not included in the formulae used for the separation and the learning). Therefore, the microphones used in the ICA may be not used in the DOA estimation and the source position estimation in some cases. Assume, for example, the case where the functions of the source separation and the source position estimation are incorporated in a TV set to extract user’s utterance and to estimate its position. In that case, when the source position is to be expressed by using a coordinate system with a certain point of a TV housing (e.g., the screen center) being the origin, it is necessary that coordinates of each of microphones used in the source position estimation are known with respect to the origin. For example, if each microphone is fixed to the TV housing, the position of the microphone is known.

Meanwhile, from the viewpoint of source separation, an observation signal easier to separate is obtained by setting a microphone as close as possible to the user. Therefore, it is desired in some cases that the microphone is installed on a remote controller, for example, instead of the TV housing. However, when an absolute position of the microphone on the remote controller is not obtained, a difficulty occurs in determining the source position based on the separation result obtained from the microphone on the remote controller.

As described above, when the ICA (Independent Component Analysis) is performed as the source separation process in the related art, the ICA may be sometimes performed under the setting utilizing a plurality of directional microphones in the microphone arrangement optimum for the ICA.

As discussed above, however, when the separation results obtained as processing results utilizing directional microphones are projected back to the directional microphones, the problem of distortion of sounds provided by the separation results occurs because directivity of each directional microphone differs depending on frequency, as described above with reference to FIG. 4.

Further, the microphone arrangement optimum for the ICA is the optimum arrangement for the source separation, but it may be inappropriate for the DOA estimation and the source position estimation in some cases. Accordingly, when the ICA and the DOA estimation or the source position estimation are performed in a combined manner, processing accuracy may deteriorate in any of the source separation process and the DOA estimation or source position estimation process.

SUMMARY OF THE INVENTION

It is desirable to provide a signal processing apparatus, a signal processing method, and a program, which are able to perform not only a source separation process by ICA (Independent Component Analysis) with microphone setting suitable for the ICA, but also other processes, such as a process for projection-back to positions other than the microphone positions used in the ICA, a DOA (Direction-of-Arrival) estimation process, and a source position estimation process, with higher accuracy.

It is also desirable to realize a process for projection-back to microphones each at an arbitrary position even when the optimum ICA process is executed, for example, using directional microphones and a microphone arrangement optimally configured for ICA. Further, it is desirable to provide a signal processing apparatus, a signal processing method, and a program, which are able to execute the DOA estimation and the source position estimation process with higher accuracy even in an environment optimum for the ICA.

According to an embodiment of the present invention, there is provided a signal processing apparatus including a source separation module for producing respective separation signals corresponding to a plurality of sound sources by applying ICA (Independent Component Analysis) to observation signals, which are based on mixture signals of the sound sources taken by microphones for source separation and a signal projection-back module for receiving observation signals of projection-back target microphones and the separation signals produced by the source separation module, and for producing projection-back signals as respective separation signals corresponding to the sound sources, which are to be taken by the projection-back target microphones, wherein the signal projection-back module produces the projection-back signals by receiving the observation signals of the projection-back target microphones which differ from the source separation microphones.

According to a modified embodiment, in the signal processing apparatus, the source separation module executes the ICA on the observation signals, which are obtained by converting the signals taken by the microphones for source separation to the time-frequency domain, to thereby produce respective separation signals in the time-frequency domain corresponding to the sound sources, and the signal projection-back module calculates the projection-back signals by calculating projection-back coefficients which minimize an error between the total sum of respective projection-back signals corresponding to each of the sound sources, which are calculated by multiplying the separation signals in the time-frequency domain by the projection-back coefficients, and the individual observation signals of the projection-back target microphones, and by multiplying the separation signals by the calculated projection-back coefficients.

According to another modified embodiment, in the signal processing apparatus, the signal projection-back module employs the least squares approximation in a process of calculating the projection-back coefficients which minimize the least squares errors.

According to still another modified embodiment, in the signal processing apparatus, the source separation module receives the signals taken by the source separation microphones which are constituted by a plurality of directional microphones, and executes a process of producing the respective separation signals corresponding to the sound sources, and the signal projection-back module receives the observation signals of the projection-back target microphones, which are omnidirectional microphones, and the separation signals produced by the source separation module, and produces the projection-back signals corresponding to the projection-back target microphones, which are omnidirectional microphones.

According to still another modified embodiment, the signal processing apparatus further includes a directivity forming module for receiving the signals taken by the microphones for source separation which are constituted by a plurality of omnidirectional microphones, and for producing output signals of a virtual directional microphone by delaying a phase of one of paired microphones, which are provided by two among the plurality of omnidirectional microphones, depending on a distance between the paired microphones, wherein the source separation module receives the output signal produced by the directivity forming module and produces the separation signals.

According to still another modified embodiment, the signal processing apparatus further includes a direction-of-arrival estimation module for receiving the projection-back signals produced by the signal projection-back module, and for executing a process of calculating a direction of arrival based on a phase difference between the projection-back signals for the plural projection-back target microphones at different positions.

According to still another modified embodiment, the signal processing apparatus further includes a source position estimation module for receiving the projection-back signals produced by the signal projection-back module, executing a process of calculating a direction of arrival based on a phase difference between the projection-back signals for the plural projection-back target microphones at different positions, and further calculating a source position based on combined data of the directions of arrival, which are calculated from the projection-back signals for the plural projection-back target microphones at the different positions.

According to still another modified embodiment, the signal processing apparatus further includes a direction-of-arrival estimation module for receiving the projection-back coefficients produced by the signal projection-back module, and for executing calculations employing the received projection-back coefficients, to thereby execute a process of calculating a direction of arrival or a source position.

According to still another modified embodiment, the signal processing apparatus further includes an output device set at a position corresponding to the projection-back target microphones, and a control module for executing control to output the projection-back signals for the projection-back target microphones, which correspond to the position of the output device.

According to still another modified embodiment, in the signal processing apparatus, the source separation module includes a plurality of source separation modules for receiving signals taken by respective sets of source separation microphones, which differ from one another at least in parts thereof, and for producing respective sets of separation signals, and the signal projection-back module receives the respective sets of separation signals produced by the plurality of the source separation modules and the observation signals of the projection-back target microphones, produces plural sets of projection-back signals corresponding to the source separation modules, and combines the produced plural sets of projection-back signals together, to thereby produce final projection-back signals for the projection-back target microphones.

According another embodiment of the present invention, there is provided a signal processing method executed in a signal processing apparatus, the method including the steps of causing a source separation module to produce respective separation signals corresponding to a plurality of sound sources by applying an ICA (Independent Component Analysis) to observation signals produced based on mixture signals from the sound sources, which are taken by source separation microphones, to thereby execute a separation process of the mixture signals, and causing a signal projection-back module to receive observation signals of projection-back target microphones and the separation signals produced by the source separation module, and to produce projection-back signals as respective separation signals corresponding to the sound sources, which are to be taken by the projection-back target microphones, wherein the projection-back signals are produced by receiving the observation signals of the projection-back target microphones which differ from the source separation microphones.

According still another embodiment of the present invention, there is provided a program for executing signal processing in a signal processing apparatus, the program including the steps of causing a source separation module to produce respective separation signals corresponding to a plurality of sound sources by applying an ICA (Independent Component Analysis) to observation signals produced based on mixture signals from the sound sources, which are taken by source separation microphones, to thereby execute a separation process of the mixture signals, and causing a signal projection-back module to receive observation signals of projection-back target microphones and the separation signals produced by the source separation module, and to produce projection-back signals as respective separation signals corresponding to the sound sources, which are to be taken by the projection-back target microphones, wherein the projection-back signals are produced by receiving the observation signals of the projection-back target microphones which differ from the source separation microphones.

The program according to the present invention is a program capable of being provided by a storage medium, etc. in the computer-readable form to, e.g., various information processing apparatuses and computer systems which can execute a variety of program codes. By providing the program in the computer-readable form, processing corresponding to the program can be realized on the various information processing apparatuses and computer systems.

Other features and advantages will be apparent from the detailed description of the embodiments of the present invention with reference to the accompanying drawings. Be it noted that a term "system" implies a logical assembly of plural devices and the meaning of "system" is not limited to the case where individual devices having respective functions are incorporated within the same housing.

According to the embodiment of the present invention, the ICA (Independent Component Analysis) is applied to the observation signals based on the mixture signals of the plural sound sources, which are taken by the source separation microphones, to perform a process of separating the mixture signals, thereby generating the separation signals corresponding respectively to the sound sources. Then, the generated separation signals and the observation signals of the projection-back target microphones differing from the source separation microphones are input to generate, based on those input signals, the projection-back signals, which are separation signals corresponding to the individual sound sources and which are estimated to be taken by the projection-back target microphones. By utilizing the generated projection-back signals, voice data can be output to the output device and the direction of arrival (DOA) or the source position can be estimated, for example

DESCRIPTION OF THE PREFERRED EMBODIMENTS

Figure 1:
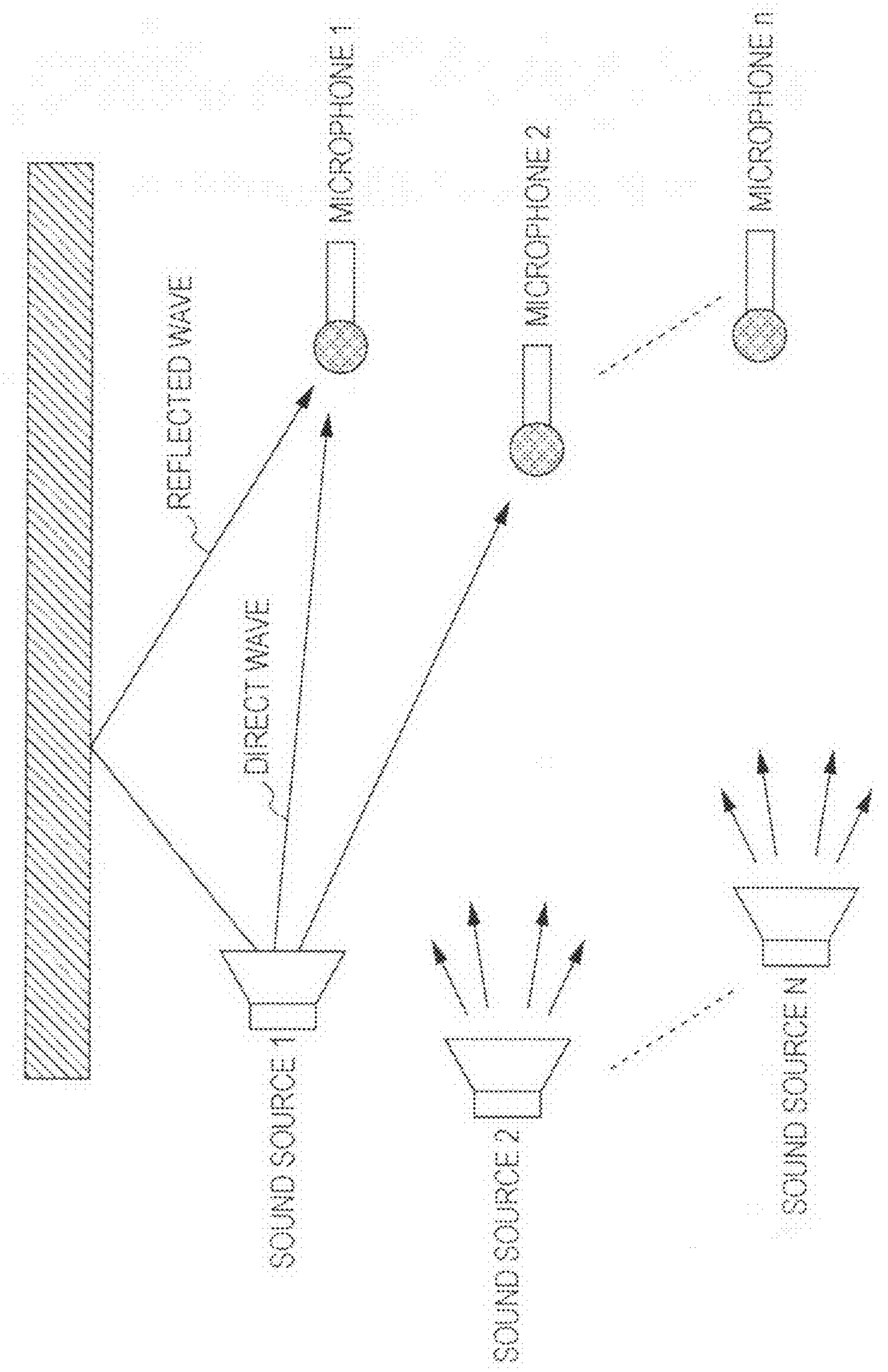
FIG. 1 is an illustration to explain a situation where a number N of sound sources are active to generate different sounds and the sounds are observed by a number n of microphones.
Figure 2A:
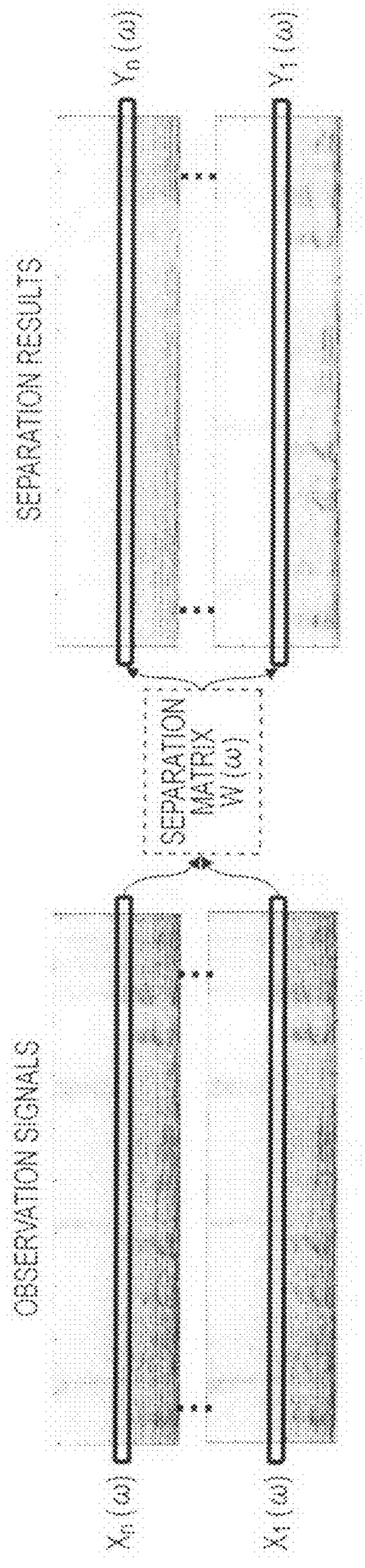
FIGS. 2A and 2B are charts to explain a separation process in individual frequency bins (FIG. 2A) and a separation process for all the frequency bins (FIG. 2B), respectively.
Figure 2B:
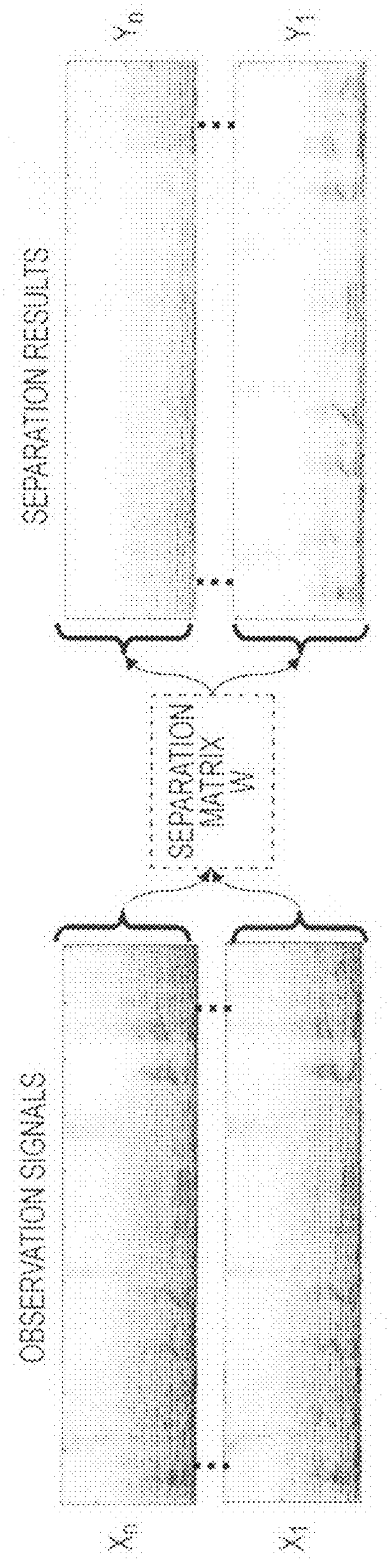

Details of a signal processing apparatus, a signal processing method, and a program according to embodiments of the present invention will be described below with reference to the drawings. The following description is made in order of items listed below.

1. Summary of processing according to the embodiments of the present invention
2. Projection-back process to microphones differing from ICA-adapted microphones and principle thereof
3. Processing example of the projection-back process to microphones differing from ICA-adapted microphones (first embodiment)
4. Embodiment in which a virtual directional microphone is constituted by using a plurality of omnidirectional microphones (second embodiment)
5. Processing example in which the projection-back process for the separation results of the source separation process and the DOA estimation or the source position estimation are executed in a combined manner (third embodiment)
6. Exemplary configurations of modules constituting the signal processing apparatuses according to the embodiments of the present invention
7. Processing sequences executed in the signal processing apparatuses
8. Signal processing apparatuses according to other embodiments of the present invention 8.1 Embodiment in which calculation of an inverse matrix is omitted in a process of calculating a projection-back coefficient matrix P(ω) in the signal projection-back module 8.2 Embodiment which executes a process of projecting the separation results obtained by the source separation process is projected back to microphones in a particular arrangement (fourth embodiment)

8.3 Embodiment employing a plurality of source separation systems (fifth embodiment)

9. Summary of features and advantages of the signal processing apparatuses according to the embodiments of the present invention

[1. Summary of Processing According to the Embodiments of the Present Invention]

As described above, when the ICA (Independent Component Analysis) is performed as the source separation process in the related art, it is desirable to perform the ICA under the setting utilizing a plurality of directional microphones in the microphone arrangement optimum for the ICA.

However, that setting accompanies with the following problems.

(1). When separation signals, i.e., separation results which are obtained as processing results utilizing directional microphones, are projected back to the directional microphones, sounds of the separation results may be distorted because directivity of each directional microphone differs depending on frequency, as described above with reference to FIG. 4.

(2) The microphone arrangement optimum for the ICA is the optimum arrangement for the source separation, but it may often be inappropriate for the DOA estimation and the source position estimation.

Thus, a difficulty arises in executing both the ICA process in which the microphones are set in the arrangement and positions optimum for the ICA and the other process with high accuracy under the same setting of the microphones.

The embodiments of the present invention overcome the above-mentioned problems by enabling the source separation results produced by the ICA to be projected back to positions of microphones which are not used in the ICA.

Stated another way, the above problem (1) in using the directional microphones can be solved by projecting the separation results obtained by the directional microphones back to omnidirectional microphones. Also, the above problem (2), i.e., the contradiction in the microphone arrangement between the ICA and the DOA estimation or the source position estimation, can be solved by generating the separation results under setting of the microphone arrangement suitable for the ICA, and by projecting the generated separation results back to microphones in arrangement suitable for the DOA and source position estimation (or microphones of which positions are known).

Thus, the embodiments of the present invention enable the projection-back to be performed on microphones differing from the microphones which are adapted for the ICA.

[2. Projection-Back Process to Microphones Differing from ICA-Adapted Microphones and Principle Thereof]

The projection-back process to microphones differing from the ICA-adapted microphones and the principle thereof will be described below.

Let X(ω,t) be the data resulting from converting signals observed by the microphones used in the ICA to the time-frequency domain and Y(ω,t) be the separation results (separation signals) of the data X(ω,t). The converted data and the separation results are the same as those which are expressed by the formulae [2.1] to [2.7] in the related art described above. Namely, by using following variables:

converted data of the observation signals in the time-frequency domain: X(ω,t), separation results: Y(ω,t), and separation matrix: W(ω), the relationship of;

$$Y(\omega,t)=W(\omega)X(\omega,t)$$

is held. The separation results Y(ω,t) can represent the results obtained both before and after the rescaling.

Next, a process of performing the projection-back to microphones each at an arbitrary position by utilizing the separation results of the ICA is executed. As described above, projecting the separation results of the ICA back to microphones implies a process of analyzing sound signals collected by the microphones each set at a certain position and determining, from the collected sound signals, respective components attributable to individual source signals. The respective components attributable to the individual source signals are equal to respective signals observed by the microphones when only one sound source is active.

The projection-back process is executed as a process of inputting the observation signals of the projection-back target microphones and the separation results (separation signals) produced by the source separation process, and producing projection-back signals (projection-back results), i.e., the separation signals which correspond to individual sources and which are taken by the projection-back target microphones.

Let X'k(ω,t) be one of the observation signals (converted to the time-frequency domain) observed by one projection-back target microphone. Further, let m be the number of projection-back target microphones, and X'(ω,t) be a vector including, as elements, the observation signals X'1(ω,t) to X'm(ω,t) (converted to the time-frequency domain) observed by the individual microphones 1 to m, as expressed by the following formula [7.1].

$$X'(\omega, t) = \begin{bmatrix} X_1'(\omega, t) \\ \vdots \\ X_m'(\omega, t) \end{bmatrix} \quad [7.1]$$

$$Y_k^{[i]}(\omega, t) = P_{jk}(\omega) Y_k(\omega, t) \quad [7.2]$$

$$\hat{X}'_j(\omega, t) = Y_1^{\lfloor i \rfloor}(\omega, t) + \ldots + Y_n^{\lfloor i \rfloor}(\omega, t) \quad [7.3]$$

$$err = \left\langle \left| X_k'(\omega, t) - \hat{X}'_k(\omega, t) \right|^2 \right\rangle_t \quad [7.4]$$

$$P(\omega) = \begin{bmatrix} P_{11}(\omega) & \ldots & P_{1n}(\omega) \\ \vdots & \ddots & \vdots \\ P_{m1}(\omega) & \ldots & P_{mn}(\omega) \end{bmatrix} \quad [7.5]$$

$$P(\omega) = \langle X'(\omega, t) Y(\omega, t)^H \rangle_t \{ \langle Y(\omega, t) Y(\omega, t)^H \rangle_t \}^{-1} \quad [7.6]$$

$$= \langle X'(\omega, t) X(\omega, t)^H \rangle_t \langle X(\omega, t) X(\omega, t)^H \rangle_t^{-1} W(\omega)^{-1} \quad [7.7]$$

$$\begin{bmatrix} Y_k^{\lfloor 1 \rfloor}(\omega, t) \\ \vdots \\ Y_k^{\lfloor m \rfloor}(\omega, t) \end{bmatrix} = \begin{bmatrix} P_{1k}(\omega) \\ \vdots \\ P_{mk}(\omega) \end{bmatrix} Y_k(\omega, t) \quad [7.8]$$

$$\begin{bmatrix} Y_1^{[k]}(\omega, t) \\ \vdots \\ Y_n^{[k]}(\omega, t) \end{bmatrix} = \mathrm{diag}(P_{k1}(\omega), \ldots, P_{kn}(\omega)) Y(\omega, t) \quad [7.9]$$

$$= W^{[k]}(\omega) X(\omega, t) \quad [7.10]$$

$$W^{[k]}(\omega) = \mathrm{diag}(P_{k1}(\omega), \ldots, P_{kn}(\omega)) W(\omega) \quad [7.11]$$

Microphones corresponding to the elements of the vector X'(ω,t) may be made up of only the microphones which are not used in the ICA, or may include the microphones used in the ICA. Anyway, those microphones must include at least one microphone not used in the ICA. Be it noted that the processing method according to the related art corresponds to the case where the elements of X'(ω,t) are made up of only the microphones used in the ICA.

Figure 3:
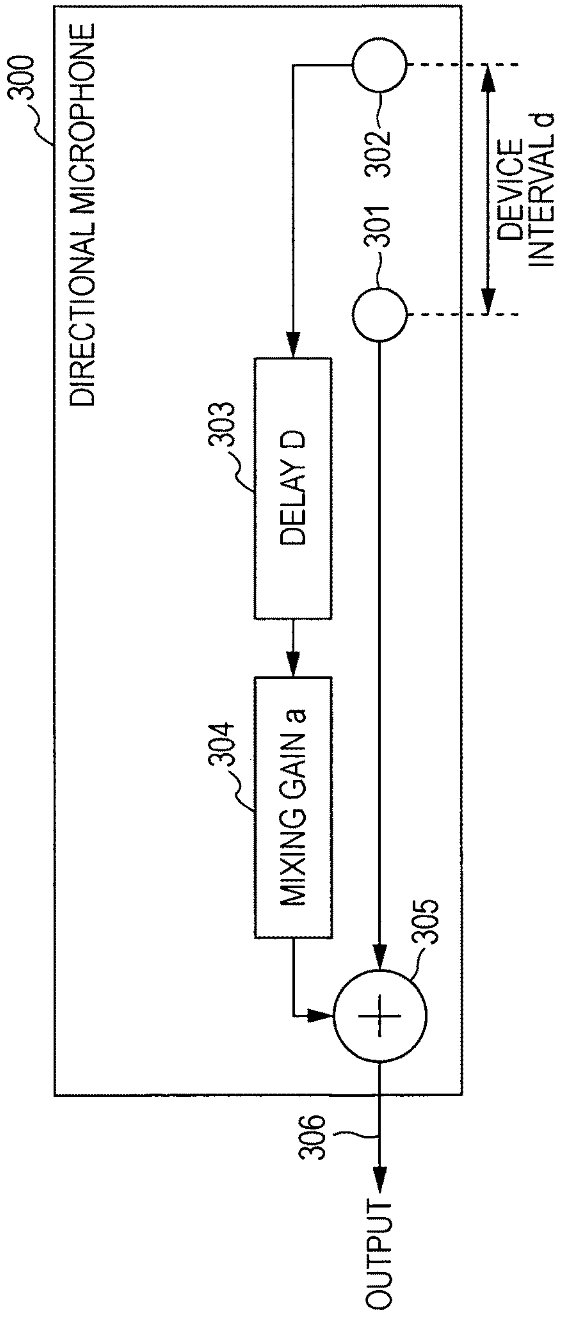
FIG. 3 illustrates an exemplary configuration of a simple directional microphone.

When a directional microphone is used in the ICA, an output of the directional microphone is regarded as being included in the "microphones used in the ICA", while sound collection devices constituting the directional microphone can be each handled as the "microphone not used in the ICA". For example, when the directional microphone 300, described above with reference to FIG. 3, is utilized in the ICA, the output 306 of the directional microphone 300 is regarded as one element of the observation signals X(ω,t) (converted to the time-frequency domain), while signals individually observed by the sound collection devices 301 and 302 can be each used as the observation signal X'k(ω,t) of the "microphone not used in the ICA".

The result of projecting the separation result Yk(ω,t) back to the "microphone not used in the ICA" (referred to as the "microphone i" hereinafter), i.e., the projection-back result (projection-back signal), is denoted by Yk[i](ω,t). The observation signal of the microphone i is X'i(ω,t).

The projection-back result (projection-back signal) Yk[i](ω,t) obtained by projecting the separation result (separation signal) Yk(ω,t) of the ICA to the microphone i can be calculated through the following procedure.

Letting Pjk(ω) be a coefficient of the projection-back of the separation result Yk(ω,t) of the ICA to the microphone i, the projection-back can be expressed by the foregoing formula [7.2]. The coefficient Pjk(ω) can be determined with the least squares approximation. More specifically, after preparing signals (formula [7.3]) representing the total sum of the respective projection-back results of the separation results to the microphone i, the coefficient Pjk(ω) can be determined such that a mean square error (formula [7.4]) between the prepared signals and the observation signals of each microphone i is minimized.

In the source separation process, as described above, the separation signals in the time-frequency domain, which correspond to individual sound sources, are produced by executing the ICA (Independent Component Analysis) on the observation signals which are obtained by converting signals observed by the microphones for source separation to the time-frequency domain. In the signal projection-back process, the projection-back signals corresponding to the individual sound sources are calculated by multiplying the thus-produced separation signals in the time-frequency domain by the respective projection-back coefficients.

The projection-back coefficients Pjk(ω) are calculated as projection-back coefficients that minimize an error between the total sum of the projection-back signals corresponding to the individual sound sources and the individual observation signals of the projection-back target microphones. For example, the least squares approximation can be applied to the process of calculating the projection-back coefficients. Thus, the signal (formula [7.3]) representing the total sum of the respective projection-back results of the separation results to the microphone i is prepared and the coefficient Pjk(ω) is determined such that the mean square error (formula [7.4]) between the prepared signals and the observation signals of each microphone i is minimized. The projection-back results (projection-back signals) can be calculated by multiplying the separation signals by the determined projection-back coefficients.

Details of a practical process will be described below. Let P(ω) be a matrix made up of the projection-back coefficients (formula [7.5]). P(ω) can be calculated based on a formula [7.6]. Alternatively, a formula [7.7] modified by using the above-described relationship of the formula [3.1] may also be used.

Once Pjk(ω) is determined, the projection-back results can be calculated by using the formula [7.2]. Alternatively, a formula [7.8] or [7.9] may also be used instead.

The formula [7.8] represents a formula for projecting the separation result of one channel to each microphone.

The formula [7.9] represents a formula for projecting the individual separation results to a particular microphone.

The formula [7.9] can also be rewritten to a formula [7.11] or [7.10] by preparing a new separation matrix W[k](ω) which reflects the projection-back coefficients. In other words, separation results Y'(ω,t) after the projection-back can also be directly produced from the observation signals X(ω,t) without producing the separation results Y(ω,t) before the projection-back.

If;

$$X'(\omega,t)=X(\omega,t)$$

is assumed in the formula [7.7], namely, if the projection-back is performed on only the microphones used in the ICA, P(ω) is the same as W(ω)-1. Thus, the Projection-back SIMO according to the related art corresponds to a special case of the method used in the embodiments of the present invention.

The maximum distance between microphones used in ICA and the projection back depends on the distance where the sound wave can maximally move within a duration corresponding to one frame of the short-time Fourier transform. When the observation signal obtained by sampling at 16 kHz is subjected to the short-time Fourier transform by using frames of 512 points, one frame is given by:

512/16000=0.032 sec

Assuming the sound speed=340 [m/s], sounds move about 10 [m] in such a time [0.032 sec]. By using the method according to the embodiment of the present invention, therefore, the projection-back can be performed on a microphone that is away about 10 [m] from the ICA-adapted microphone.

Although the projection-back coefficient matrix P(ω) (formula [7.5]) can also be calculated by using the formula [7.6] or [7.7], the use of the formula [7.6] or [7.7] increases the computational cost because the formula [7.6] and [7.7] each includes an inverse matrix. To reduce the computational cost, the projection-back coefficient matrix P(ω) may be calculated by using the following formula [8.1] or [8.2].

$$P(\omega) = \langle X'(\omega, t)Y(\omega, t)^H \rangle_t \mathrm{diag}(\langle |Y_1(\omega, t)|^2 \rangle_t, \ldots, \langle |Y_n(\omega, t)|^2 \rangle_t)^{-1} \quad [8.1]$$

$$= \langle X'(\omega, t)X(\omega, t)^H \rangle W(\omega)^H \mathrm{diag}(W(\omega)\langle X(\omega, t)X(\omega, t)^H \rangle_t W(\omega)^H)^{-1} \quad [8.2]$$

$$P(\omega) = \langle X'(\omega, t)Y(\omega, t)^H \rangle_t \quad [8.3]$$

$$= \langle X'(\omega, t)X(\omega, t)^H \rangle W(\omega)_t^H \quad [8.4]$$

Processing executed using the formulae [8.1] to [8.4] will be described in detail later in [8. Signal processing apparatuses according to other embodiments of the present invention].

[3. Processing Example of the Projection-Back Process to a Microphone Differing from the ICA-Adapted Microphone (First Embodiment)]

A first embodiment of the present invention will be described below with reference to FIGS. 7 to 10.

The first embodiment is intended to execute the process of the projection-back to a microphone differing from the ICA-adapted microphone.

Figure 7:
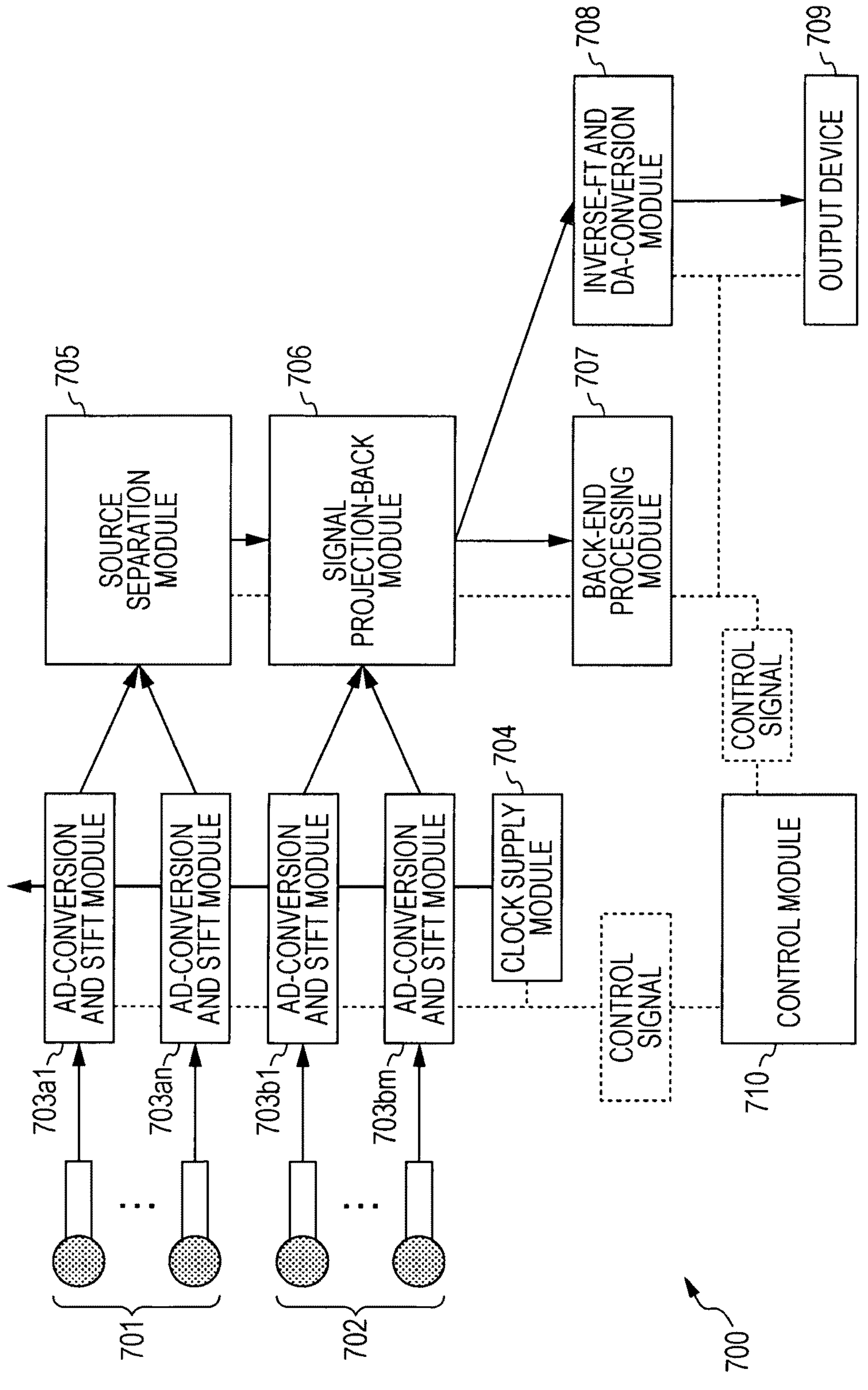
FIG. 7 is a block diagram illustrating the configuration of a signal processing apparatus according to a first embodiment of the present invention.

FIG. 7 is a block diagram illustrating the configuration of a signal processing apparatus according to the first embodiment of the present invention. In a signal processing apparatus 700 illustrated in FIG. 7, directional microphones are employed as microphones for use in the source separation process based on the ICA (Independent Component Analysis). Thus, the signal processing apparatus 700 executes the source separation process by using signals observed by the directional microphone and further executes a process of projecting the results of the source separation process back to one or more omnidirectional microphones.

Microphones used in this embodiment include a plurality of directional microphones 701 which are used to provide inputs for the source separation process, and one or more omnidirectional microphones 702 which are used as the projection-back targets. The arrangement of those microphones will be described below. The microphones 701 and 702 are connected to respective AD-conversion and STFT modules 703 (703*a*1 to 703*an* and 703*b*1 to 703*bm*), each of which executes sampling (analog-to-digital conversion) and the Short-time Fourier Transform (STFT).

Because the phase differences between signals observed by respective microphones have important meaning in performing the projection-back of the signals, the AD conversions executed in the AD-conversion and STFT modules 703 necessitate samplings to be made with a common clock. To that end, a clock supply module 704 generates a clock signal and applies the generated clock signal to the AD-conversion and STFT modules 703, each of which executes processing of an input signal from the corresponding microphone, so that sampling processes executed in the AD-conversion and STFT modules 703 are synchronized with one another. The signals having been subjected to the Short-time Fourier Transform (SIFT) in each AD-conversion and SIFT module 703 are provided as signals in the frequency domain, i.e., a spectrogram.

Thus, observation signals of the plurality of directional microphones 701 for receiving speech signals used in the source separation process are input respectively to the AD-conversion and STFT modules 703*a*1 to 703*an*. The AD-conversion and STFT modules 703*a*1 to 703*an* produce observation signal spectrograms in accordance with the input signals and apply the produced spectrograms to a source separation module 705.

The source separation module 705 produces, from the observation signal spectrograms obtained by the directional microphones, separation result spectrograms corresponding respectively to the sound sources and a separation matrix for producing those separation results by using the ICA technique. Such a source separation process will be described in detail later. The separation results in this stage are signals before the projection-back to the one or more omnidirectional microphones.

On the other hand, observation signals of the one or more omnidirectional microphones 702 used as the projection-back targets are input respectively to the AD-conversion and STFT modules 703*b*1 to 703*bm*. The AD-conversion and STFT modules 703*b*1 to 703*bm* produce observation signal spectrograms in accordance with the input signals and apply the produced spectrograms to a signal projection-back module 706.

By using the separation results (or the observation signals and the separation matrix) produced by the source separation module 705 and the observation signals corresponding to the projection-back target microphones 702, the signal projection-back module 706 projects the separation results to the omnidirectional microphones 702. Such a projection-back process will be described in detail later.

The separation results after the projection-back are, if necessary, sent to a back-end processing module 707 which executes a back-end process, or output from a device, e.g., a speaker. The back-end process executed by the back-end processing module 707 is, e.g., a speech recognition process. On the other hand, when the separation results are output from a device, e.g., a loudspeaker, the separation results are subjected to the inverse Fourier Transform (FT) and digital-to-analog conversion in an inverse-FT and DA-conversion module 708, and resulting analog signals in the time domain are output from an output device 709, e.g., a loudspeaker or a headphone.

The above-described processing modules are controlled by a control module 710. Although the control module is omitted in block diagrams referred to below, the later-described processing is executed under control of the control module.

Figure 8:
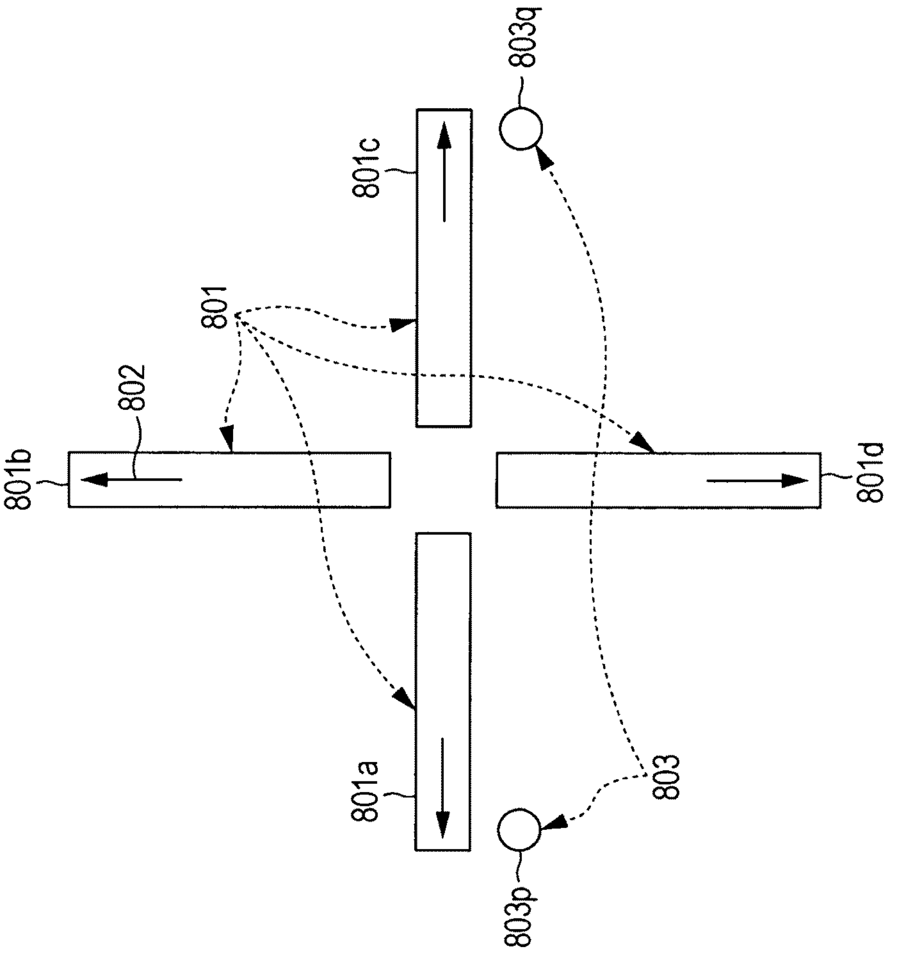
FIG. 8 is an illustration to explain an exemplary arrangement of directional microphones and omnidirectional microphones in the signal processing apparatus illustrated FIG. 7.

An exemplary arrangement of the directional microphones 701 and the omnidirectional microphones 702 in the signal processing apparatus 700, illustrated in FIG. 7, will be described with reference to FIG. 8. FIG. 8 represents an example where the separation results obtained by the ICA process based on the observation signals of four directional microphones 801 (801*a* to 801*d*) are projected back to two omnidirectional microphones 803 (803*p* and 803*q*). By arranging the two omnidirectional microphones 803*p* and 803*q* at a gap substantially equal to the distance between the human ears, the source separation results are obtained substantially as binaural signals (i.e., sound signals observed by both the ears).

Figure 4:
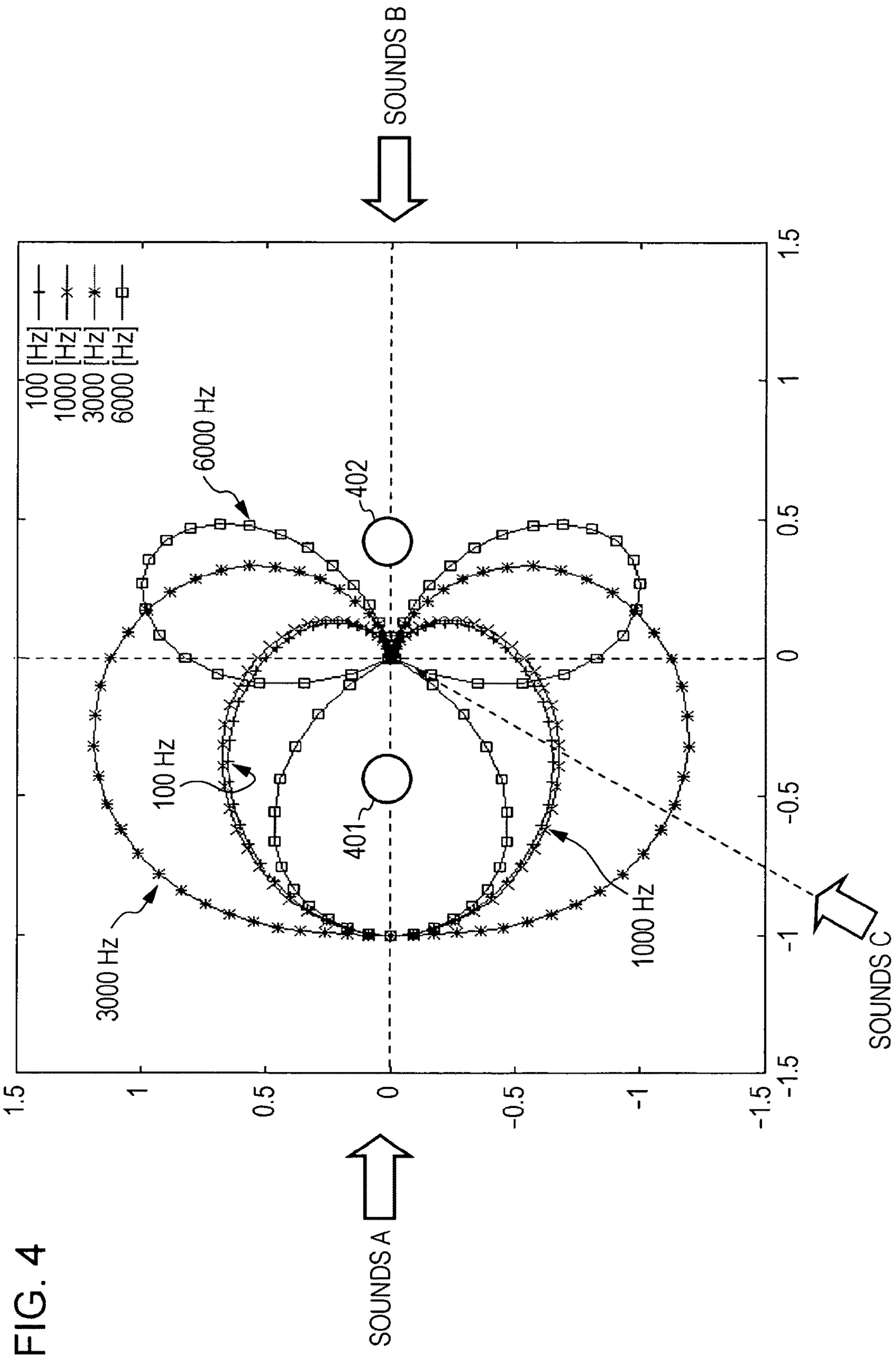
FIG. 4 illustrates the results of plotting directivity (i.e., the relationship between an incoming direction and an output gain) for each of four frequencies (100 Hz, 1000 Hz, 3000 Hz, and 6000 Hz)

The directional microphones 801 (801*a* to 801*d*) are four directional microphones disposed such that directions 802 in which sensitivity is high are located upward, downward, leftward, and rightward as viewed from above. The directional microphones may be each of the type that the null beam is formed in a direction reversal to the direction of each arrow (e.g., the microphone having such a directivity characteristic as illustrated in FIG. 4).

The omnidirectional microphones 803 (803*p* and 803*q*) used as the projection-back targets are prepared in addition to the directional microphones 801. The number and positions of the omnidirectional microphones 803 govern type of projection-back results. When, as illustrated in FIG. 8, the omnidirectional microphones 803 (803*p* and 803*q*) used as the projection-back targets are disposed substantially at the same positions as respective fore ends of the left and right directional microphones 801*a* and 801*c*, binaural signals are obtained which are almost equivalent to a situation where human ears are located just at the positions of the omnidirectional microphones 803.

While FIG. 8 illustrates the two microphones 803*p* and 803*q* as the omnidirectional microphones used as the projection-back targets, the number of omnidirectional microphones used as the projection-back targets is not limited to two. If it is just intended to obtain the separation results having flat frequency response, a single omnidirectional microphone may be used. Conversely, the number of omnidirectional microphones used as the projection-back targets may be larger than the number of microphones used for the source separation. An example using a larger number of projection-back target microphones will be described later as a modification.

[4. Embodiment in which a Virtual Directional Microphone is Constituted by Using a Plurality of Omnidirectional Microphones (Second Embodiment)]

While, in the signal processing apparatus 700 of FIG. 7, the directional microphones 701 used for the source separation and the omnidirectional microphones 702 used as the projection-back targets are set separately from each other, sharing of microphones can be realized by employing a plurality of omnidirectional microphones so as to constitute a virtual directional microphone. Such a configuration will be described below with reference to FIGS. 9 and 10. In the following description, the omnidirectional microphone is referred to as a “sound collection device”, and the directional microphone formed by a plurality of sound collection devices is referred to as a “(virtual) directional microphone”. For example, in the directional microphone described above with reference to FIG. 3, one virtual directional microphone is formed by using two sound collection devices.

Figure 9:
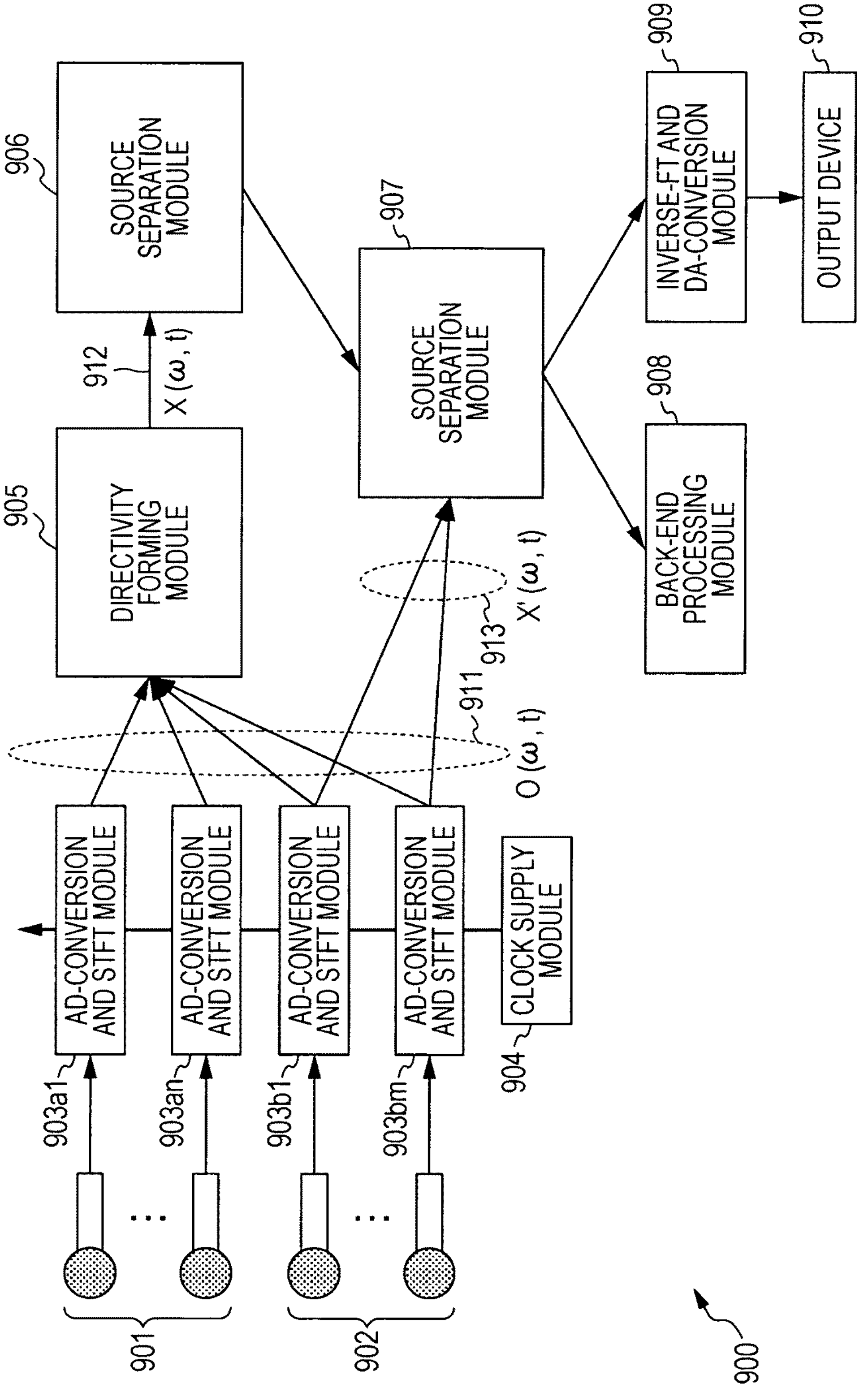
FIG. 9 is a block diagram illustrating the configuration of a signal processing apparatus according to a second embodiment of the present invention.

A signal processing apparatus 900 illustrated in FIG. 9 represents the case using a plurality of sound collection devices. The sound collection devices are grouped into sound collection devices 902 which are used for the projection-back, and sound collection devices 901 which are not used for the projection-back and which are used only for the source separation. While the signal processing apparatus 900 illustrated in FIG. 9 also includes, as in the apparatus 700 illustrated in FIG. 7, a control module for controlling various processing modules, the control module is omitted in FIG. 9.

Signals observed by the sound collection devices 901 and 902 are converted to signals in the time-frequency domain by AD-conversion and SIFT modules 903 (903*a*1 to 903*an* and 903*b*1 to 903*bm*), respectively. As in the configuration described above with reference to FIG. 7, because the phase differences between signals observed by respective microphones have important meaning in performing the projection-back of the signals, the AD conversions executed in the AD-conversion and SIFT modules 903 necessitate samplings to be made with a common clock. To that end, a clock supply module 904 generates a clock signal and applies the generated clock signal to the AD-conversion and SIFT modules 703, each of which executes processing of input signals from the corresponding microphone, so that sampling processes executed in the AD-conversion and SIFT modules 703 are synchronized with one another. The signals having been subjected to the Short-time Fourier Transform (SIFT) in each AD-conversion and SIFT module 903 are provided as signals in the frequency domain, i.e., a spectrogram.

A vector made up of the observation signals of the sound collection devices 901 (i.e., the signals in the time-frequency domain after being subjected to the SIFT), which are produced by the AD-conversion and SIFT modules 903 (903*a*1 to 903*an* and 903*b*1 to 903*bm*), is assumed to be O(ω,t) 911. The observation signals of the sound collection devices 901 are converted, in a directivity forming module 905, to signals which are to be observed by a plurality of virtual directional microphones. Details of the conversion will be described later. A vector made up of the conversion results is assumed to be X(ω,t) 912. A source separation module 906 produces, from the observation signals corresponding to the virtual directional microphones, separation results (before the projection-back) corresponding respectively to the sound sources and a separation matrix.

The observation signals of the sound collection devices 902, which are used for the source separation and further subjected to the projection-back, are sent from the AD-conversion and SIFT modules 903 (903*b*1 to 903*bm*) to a signal projection-back module 907. A vector made up of the observation signals of the sound collection devices 902 is denoted by X'(ω,t) 913. The signal projection-back module 907 executes the projection-back of the separation results by using the separation results (or the observation signals X(ω,t) 912 and the separation matrix) from the source separation module 906 and the observation signals X'(ω,t) 913 from the sound collection devices 902 used as the projection-back targets.

Respective processes and configurations of the signal projection-back module 907, the back-end processing module 908, the inverse-FT and DA-conversion module 909, and the output device 910 are the same as those described above with reference to FIG. 7, and hence a description thereof is omitted.

An example of microphone arrangement corresponding to the configuration of the signal processing apparatus 900, illustrated in FIG. 9, and a method of forming microphone directivity will be described below with reference to FIG. 10.

Figure 10:
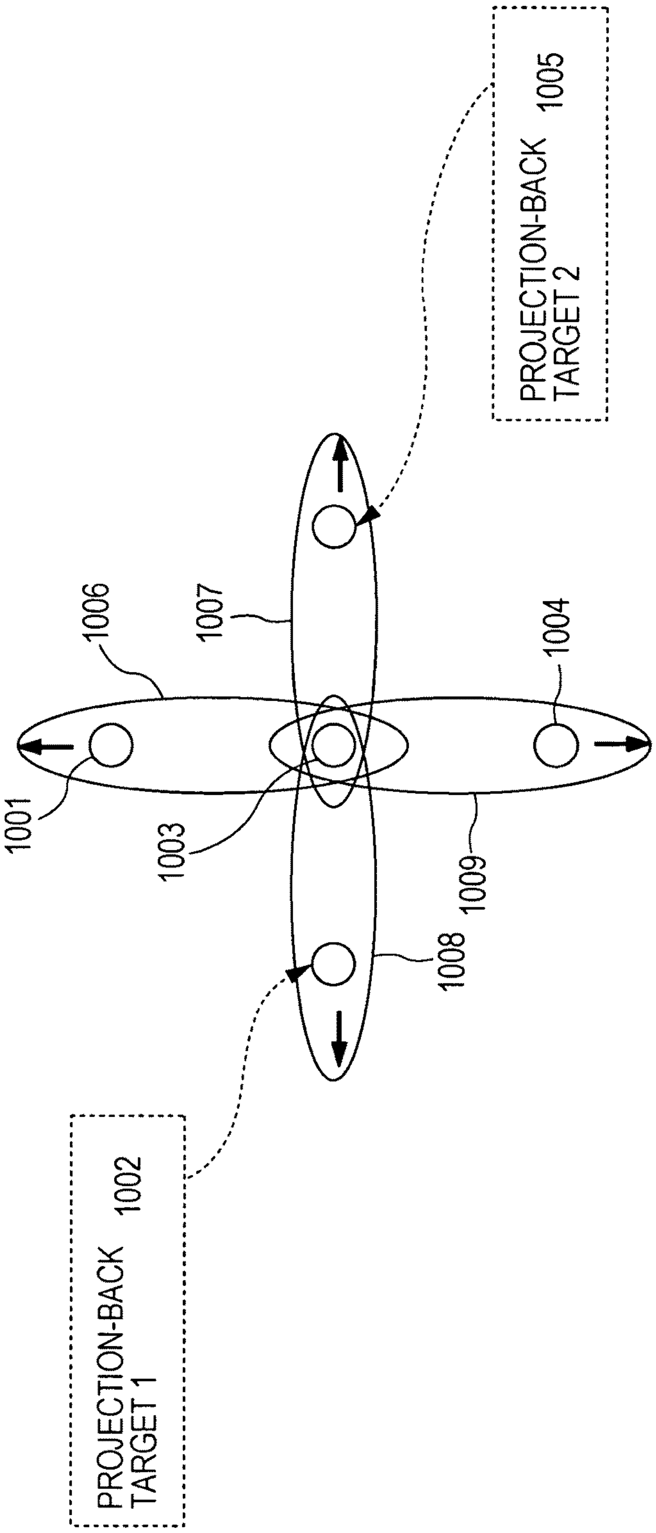
FIG. 10 is an illustration to explain an example of microphone arrangement corresponding to the configuration of the signal processing apparatus illustrated in FIG. 9 and a method of forming directivity of a microphone.

In the microphone arrangement illustrated in FIG. 10, five sound collection devices, i.e., a sound collection device 1 (denoted by 1001) to a sound collection device 5 (denoted by 1005) are arranged in a crossed pattern. All those sound collection devices 1 to 5 correspond to the sound collection devices which are used for the source separation process in the signal processing apparatus 900 of FIG. 9. Also, the sound collection device 2 (1002) and the sound collection device 5

(1005) correspond to the sound collection devices which are used not only for the source separation process, but also as the projection-back targets, i.e., the sound collection devices 902 illustrated in FIG. 9.

The four sound collection devices surrounding the sound collection device 3 (1003), which is positioned at a center, form directivity in respective directions when used in pair with the sound collection device 3 (1003). For example, a virtual directional microphone 1 (1006) having upward directivity (i.e., forming a null beam in the downward direction) as viewed in FIG. 10 is formed by using the sound collection device 1 (1001) and the sound collection device 3 (1003). Thus, observation signals equivalent to signals which are observed by four virtual directional microphones 1 (1006) to 4 (1009) are produced by using the five sound collection devices 1 (1001) to 5 (1005). A method of forming the directivity will be described below.

Further, the sound collection device 2 (1002) and the sound collection device 5 (1005) are used as the microphones which are projection-back targets 1 and 2. Those two sound collection devices correspond to the sound collection devices 902 in FIG. 9.

A method of forming four directivities from the five sound collection devices 1 (1001) to 5 (1005), illustrated in FIG. 10, is now described with reference to the following formulae [9.1] to [9.4].

$$O(\omega,t)=\begin{bmatrix}O_1(\omega,t)\\ \vdots\\ O_5(\omega,t)\end{bmatrix} \tag{9.1}$$

$$X(\omega,t)=\begin{bmatrix}X_1(\omega,t)\\ \vdots\\ X_4(\omega,t)\end{bmatrix}=\begin{bmatrix}1&0&-D(\omega,d_{13})&0&0\\0&1&-D(\omega,d_{23})&0&0\\0&0&-D(\omega,d_{34})&1&0\\0&0&-D(\omega,d_{35})&0&1\end{bmatrix}O(\omega,t) \tag{9.2}$$

$$D(\omega,d_{ki})=\exp\left(-j\pi\frac{\omega-1}{M-1}\frac{d_{ki}F}{C}\right) \tag{9.3}$$

where $j$: imaginary unit $\omega$: index of a frequency bin (1 to $M$)

$M$: total number of frequency bins $d_{ki}$: distance between sound collection devices $k$ and $i$ $F$: sampling frequency $C$: sound velocity $$X'(\omega,t)=\begin{bmatrix}X_1'(\omega,t)\\ X_2'(\omega,t)\end{bmatrix}=\begin{bmatrix}O_2(\omega,t)\\ O_5(\omega,t)\end{bmatrix} \tag{9.4}$$

Let $O_1(\omega,t)$ to $O_5(\omega,t)$ be respective observation signals (in the time-frequency domain) from the sound collection devices, and $O(\omega,t)$ be a vector including those observation signals as elements (formula [9.1]).

Directivity can be formed from a pair of sound collection devices by using a similar method to that described above with reference to FIG. 3. A delay in the time-frequency domain is expressed by multiplying the observation signal of one of the paired sound collection devices by $D(\omega,d_{ki})$, which is expressed by a formula [9.3]. As a result, the signals $X(\omega,t)$ observed by the four virtual directional microphones can be expressed by a formula [9.2].

A process of multiplying the observation signal of one of the paired sound collection devices by $D(\omega,d_{ki})$, which is expressed by the formula [9.3], corresponds to the process of delaying the phase depending on the distance between the paired sound collection devices. Consequently, a similar output to that of the directional microphone 300, described above with reference to FIG. 3, can be calculated. The directivity forming module 905 of the signal processing apparatus 900, illustrated in FIG. 9, outputs the thus-produced signals to the source separation module 906.

A vector $X'(\omega,t)$ made up of the observation signals of the projection-back target microphones can be expressed by a formula [9.4] because they are provided as the observation signals of the sound collection device 2 (1001) and the sound collection device 5 (1005). Once $X(\omega,t)$ and $X'(\omega,t)$ are obtained, the projection-back can be then performed based on $X(\omega,t)$ and $X'(\omega,t)$ by using the above-mentioned formulae [7.1] to [7.11] in a similar manner to that in the case using separate microphones for the source separation and the projection-back.

[5. Processing Example in which the Projection-Back Process for the Separation Results of the Source Separation Process and the DOA Estimation or the Source Position Estimation are Executed in a Combined Manner (Third Embodiment)]

A third embodiment of the present invention will be described below with reference to FIGS. 11 to 13.

The third embodiment represents an example of combined processes between the projection-back of the separation results in the source separation process and the DOA estimation or the source position estimation.

An exemplary configuration of a signal processing apparatus 1100 according to the third embodiment will be described with reference to FIG. 11. The signal processing apparatus 1100 illustrated in FIG. 11 also includes, as in the signal processing apparatuses described above with reference to FIGS. 7 and 9, two types of microphones, i.e., source separation microphones 1101 which are used for the source separation, and projection-back target microphones 1102 which are used only for the projection-back. Details of installed positions of those microphones will be described later. While the signal processing apparatus 1100 illustrated in FIG. 11 also includes, as in the apparatus 700 illustrated in FIG. 7, a control module for controlling various processing modules, the control module is omitted in FIG. 11.

Although a part or all of the source separation microphones 1101 used for the source separation may also be used as the projection-back target microphones, at least one microphone not used for the source separation is prepared to be dedicated for the projection-back targets.

The functions of AD-conversion and STFT modules 1103 and a clock supply module 1104 are the same as those of the AD-conversion and STFT modules and the clock supply module, which have been described above with reference to FIGS. 7 and 9

The functions of a source separation module 1105 and a signal projection-back module 1106 are also the same as those of the source separation module and the signal projection-back module, which have been described above with reference to FIGS. 7 and 9. However, the observation signals input to the signal projection-back module 1106 include, in addition to the observation signals observed by the microphones 1102 dedicated for the projection-back targets, the observation signal of one or more of the microphones 1101, which are used not only for the source separation, but also as the projection-back targets. (A practical example will be described later).

By using the processing results of the signal projection-back module, a DOA (or source position) estimation module 1108 estimates directions or positions corresponding to individual sound sources. Details of the estimation process will be described later. As a result of the estimation process, a DOA or source position 1109 is obtained.

A signal merging module 1110 is optional. The signal merging module 1110 merges the DOA (or the source position) 1109 and projection-back results 1107 obtained in the signal projection-back module 1106 with each other, thus producing correspondences between sources and a direction (or a position) from which the source arrives.

A microphone arrangement in the signal processing apparatus 1100 illustrated in FIG. 11, i.e., a microphone arrangement adapted for executing the process of projecting back the separation results obtained by the source separation and the process of executing the DOA estimation or the source position estimation in a combined manner in the signal processing apparatus 1100, will be described below with reference to FIG. 12.

Figure 6:
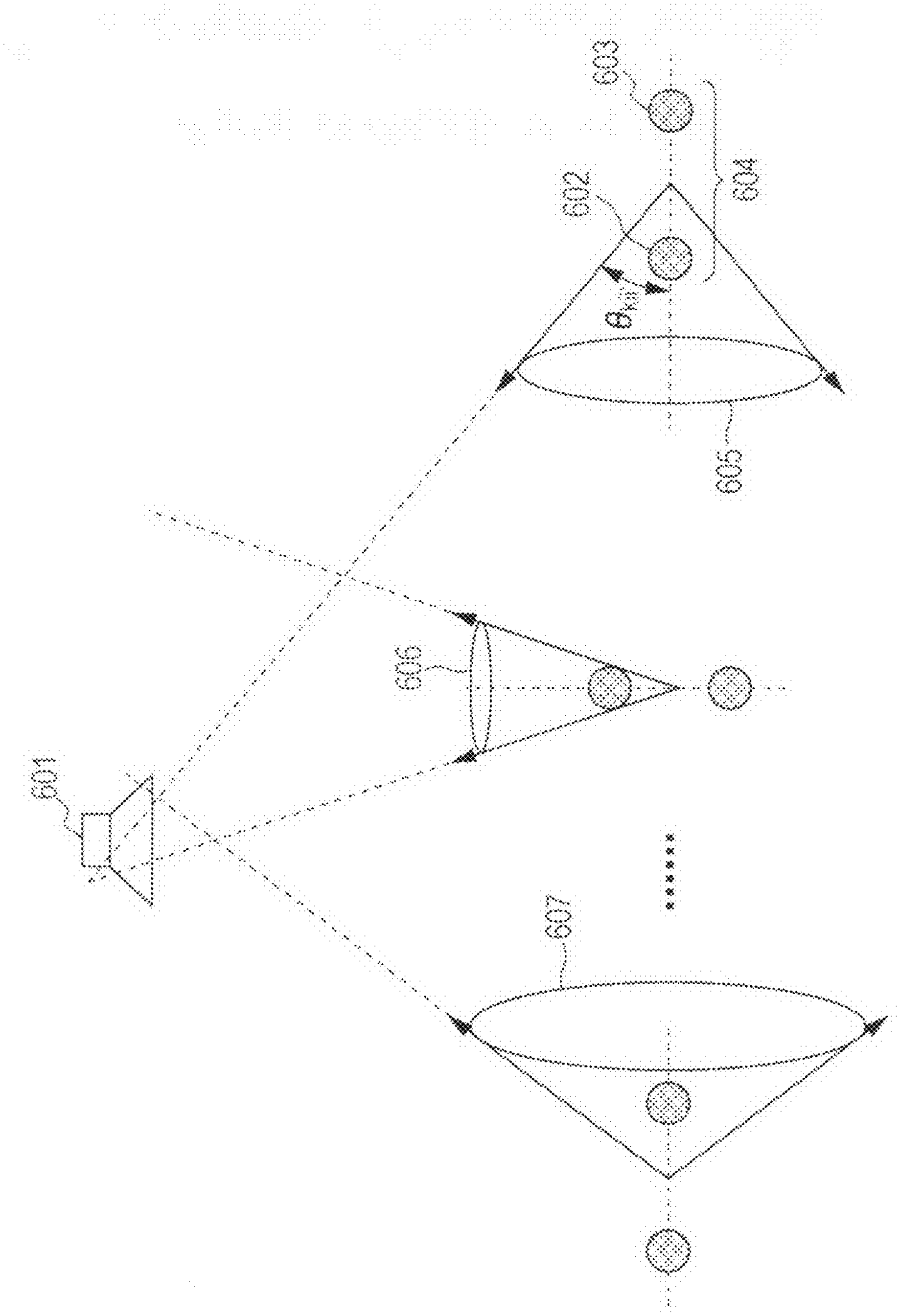
FIG. 6 is an illustration to explain source position estimation based on the principle of triangulation.

It is necessary that the microphone arrangement is set to be able to perform the DOA estimation or the source position estimation. Practically, the microphone arrangement is set to be able to estimate the source position based on the principle of triangulation described above with reference to FIG. 6.

Figure 12:
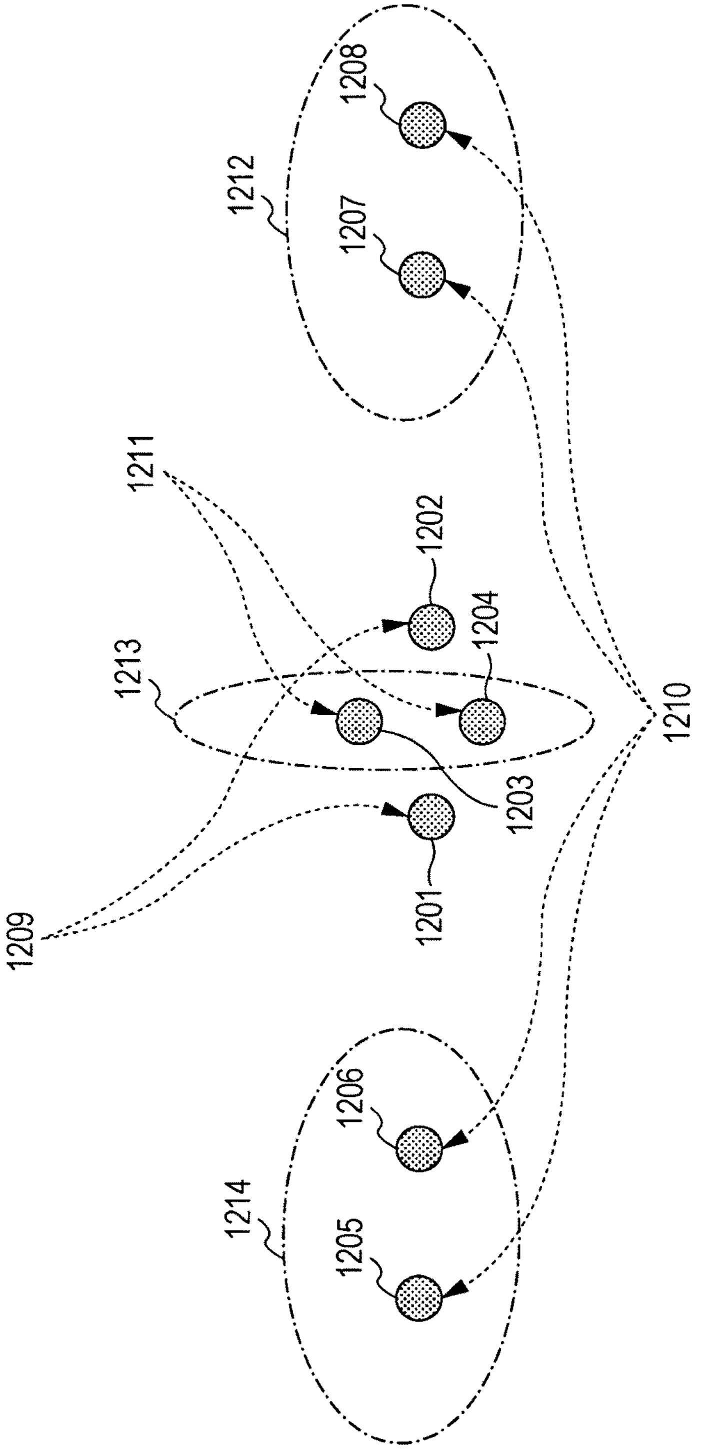
FIG. 12 is an illustration to explain one example of microphone arrangement corresponding to the configuration of the signal processing apparatus illustrated in FIG. 11.

FIG. 12 illustrates eight microphones 1 (denoted by 1201) to 8 (denoted by 1208). The microphone 1 (1201) and the microphone 2 (1202) are used only for the source separation process. The microphones 5 (1205) to 8 (1208) are set as the projection-back targets and are used only for the position estimation process. The remaining microphones 3 (1203) and the microphone 4 (1204) are used for both the source separation process and the position estimation process.

Stated another way, the source separation is performed by using the observation signals of the four microphones 1 (1201) to 4 (1204), and the separation results are projected back to the microphones 5 (1205) to 8 (1208).

Assuming that respective observation signals of the microphones 1 (1201) to 8 (1208) are $O_1(\omega,t)$ to $O_8(\omega,t)$, respectively, observation signals $X(\omega,t)$ for the source separation can be expressed by the following formula [10.2]. Also, observation signals for the projection-back can be expressed by the following formula [10.3]. Once $X(\omega,t)$ and $X'(\omega,t)$ are obtained, the projection-back can be then performed based on $X(\omega,t)$ and $X'(\omega,t)$ by using the above-mentioned formulae [7.1] to [7.11] in a similar manner to that in the case using separate microphones for the source separation and the projection-back.

$$O(\omega, t) = \begin{bmatrix} O_1(\omega, t) \\ \vdots \\ O_8(\omega, t) \end{bmatrix} \quad [10.1]$$

$$X(\omega, t) = \begin{bmatrix} X_1(\omega, t) \\ X_2(\omega, t) \\ X_3(\omega, t) \\ X_4(\omega, t) \end{bmatrix} = \begin{bmatrix} O_1(\omega, t) \\ O_2(\omega, t) \\ O_3(\omega, t) \\ O_4(\omega, t) \end{bmatrix} \quad [10.2]$$

-continued $$X'(\omega, t) = \begin{bmatrix} X'_1(\omega, t) \\ X'_2(\omega, t) \\ X'_3(\omega, t) \\ X'_4(\omega, t) \\ X'_5(\omega, t) \\ X'_6(\omega, t) \end{bmatrix} = \begin{bmatrix} O_3(\omega, t) \\ O_4(\omega, t) \\ O_5(\omega, t) \\ O_6(\omega, t) \\ O_7(\omega, t) \\ O_8(\omega, t) \end{bmatrix} \quad [10.3]$$

Figure 5:
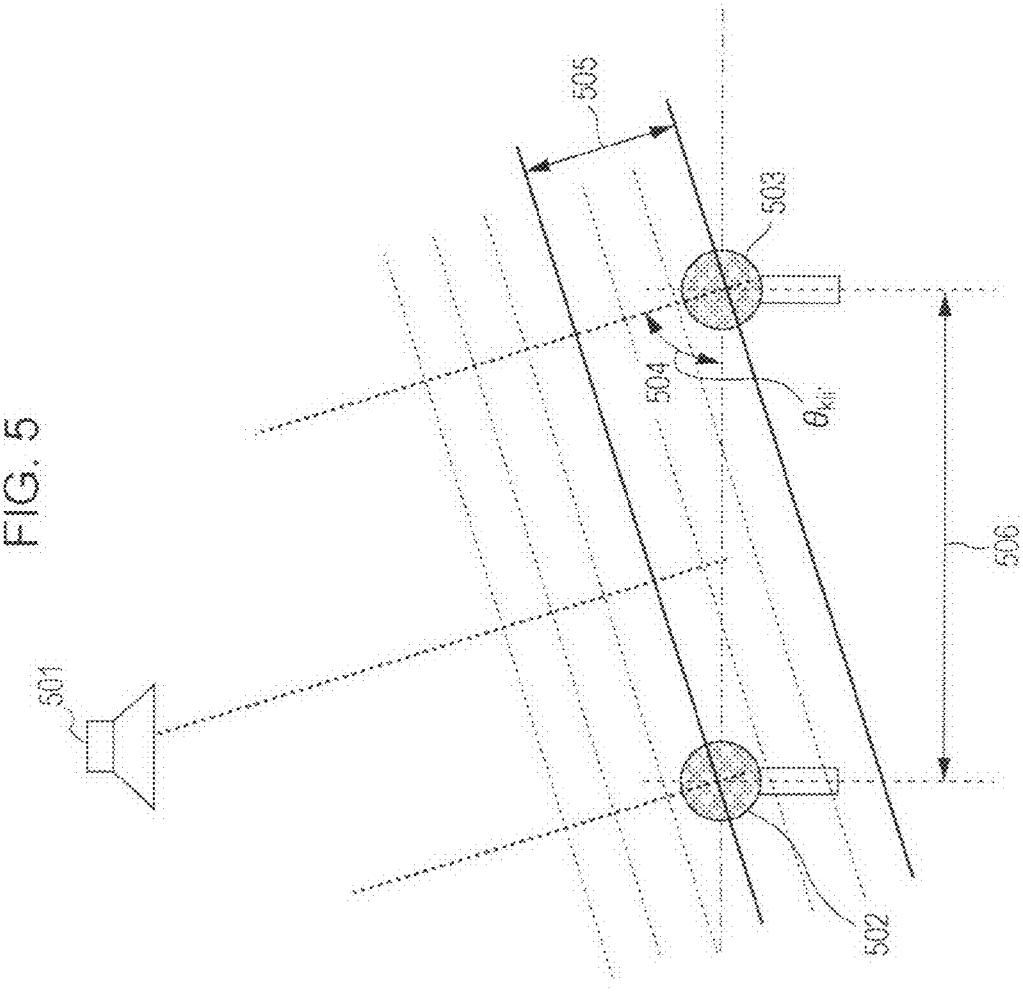
FIG. 5 is an illustration to explain a method of estimating the DOA (Direction of Arrival) after projecting a separation result of the ICA to individual microphones.

For example, three microphone pairs, i.e., a microphone pair 1 (denoted by 1212), a microphone pair 2 (denoted by 1213), and a microphone pair 3 (denoted by 1214), are set in the microphone arrangement illustrated in FIG. 12. By using the source separation results after the projection-back (i.e., the projection-back results) for the microphones constituting each microphone pair, the DOA (angle) can be determined in accordance with the processing described above with reference to FIG. 5.

In other words, microphone pairs are each constituted by two adjacent microphones, and the DOA is determined for each microphone pair. The DOA (or source position) estimation module 1108, illustrated in FIG. 11, receives the projection-back signals produced in the signal projection-back module 106 and executes a process of calculating the DOA based on the phase difference between the projection-back signals from the plural projection-back target microphones which are located at different positions.

As described above, the DOA $\theta_{kii'}$ can be determined by obtaining the phase difference between $Y_k^{[i]}(\omega,t)$ and $Y_k^{[i']}(\omega,t)$ which are the projection-back results. The relationship between $Y_k^{[i]}(\omega,t)$ and $Y_k^{[i']}(\omega,t)$, i.e., between the projection-back results, is expressed by the above-mentioned formula [5.1]. Formulae for calculating the phase difference are expressed by the above-mentioned formulae [5.2] and [5.3].

Further, the DOA (or source position) estimation module 1108 calculates the source position based on combined data regarding the DOA, which are calculated from the projection-back signals for the projection-back target microphones located at plural different positions. Such processing corresponds to a process of specifying the source position based on the principle of triangulation in a similar manner as described above with reference to FIG. 6.

With the setting illustrated in FIG. 12, the DOA (angle θ) can be determined for each of the three microphone pairs, i.e., the microphone pair 1 (1212), the microphone pair (1213), and the microphone pair 3 (1214). Next, as described above with reference to FIG. 6, a cone is set which has an apex positioned at a midpoint between the microphones of each pair and which has an apical angle half of which represents the DOA (θ). In the example of FIG. 12, three cones are set corresponding to the three microphone pairs. A point of intersection of those three cones can be determined as the source position.

Figure 11:
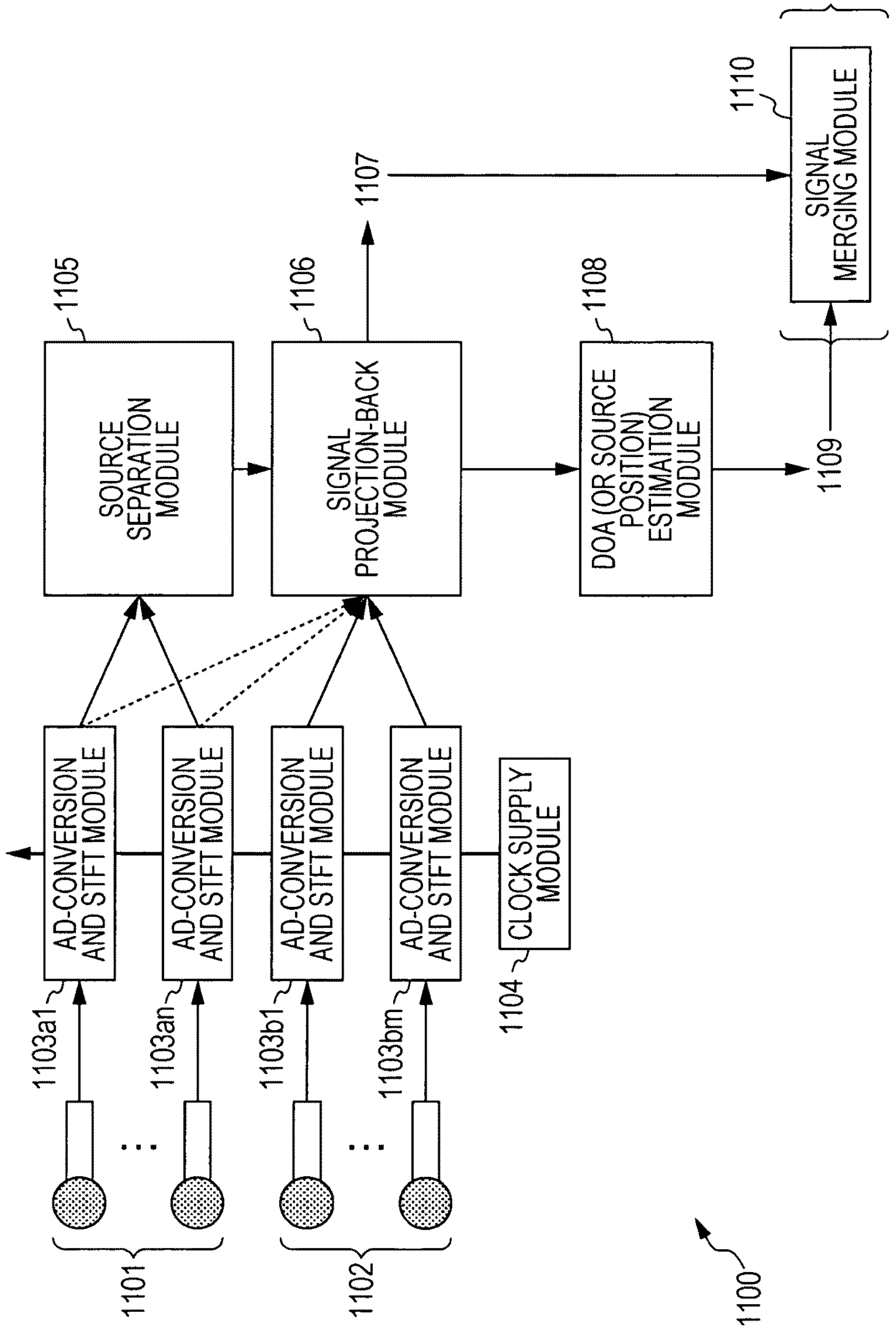
FIG. 11 is a block diagram illustrating the configuration of a signal processing apparatus according to a third embodiment of the present invention.
Figure 13:
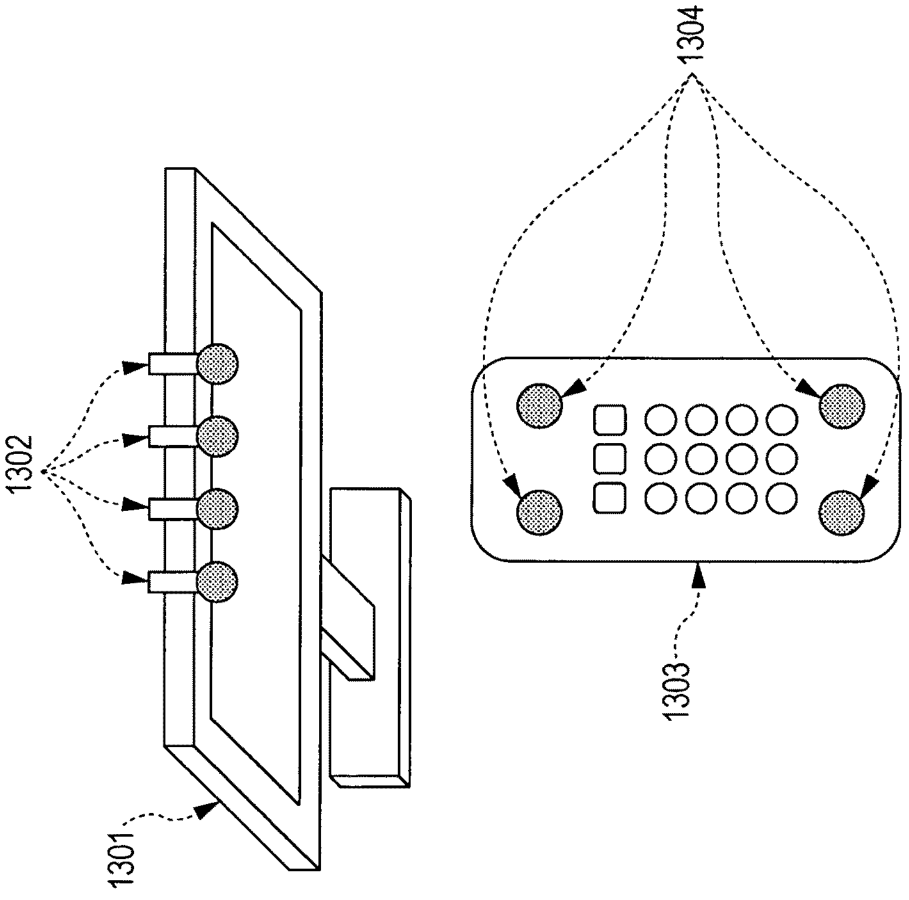
FIG. 13 is an illustration to explain another example of the microphone arrangement corresponding to the configuration of the signal processing apparatus illustrated in FIG. 11.

FIG. 13 illustrates another example of the microphone arrangement in the signal processing apparatus illustrated in FIG. 11, i.e., the signal processing apparatus for executing the source separation process, the projection-back process, and the DOA or source position estimation process. The microphone arrangement of FIG. 13 is to cope with the problem in the related art described above regarding "Microphone changing in its position".

Microphones 1302 and 1304 are disposed on a TV 1301 and a remote control 1303 operated by a user. The microphones 1304 on the remote control 1303 are used for the source operation. The microphones 1302 on the TV 1301 are used as the projection-back targets.

With the microphones 1304 disposed on the remote control 1303, sounds can be collected at a location near the user who speaks. However, precise positions of the microphones on the remote control 1303 are unknown. On the other hand, the microphones 1302 disposed on a frame of the TV 1301 are each known about its position with respect to one point on a TV housing (e.g., a screen center). However, the microphones 1302 are possibly far away from the user.

By executing the source separation based on the observation signals of the microphones 1304 on the remote control 1303 and projecting the separation results back to the microphones 1302 on the TV 1301, therefore, the separation results having respective advantages of both the kinds of microphones can be obtained. The results of the projection-back to the microphones 1302 on the TV 1301 are employed in estimating the DOA or the source position. In practice, assuming the case where utterance of the user having the remote control serve as a sound source, the position and the direction of the user having the remote control can be estimated.

In spite of using the microphones 1304 which are disposed on the remote control 1303 and of which positions are unknown, it is possible to, for example, change a response of the TV depending on whether the user having the remote control 1303 and uttering speech commands is positioned at the front or the side of the TV 1301 (such as making the TV responsive to only utterance coming from the front of the TV).

[6. Exemplary Configurations of Modules Constituting the Signal Processing Apparatuses According to the Embodiments of the Present Invention]

Details of the configuration and the processing of the source separation module and the signal projection-back module, which are in common to the signal processing apparatuses according to the embodiments, will be described below with reference to FIGS. 14 to 16.

Figure 14:
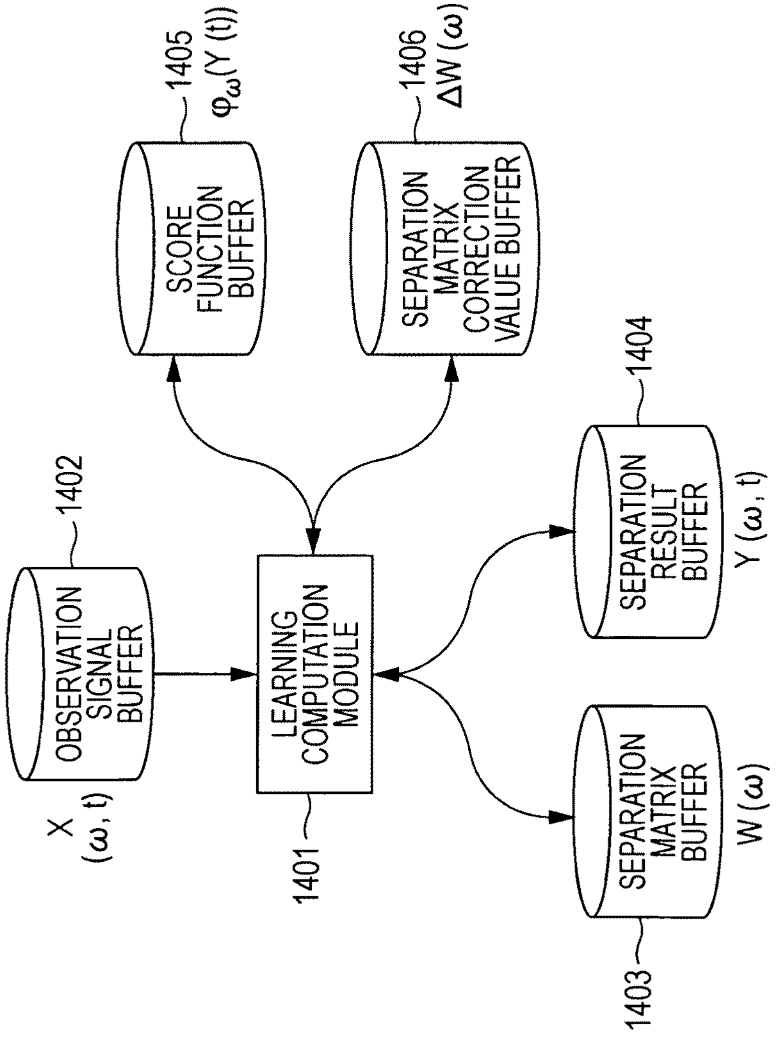
FIG. 14 illustrates one exemplary configuration of a source separation module.

FIG. 14 illustrates one exemplary configuration of the source separation module. Basically, the source separation module includes buffers 1402 to 1406 for storing data corresponding to variables and functions which are employed in the calculations based on the above-described formulae [3.1] to [3.9], i.e., on the learning rules of the ICA. A learning computation module 1401 executes the calculations using the stored values.

An observation signal buffer 1402 represents a buffer area for storing the observation signals in the time-frequency domain corresponding to the predetermined duration, and stores data corresponding to X(ω,t) in the above-described formula [3.1].

A separation matrix buffer 1403 and a separation result buffer 1404 represent areas for storing the separation matrix and the separation result during the learning, and store data corresponding to W(ω) and Y(a),t) in the formula [3.1], respectively.

Likewise, a score function buffer 1405 and a separation matrix correction value buffer 1406 store data corresponding to $\phi_W(Y(t))$ and ΔW(ω) in the formula [3.2], respectively.

In the various buffers prepared in the configuration of FIG. 14, values stored in those buffers are constantly changed while the learning loop is active, except for the observation signal buffer 1402.

Figure 15:
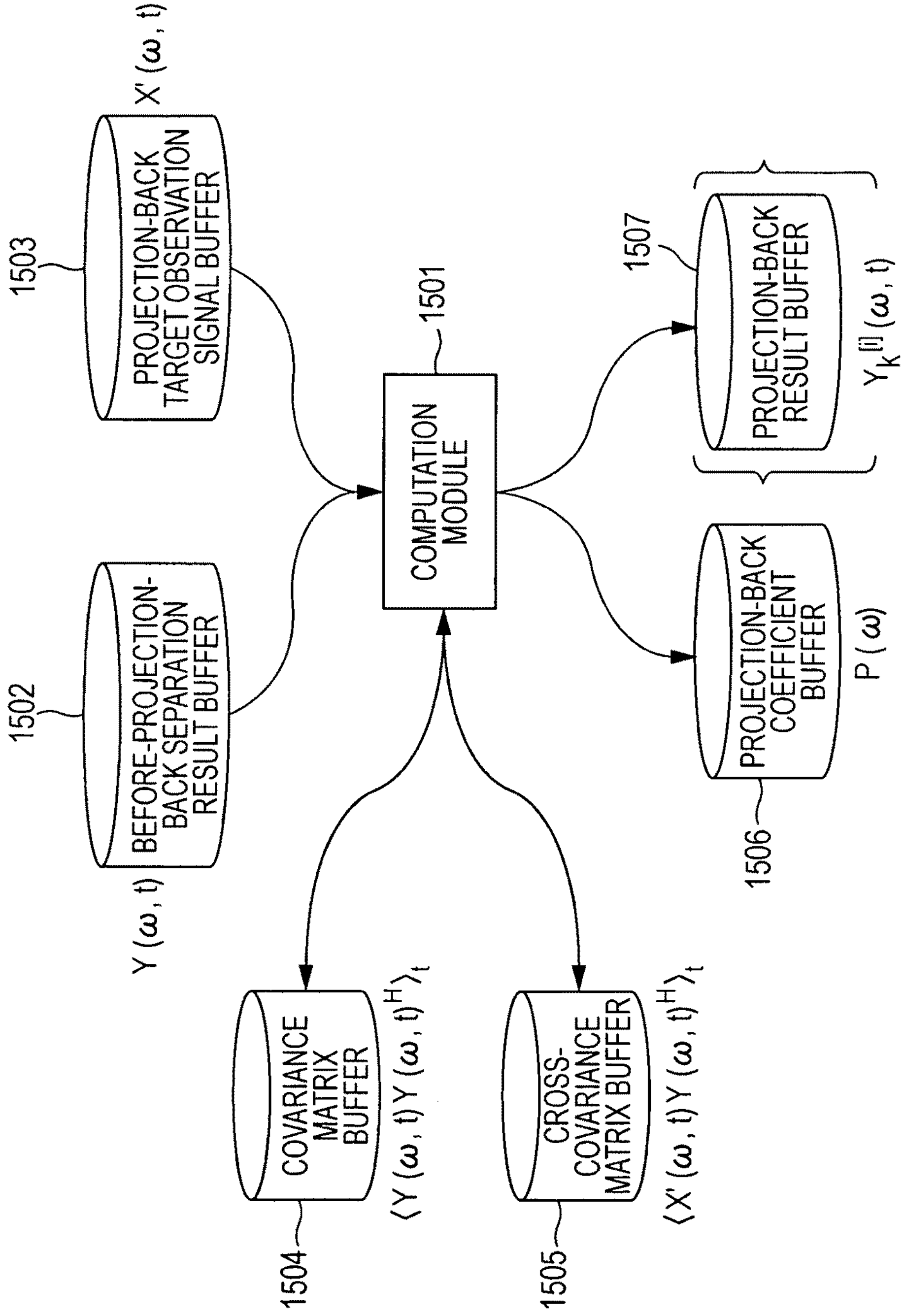
FIG. 15 illustrates one exemplary configuration of a signal projection-back module.
Figure 16:
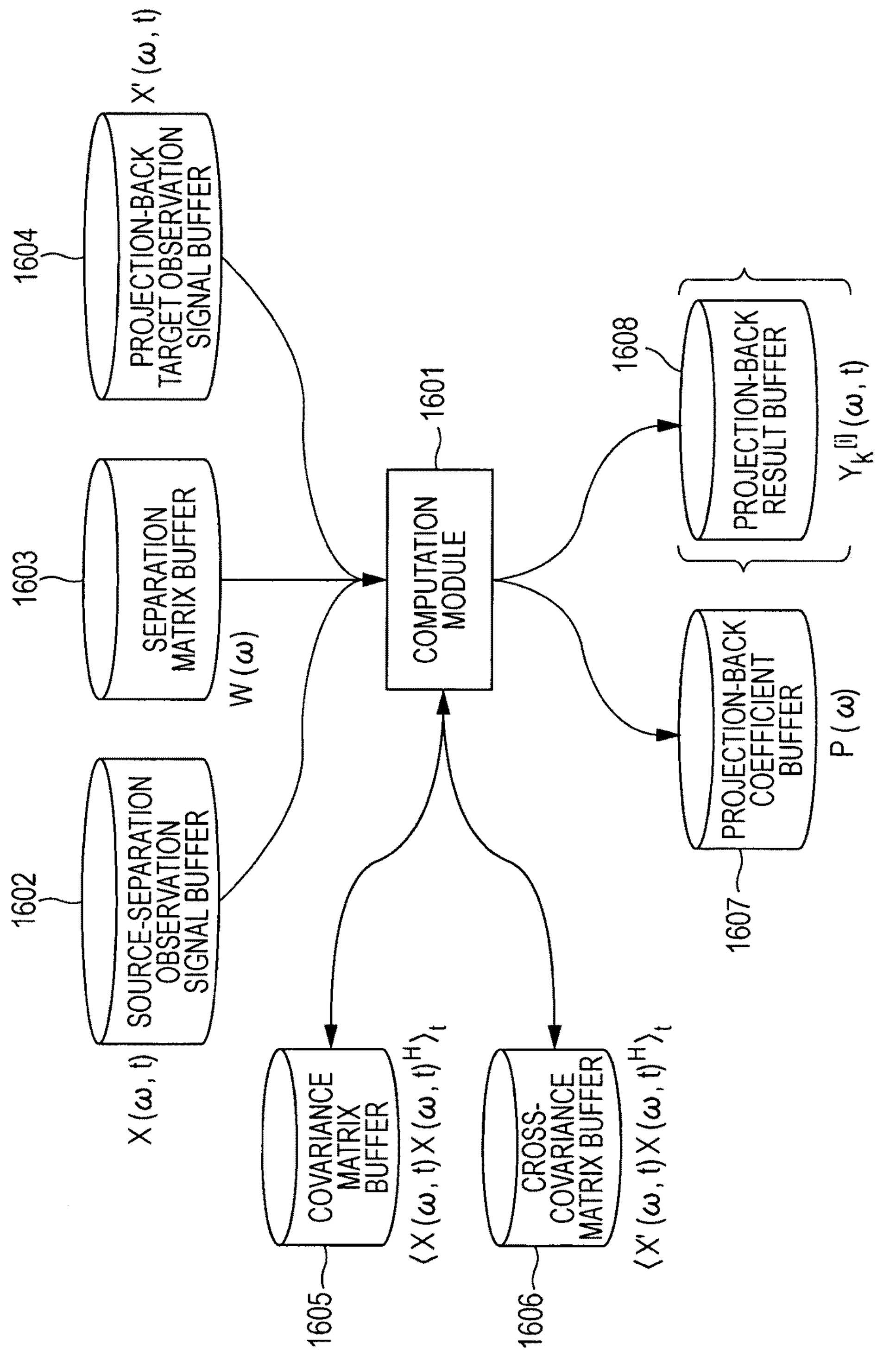
FIG. 16 illustrates another exemplary configuration of the signal projection-back module.

FIGS. 15 and 16 illustrate exemplary configurations of the signal projection-back module.

FIG. 15 illustrates the configuration corresponding to the case using the above-described formula [7.6] when the projection-back coefficient matrix P(ω) (see the formula [7.5]) is calculated, and FIG. 16 illustrates the configuration corresponding to the case using the above-described formula [7.7] when the projection-back coefficient matrix P(ω) (see the formula [7.5]) is calculated.

The exemplary configuration of the signal projection-back module, illustrated in FIG. 15, is first described. The signal projection-back module illustrated in FIG. 15 includes buffers 1502 to 1507 corresponding to the variables expressed in the formulae [7.6], [7.8] and [7.9], and a computation module 1501 executes computations by using values stored in those buffers.

A before-projection-back separation result buffer 1502 represents an area for storing the separation results output from the source separation module. Unlike the separation results stored in the separation result buffer 1504 of the source separation module illustrated in FIG. 14, the separation results stored in the before-projection-back separation result buffer 1502 of the signal projection-back module illustrated in FIG. 15 are values after the end of the learning.

A projection-back target observation signal buffer 1503 is a buffer for storing signals observed by the projection-back target microphones.

Two covariance matrices in the formula [7.6] are calculated by using those two buffers 1502 and 1503.

A covariance matrix buffer 1504 stores a covariance matrix of the separation results themselves before the projection-back, i.e., data corresponding to $\langle Y(\omega,t)Y(\omega,t)^H\rangle_t$ in the formula [7.6].

On the other hand, a cross-covariance matrix buffer 1505 stores a covariance matrix of the projection-back target observation signals X'(ω,t) and the separation results Y(ω,t) before the projection-back, i.e., data corresponding to $\langle X'(\omega,t)Y(\omega,t)^H\rangle_t$ in the formula [7.6]. Herein, a covariance matrix between different variables is called a "cross-covariance matrix", and a covariance matrix between the same variables is called simply a "covariance matrix".

A projection-back coefficient buffer 1506 represents an area for storing the projection-back coefficients P(ω) calculated based on the formula [7.6].

A projection-back result buffer 1507 stores the projection-back results $Y_k^{[l]}(\omega,t)$ calculated based on the formula [7.8] or [7.9].

Regarding the DOA estimation and the source position estimation, once the projection-back coefficients are determined, the DOA and the source position can be calculated without calculating the projection-back results themselves. Therefore, the projection-back result buffer 1507 can be omitted in ones of the embodiments of the present invention in which the DOA estimation or the source position estimation is executed in a combined manner.

Next, the exemplary configuration of the signal projection-back module, illustrated in FIG. 16, is described. The configuration of FIG. 16 differs from that of FIG. 15 in using the relationship of Y(ω,t)=W(ω)X(ω,t) (formula [2.5]). Thus, in the former, the buffer storing the separation result Y(ω,t) is omitted and a buffer storing the separation matrix W(ω,t) is prepared instead.

A source-separation observation signal buffer 1602 represents an area for storing the observation signals of the microphones for the source separation. This buffer 1602 may be used in common to the observation signal buffer 1402 of the source separation module, which has been described above with reference to FIG. 14.

A separation matrix buffer 1603 stores the separation matrix obtained with the learning in the source separation module. This buffer 1603 stores respective values of the separation matrix after the end of the learning unlike the separation matrix buffer 1403 of the source separation module, which has been described above with reference to FIG. 14.

A projection-back target observation signal buffer 1604 is a buffer for storing the signals observed by the projection-back target microphones, similarly to the projection-back target observation signal buffer 1503 described above with reference to FIG. 15.

Two covariance matrices in the formula [7.7] are calculated by using those two buffers 1603 and 1604.

A covariance matrix buffer 1605 stores covariance matrices of the separation results themselves used for the source separation, i.e., data corresponding to $<X(\omega,t)X(\omega,t)^H>_t$ in the formula [7.7].

On the other hand, a cross-covariance matrix buffer 1606 stores covariance matrices of the projection-back target observation signals X'(ω,t) and the separation results X(ω,t) used for the source separation, i.e., data corresponding to $<X'(\omega,t)X(\omega,t)^H>_t$ in the formula [7.7].

A projection-back coefficient buffer 1607 represents an area for storing the projection-back coefficients P(ω) calculated based on the formula [7.7].

A projection-back result buffer 1608 stores, similarly to the projection-back result buffer 1507 described above with reference to FIG. 15, the projection-back results $Y_k^{[i]}(\omega,t)$ calculated based on the formula [7.8] or [7.9].

[7. Processing Sequences Executed in the Signal Processing Apparatuses]

Processing sequences executed in the signal processing apparatuses according to the embodiments of the present invention will be described below with reference to flowcharts illustrated in FIGS. 17 to 20.

Figure 17:
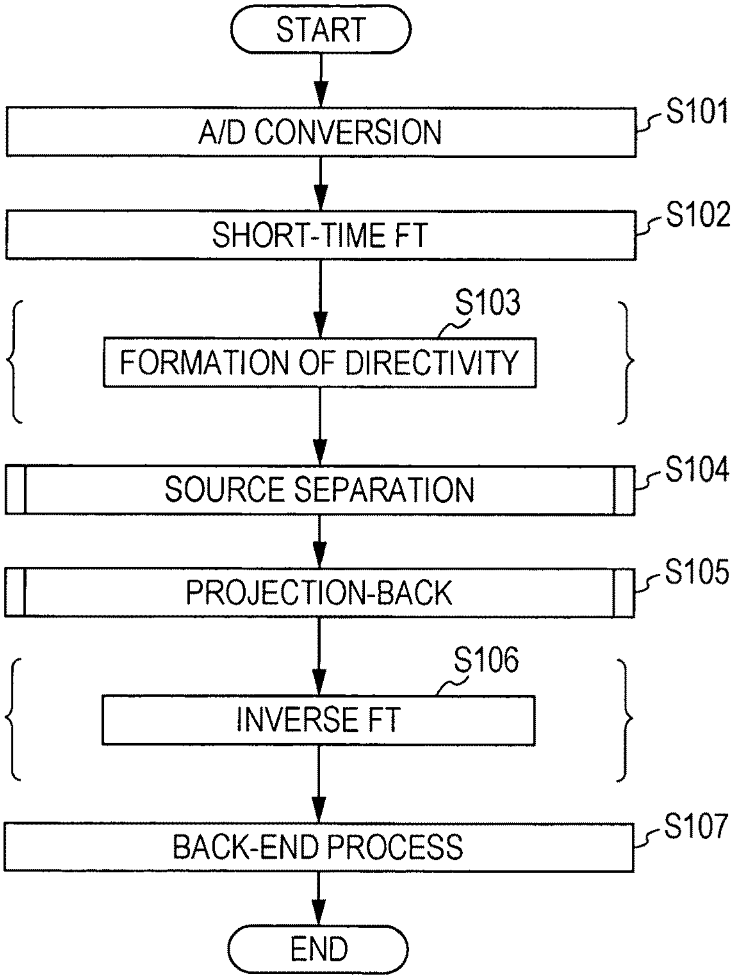
FIG. 17 is a flowchart to explain a processing sequence when a projection-back process for projection-back target microphones is executed by employing separation results based on data obtained by microphones for source separation.

FIG. 17 is a flowchart to explain a processing sequence when the projection-back process for the projection-back target microphones is executed by employing the separation results based on data obtained by the microphones for the source separation. The flowchart of FIG. 17 is to explain, for example, processing executed in an apparatus (corresponding to the signal processing apparatus 700 illustrated in FIG. 7 and the signal processing apparatus 900 illustrated in FIG. 9) in which the source separation results from the directional microphones (or the virtual directional microphones) are projected back to the omnidirectional microphones.

In step S101, AD conversion is performed on the signal collected by each microphone (or each sound collection device). Then, in step S102, the short-time Fourier transform (STFT) is performed on each signal for conversion to a signal in the time-frequency domain.

A directivity forming process in next step S103 is a process necessary in the configuration where virtual directivity is formed by using a plurality of omnidirectional microphones as described above with reference to FIG. 10. In the configuration where the plurality of omnidirectional microphones are arranged as illustrated in FIG. 10, for example, the observation signals of the virtual directional microphones are produced in accordance with the above-described formulae [9.1] to [9.4]. In the configuration where the directional microphones are originally (actually) used as illustrated in FIG. 8, the directivity forming process in step S103 can be dispensed with.

In a source separation process of step S104, independent separations results are obtained by applying the ICA to the observation signals in the time-frequency domain, which are obtained by the directional microphones. Details of the source separation process in step S104 will be described later.

In step S105, a process of projecting the separation results obtained in step S104 back to predetermined microphones is executed. Details of the projection-back process in step S105 will be described later.

After the results of the projection-back to the microphones are obtained, the inverse Fourier transform, etc. (step S106) and a back-end process (step S107) are executed if necessary. The entire processing is thus completed.

Figure 18:
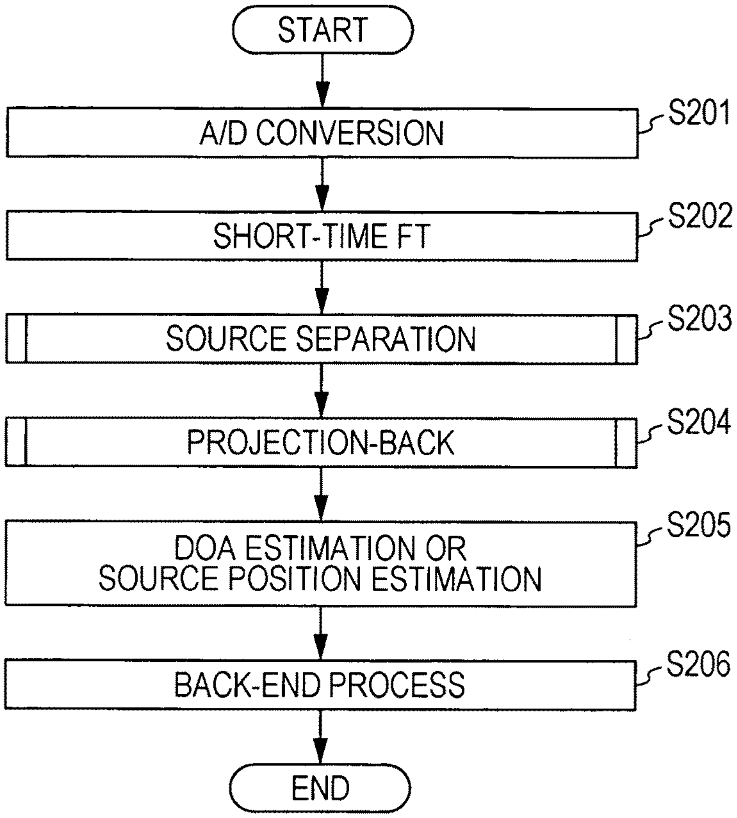
FIG. 18 is a flowchart to explain a processing sequence when the projection-back of the separation results and the DOA estimation (or the source position estimation) are performed in a combined manner.

A processing sequence executed in the signal processing apparatus (corresponding to the signal processing apparatus 1100 illustrated in FIG. 11) in which the projection-back of the separation results and the DOA estimation (or the source position estimation) are performed in a combined manner will be described below with reference to a flowchart of FIG. 18.

Processes in steps S201, S202 and S203 are the same as those in steps S101, S102 and S104 in the flow of FIG. 17, respectively, and hence a description of those steps is omitted.

A projection-back process in step S204 is a process of projecting the separation results to the microphones as the projection-back targets. In this process of step S204, similarly to the projection-back process in step S105 in the flow of FIG. 17, the projection-back of the separation results obtained in step S203 to the predetermined microphones is executed.

Although the projection-back process is executed in the above-described processing sequence, the actual projection-back process of the separation results may be omitted just by calculating the projection-back coefficients (i.e., the projection-back coefficient matrix P(ω) expressed in the above-described formula [7.6], [7.7], [8.1] or [8.2]).

Step S205 is a process of calculating the DOA or the source position based on the separation results having been projected back to the microphones. A calculation method executed in this step is itself similar to that used in the related art, and hence the calculation method is briefly described below.

It is assumed that the DOA (angle) calculated for the k-th separation result $Y_k(\omega,t)$ with respect to two microphones i and i' is $\theta_{kii'}(\omega)$. Herein, i and i' are indices assigned to the microphones (or the sound collection devices) which are used as the projection-back targets, except for the microphones used for the source separation. The angle $\theta_{kii'}(\omega)$ is calculated based on the following formula [11.1].

$$\theta_{kii'}(\omega) = \operatorname{acos}\left(\frac{(M-1)C}{\pi(\omega-1)d_{ii'}F}\operatorname{angle}\left(Y_k^{[i]}(\ ,t)\overline{Y_k^{[i']}(\ ,t)}\right)\right) \quad [11.1]$$

$$= \operatorname{acos}\left(\frac{(M-1)C}{\pi(\omega-1)d_{ii'}F}\operatorname{angle}\left(P_{ik}(\ )\overline{P_{i'k}(\ )}\right)\right) \quad [11.2]$$

The formula [11.1] is the same as the formula [5.3] described above regarding the related-art method in "DESCRIPTION OF THE RELATED ART". Also, by employing the above-described formula [7.8], the DOA can be directly calculated from the elements of the projection-back coefficients P(ω) (see a formula [11.2]) without producing the separation results $Y_k^{[i]}(\omega,t)$ after the projection-back. In the case employing the formula [11.2], the processing sequence may include a step of determining just the projection-back coefficients P(ω) while omitting the projection-back of the separation result, which is executed in the projection-back step (S204).

When determining the angle $\theta_{kii'}(\omega)$ that indicates the DOA calculated with respect to the two microphones i and i', it is also possible to calculate individual angles $\theta_{kii'}(\omega)$ in units of the frequency bin (ω) or the microphone pair (each pair of i and i'), to obtain a mean value of the plural calculated angles, and to determine the eventual DOA based on the mean value. Further, the source position can be determined based on the principle of triangulation as described above with reference to FIG. 6.

After the process of step S205, a back-end process (S206) is executed if necessary.

Additionally, the DOA (or source position) estimation module 1108 of the signal processing apparatus 1100, illustrated in FIG. 11, can also calculate the DOA or the source position by using the formula [11.2]. Stated another way, the DOA (or source position) estimation module 1108 may receive the projection-back coefficients produced in the signal projection-back module 1106 and execute the process of calculating the DOA or the source position. In such a case, the signal projection-back module 1106 executes the process of calculating just the projection-back coefficients with omission of the process of obtaining the projection-back results (i.e., the projection-back signals).

Figure 19:
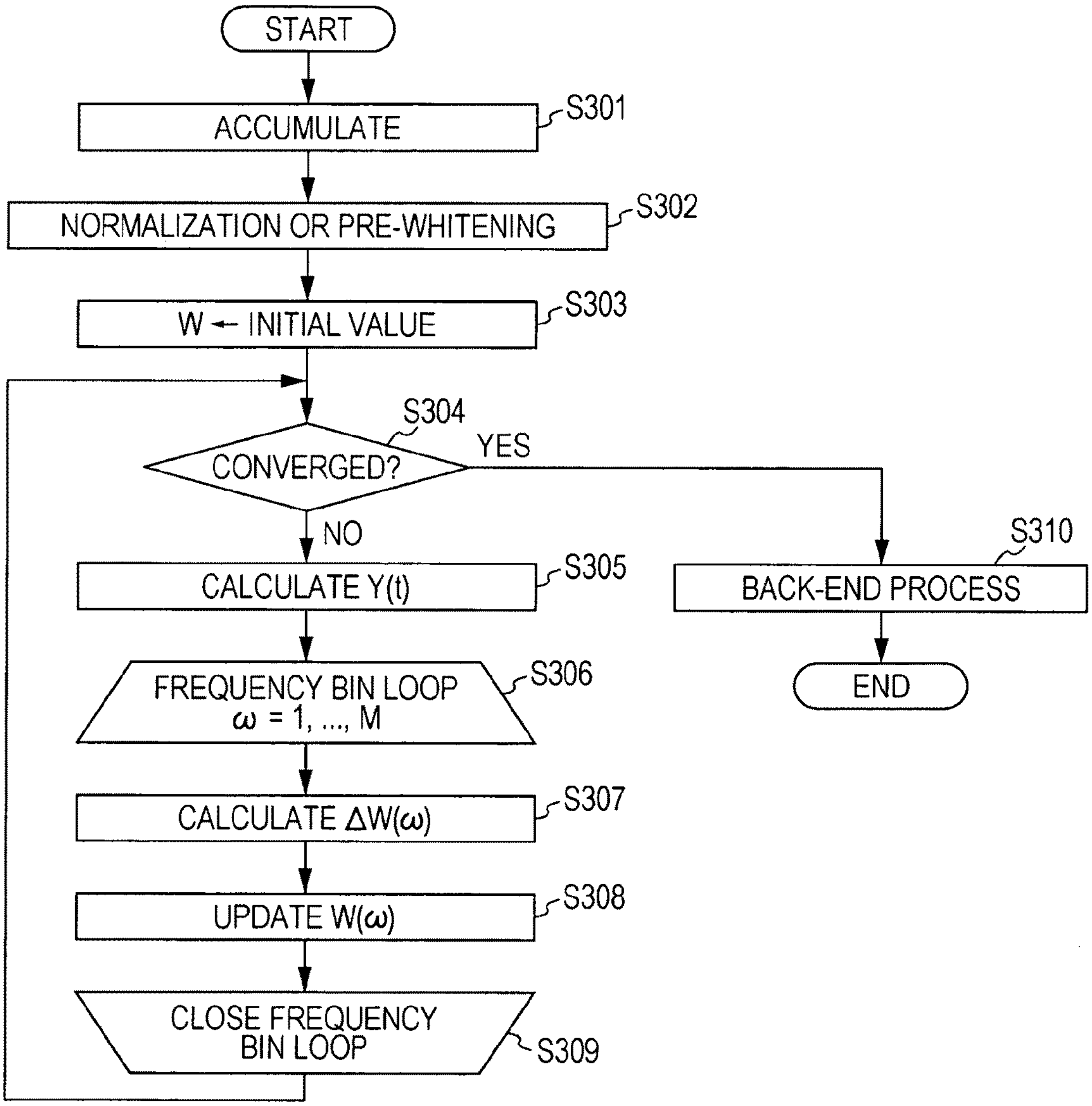
FIG. 19 is a flowchart to explain a sequence of source separation process.

Details of the source separation process executed in step S104 of the flow illustrated in FIG. 17 and step S203 of the flow illustrated in FIG. 18 will be described below with reference to a flowchart illustrated in FIG. 19.

The source separation process is a process of separating mixture signals including signals from a plurality of sound sources into individual signals each per sound source. The source separation process can be executed by using various algorithms. A processing example using the method disclosed in Japanese Unexamined Patent Application Publication No. 2006-238409 will be described below.

In the source separation process described below, the separation matrix is determined through a batch process (i.e., a process of executing the source separation after storing the observation signals for a certain time). As described above in connection with the formula [2.5], etc., the relationship among the separation matrix W(ω), the observation signals X(ω,t), and the separation results Y(ω,t) is expressed by the following formula:

$$Y(\omega,t)=W(\omega)X(\omega,t)$$

A sequence of the source separation process is described with reference to a flowchart illustrated in FIG. 19.

In first step S301, the observation signals are stored for a certain time. Herein, the observation signals are signals obtained after executing a short-time Fourier transform process on signals collected by the source separation microphones. Also, the observation signals stored for the certain time are equivalent to a spectrogram made up of a certain number of successive frames (e.g., 200 frames). A "process for all the frames", referred to in the following description, implies a process for all the frames of the observation signals stored in step S301.

Prior to entering a learning loop of steps S304 to S309, a process including normalization, pre-whitening (decorrelation), etc. is executed on the accumulated observation signals in step S302, if necessary. For example, the normalization is performed by determining standard deviation of the observation signals $X_k(\omega,t)$ over frames, obtaining a diagonal matrix S(ω) made up of reciprocals of the standard deviations, and calculating Z(ω,t) as follows:

$$Z(\omega,t)=S(\omega)X(\omega,t)$$

In the pre-whitening, Z(ω,t) and S(ω) are determined such that:

$$Z(\omega,t)=S(\omega)X(\omega,t) \text{ and}$$

$$\langle Z(\omega,t)Z(\omega,t)^H\rangle_t=I \; (I\text{; identity matrix})$$

In the above formula, t is the frame index and $\langle\bullet\rangle_t$ represents a mean over all the frames or sample frames.

It is assumed that X(t) and X(ω,t) in the following description and formulae are replaceable with Z(t) and Z(ω,t) calculated in the above-described pre-processing.

After the pre-processing in step S302, an initial value is substituted into the separation matrix W in step S303. The initial value may be the identity matrix. If there is a value determined in the previous learning, the determined value may be used as an initial value for the current learning.

Steps S304 to S309 represent a learning loop in which those steps are iterated until the separation matrix W is converged. A convergence determination process in step S304 is to determine whether the separation matrix W has been converged. The convergence determination process can be practiced, for example, as a method of obtaining similarity between an increment ΔW of the separation matrix W and the zero matrix, and determining that the separation matrix W has been "converged", if the similarity is smaller than a predetermined value. As an alternative, the convergence determination process may be practiced by setting a maximum number of iteration times (e.g., 50) for the learning loop in advance, and determining that the separation matrix W has been "converged", when loop iterations reaches the maximum number of times.

If the separation matrix W is not yet converged (or if the number of times of the loop iterations does not yet reach the predetermined value), the learning loop of steps S304 to S309 is further executed iteratively. Thus, the learning loop is a process of iteratively executing the calculations based on the above-described formulae [3.1] to [3.3] until the separation matrix W is converged.

In step S305, the separation results Y(t) for all the frames are obtained by using the above-described formula [3.12].

Steps S306 to S309 correspond to a loop with respect to the frequency bin ω.

In step S307, ΔW(ω), i.e., a correction value of the separation matrix is calculated based on the formula [3.2], and in step S308, the separation matrix W(ω) is updated based on the formula [3.3]. Those two processes are executed for all the frequency bins.

On the other hand, if it is determined in step S304 that the separation matrix W has been converged, the flow advances to a back-end process of step S310. In the back-end process of step S310, the separation matrix W is made correspond to the observation signals before the normalization (or the pre-whitening). Stated another way, when the normalization or the pre-whitening has been executed in step S302, the separation matrix W obtained through steps S304 to S309 is to separate Z(t), i.e., the observation signals after the normalization (or the pre-whitening), and is not to separate X(t), i.e., the observation signals before the normalization (or the pre-whitening). Accordingly, a correction of:

$$W \leftarrow SW$$

is performed such that the separation matrix W is made correspond to the observation signals (X) before the preprocessing. The separation matrix used in the projection-back process is the separation matrix obtained after such a correction.

Many of the algorithms used for the ICA in the time-frequency domain necessitate rescaling (i.e., a process of adjusting the scales of the separation results to proper ones in individual frequency bins) after the learning. In the configurations of the embodiments of the present invention, however, rescaling during the source separation process is not necessary because the rescaling process for the separation results is executed in the projection-back process that is executed by using the separation results.

The source separation process can further be executed by utilizing a real-time method based on a block batch process, which is disclosed in Japanese Unexamined Patent Application Publication No. 2008-147920, in addition to the batch process disclosed in the above-cited Japanese Unexamined Patent Application Publication No. 2006-238409. The term "block batch process" implies a process of dividing the observation signals into blocks in units of a certain time, and executing the learning of the separation matrix per block based on the batch process. The separation results Y(t) can be produced without interruption by, once the learning of the separation matrix has been completed in some block, continuously applying that separation matrix during a period until a timing at which the learning of the separation matrix is completed in the next block.

Details of the projection-back process executed in step S105 of the flow illustrated in FIG. 17 and step S204 of the flow illustrated in FIG. 18 will be described below with reference to a flowchart illustrated in FIG. 20.

As described above, projecting the separation results of the ICA back to microphones implies a process of analyzing sound signals collected by the microphones each set at a certain position and determining, from the collected sound signals, components attributable to individual source signals. The projection-back process is executed by employing the separation results calculated in the source separation process. Respective processes executed in steps of the flowchart illustrated in FIG. 20 will be described.

In step S401, two types of covariance matrices are calculated which are employed to calculate the matrix P(ω) (see the formula [7.5]) made up of the projection-back coefficients.

The projection-back coefficient matrix P(ω) can be calculated based on the formula [7.6], as described above. The projection-back coefficient matrix P(ω) can also be calculated based on the formula [7.7] that is modified by using the above-described relationship of the formula [3.1].

As described above, the signal projection-back module has the configuration illustrated in FIG. 15 or 16. FIG. 15 represents the configuration of the signal projection-back module which employs the formula [7.6] in the process of calculating the projection-back coefficient matrix P(ω) (see the formula [7.5]), and FIG. 16 represents the configuration of the signal projection-back module which employs the formula [7.7] in the process of calculating the projection-back coefficient matrix P(ω).

Accordingly, when the signal projection-back module in the signal processing apparatus has the configuration illustrated in FIG. 15, the projection-back coefficient matrix P(ω) (see the formula [7.5]) is calculated by employing the formula [7.6], and the following two types of covariance matrices are calculated in step S401:

$<X'(\omega,t)Y(\omega,t)>_t$ and $<Y(\omega,t)Y(\omega,t)>_t$

Namely, the covariance matrices expressed in the formula (7.6) are calculated.

On the other hand, when the signal projection-back module in the signal processing apparatus has the configuration illustrated in FIG. 16, the projection-back coefficient matrix P(ω) (see the formula [7.5]) is calculated by employing the formula [7.7], and the following two types of covariance matrices are calculated in step S401:

$<X'(\omega,t)X(\omega,t)>_t$ and $<X(\omega,t)X(\omega,t)>_t$

Namely, the covariance matrices expressed in the formula (7.7) are calculated.

Then, the projection-back coefficient matrix P(ω) is obtained in step S402 by using the formula [7.6] or the formula [7.7].

In a channel selection process of next step S403, a channel adapted for the object is selected from among the separation results. For example, one channel corresponding to a particular sound source is only selected, or a channel not corresponding to any sound sources is removed. The "channel not corresponding to any sound sources" implies a situation that, when the number of sound sources is smaller than the number of microphones used for the source separation, the separation results $Y_1$ to $Y_n$ necessarily include one or more output channels not corresponding to any sound sources. Since a process of executing the projection-back and determining the DOA (or the source position) on those output channels is wasteful, those output channels are removed in response to the necessity.

The criterion for the selection can be provided, for example, as a power (variance) of the separation results after the projection-back. Assuming that a result of projecting the separation result $Y_i(\omega,t)$ back to the k-th microphone (for the projection-back) is $Y_i^{[k]}(\omega,t)$, the power of the projection-back result can be calculated by using the following formula [12.1]:

$$\left\langle Y_i^{[k]}(\omega,t)|^2 \right\rangle_t \quad [12.1]$$

$$W^{[k]}(\omega)\left\langle X(\omega,t)X(\omega,t)^H \right\rangle_t W^{[k]}(\omega)^H \quad [12.2]$$

If a value of the power calculated by using the formula [12.1] on the separation result after the projection-back is larger than a preset certain value, it is determined that "the separation result $Y_i(\omega,t)$ is the separation result corresponding to a particular sound source". If the value is smaller than the preset certain value, it is determined that "the separation result $Y_i(\omega,t)$ does not correspond to any sound sources".

In actual calculation, it is not necessary to execute a process of calculating $Y_i^{[k]}(\omega,t)$, i.e., data resulting from projecting $Y_i(\omega,t)$ back to the k-th microphone (for the projection-back). Hence, such a calculation process can be omitted. The reason is that the covariance matrix corresponding to the vector expressed by the formula [7.9] can be calculated based on the formula [12.2], and that the same value as $Y_i^{[k]}(\omega,t)|^2$, i.e., square data of absolute values of the projection-back result, can be obtained by taking out diagonal elements of the matrix.

After the end of the channel selection, the projection-back results are produced in step S404. When the separation results for all the selected channels are projected back to one microphone, the formula [7.9] is used. Conversely, when the separation result for one channel is projected back to all the microphones, the formula [7.8] is used. Be it noted that, if the DOA estimation (or the source position estimation) is executed in a subsequent process, the process of producing the projection-back results in step S404 can be omitted.

[8. Signal Processing Apparatuses According to Other Embodiments of the Present Invention]

(8.1 Embodiment in which Calculation of an Inverse Matrix is Omitted in the Process of Calculating the Projection-Back Coefficient Matrix P(ω) in the Signal Projection-Back Module)

The following description is first made about the embodiment in which calculation of an inverse matrix is omitted in the process of calculating the projection-back coefficient matrix P(ω) in the signal projection-back module.

Figure 20:
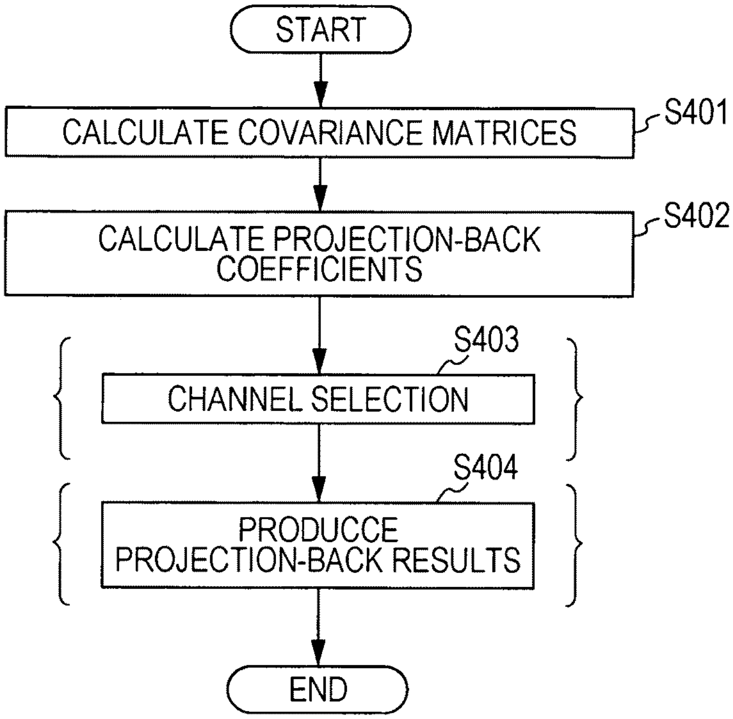
FIG. 20 is a flowchart to explain a sequence of projection-back process.

As described above, the processing in the signal projection-back module illustrated in FIG. 15 or 16 is executed in accordance with the flowchart of FIG. 20. In step S401 of the flowchart illustrated in FIG. 20, two types of covariance matrices are calculated which are employed to calculate the matrix P(ω) (see the formula [7.5]) made up of the projection-back coefficients.

More specifically, when the signal projection-back module has the configuration illustrated in FIG. 15, the projection-back coefficient matrix P(ω) (see the formula [7.5]) is calculated by employing the formula [7.6], and the following two types of covariance matrices are calculated:

$\langle X'(\omega,t)Y(\omega,t)\rangle_t$ and $\langle Y(\omega,t)Y(\omega,t)\rangle_t$ On the other hand, when the signal projection-back module has the configuration illustrated in FIG. 16, the projection-back coefficient matrix P(ω) (see the formula [7.5]) is calculated by employing the formula [7.7], and the following two types of covariance matrices are calculated:

$\langle X'(\omega,t)X(\omega,t)\rangle_t$ and $\langle X(\omega,t)X(\omega,t)\rangle_t$ Namely, the covariance matrices expressed in the formula (7.6) or (7.7) are calculated, respectively.

Each of the formulae [7.6] and [7.7] for calculating the projection-back coefficient matrix P(ω) includes an inverse matrix (strictly speaking, an inverse matrix of a full matrix). However, a process of calculating the inverse matrix necessitates a considerable computational cost (or a considerably large circuit scale when the inverse matrix is obtained with hardware). For that reason, if an equivalent process can be performed without using the inverse matrix, it is more desired.

A method of executing the equivalent process without using the inverse matrix will be described below as a modification.

As discussed in brief above, the following formula [8.1] can be used instead of the formula [7.6]:

$$P(\omega) = \langle X'(\omega,t)Y(\omega,t)^H\rangle_t \mathrm{diag}(\langle|Y_1(\omega,t)|^2\rangle_t, \ldots, \langle|Y_n(\omega,t)|^2\rangle_t)^{-1} \quad [8.1]$$

$$= \langle X'(\omega,t)X(\omega,t)^H\rangle W(\omega)^H \mathrm{diag}(W(\omega)\langle X(\omega,t)X(\omega,t)^H\rangle_t W(\omega)^H)^{-1} \quad [8.2]$$

$$P(\omega) = \langle X'(\omega,t)Y(\omega,t)^H\rangle_t \quad [8.3]$$

$$= \langle X'(\omega,t)X(\omega,t)^H\rangle W(\omega)_t^H \quad [8.4]$$

When individual elements of the separation result vector Y (ω,t) are independent of one another, i.e., when the separation is completely performed, the covariance matrix $\langle Y(\omega,t)Y(\omega,t)^H\rangle_t$ becomes a matrix close to a diagonal matrix.

Accordingly, the substantially same matrix as the above covariance matrix is obtained even by extracting only diagonal elements of the latter. Because the inverse matrix of the diagonal matrix can be obtained just by replacing the diagonal elements with their reciprocal numbers thereof, the computational cost necessary for calculating the inverse matrix of the diagonal matrix is smaller than that necessary for calculating the inverse matrix of the full matrix.

Similarly, the foregoing formula [8.2] can be used instead of the formula [7.7]. Note that diag(•) in the formula [8.2] represents an operation for making zero all other elements than diagonal elements of a matrix expressed inside the parenthesis. In the formula [8.2], therefore, the inverse matrix of the diagonal matrix can also be obtained just by replacing the diagonal elements with their reciprocal numbers thereof.

Further, when the separation results after the projection-back or the projection-back coefficients are used only for the DOA estimation (or the source position estimation), the foregoing formula [8.3] (instead of the formula [7.6]) or the foregoing formula [8.4] (instead of the formula [7.7]), each of which does not include even a diagonal matrix, can also be used. The reason is that elements of the diagonal matrices expressed in the formula [8.1] or [8.2] are all real numbers and the DOA calculated by using the formula [11.1] or [11.2] is not affected so long as any real number is multiplied.

Thus, by utilizing the formulae [8.1] to [8.4] instead of the above-described formulae [7.6] and [7.7], the process of calculating the inverse matrix of the full diagonal matrix, which entails a higher computational cost, can be omitted and the projection-back coefficient matrix P(ω) can be calculated more efficiently.

(8.2 Embodiment which Executes a Process of Projecting the Separation Results Obtained by the Source Separation Process Back to Microphones in a Particular Arrangement (Fourth Embodiment)

An embodiment which executes a process of projecting the separation results obtained by the source separation process back to microphones in a particular arrangement will be described below.

In the foregoing, the three embodiments, listed below, have been described as applications of the projection-back process which employs the separation results obtained by the source separation process:

[3. Processing example of the projection-back process to microphones differing from ICA-adapted microphones (first embodiment)]

[4. Embodiment in which a virtual directional microphone is constituted by using a plurality of omnidirectional microphones (second embodiment)]

[5. Processing example in which the projection-back process for the separation results of the source separation process and the DOA estimation or the source position estimation are executed in a combined manner (third embodiment)]

Stated another way, the first and second embodiments represent the processing examples in which the source separation results obtained by the directional microphones are projected back to the omnidirectional microphones.

The third embodiment represents the processing example in which sounds are collected by microphones arranged to be adapted for the source separation and the separation results of the collected sounds are projected back to microphones arranged to be adapted for the DOA (or the source position) estimation.

The embodiment which executes the process of projecting the separation results obtained by the source separation process back to microphones in a particular arrangement will be described below as a fourth embodiment differing from the foregoing three embodiments.

A signal processing apparatus according to the fourth embodiment can be constituted by employing the signal processing apparatus 700 described above in the first embodiment with reference to FIG. 7. The signal processing apparatus according to the fourth embodiment includes, as microphones, a plurality of microphones 701 which are used to provide inputs for the source separation process, and one or more omnidirectional microphones 702 which are used as the projection-back targets.

The microphones 701 used to provide inputs for the source separation process have been described above as the directional microphones in the first embodiment. In the fourth embodiment, however, the microphones 701 used to provide inputs for the source separation process may be directional microphones or omnidirectional microphones. A practical arrangement of the microphones will be described later. The arrangement of the output device 709 also has an important meaning and it will be also described later.

Two arrangement examples of the microphones and the output device in the fourth embodiment will be described below with reference to FIGS. 21 and 22.

Figure 21:
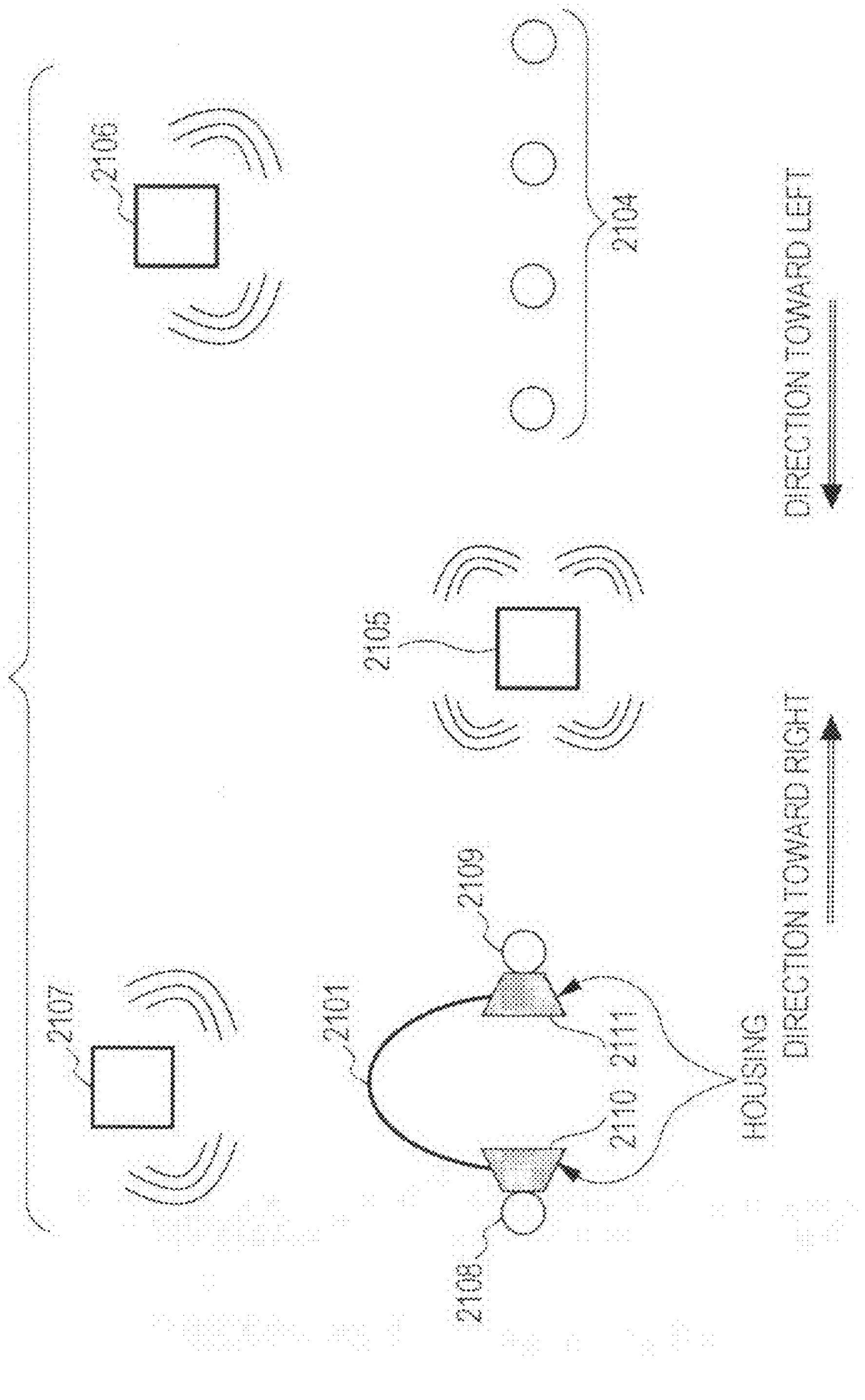
FIG. 21 illustrates a first arrangement example of microphones and an output device in a signal processing apparatus according to a fourth embodiment of the present invention.

FIG. 21 illustrates a first arrangement example of the microphones and the output device in the fourth embodiment. The first arrangement example of the microphones and the output device, illustrated in FIG. 21, represents the arrangement of the microphones and the output device, which is adapted for producing binaural signals corresponding to positions of both the user's ears through the source separation process and the projection-back process.

A headphone 2101 corresponds to the output device 709 in the signal processing apparatus illustrated in FIG. 7. Microphones 2108 and 2109 used as the projection-back targets are mounted at respective positions of speakers (housings) 2110 and 2111 which correspond to both ears portions of the headphone 2101. Microphones 2104 for the source separation, illustrated in FIG. 21, correspond to the microphones 701 for the source separation, illustrated in FIG. 7. The source separation microphones 2104 may be omnidirectional microphones or directional microphones, and they are installed in an arrangement suitable for separating sound sources in the relevant environment. In the configuration illustrated in FIG. 21, because there are three sound sources (i.e., a sound source 1 (denoted by 2105) to a source 3 (denoted by 2107)), at least three microphones are necessary for the source separation.

A processing sequence of the signal processing apparatus including the source separation microphones 2104 (=the source separation microphones 701 in FIG. 7) and the projection-back target microphones 2108 and 2109 (=the projection-back target microphones 702 in FIG. 7) is similar to that described above with reference to the flowchart of FIG. 17.

More specifically, AD conversion is performed on sound signals collected by the source separation microphones 2104 in step S101 in the flowchart of FIG. 17. Then, in step S102, the short-time Fourier transform is performed on each signal after the AD conversion for conversion to a signal in the time-frequency domain. The directivity forming process in next step S103 is a process that is necessary in the case where virtual directivity is formed by using a plurality of omnidirectional microphones, as described above with reference to FIG. 10. For example, in the case where a plurality of omnidirectional microphones are arranged as illustrated in FIG. 10, observation signals of virtual directional microphones are produced in accordance with the above-described formulae [9.1] to [9.4]. However, when the directional microphones are originally employed as in the case illustrated in FIG. 8, the directivity forming process of step S103 can be dispensed with.

In the source separation process of step S104, the ICA is performed on the observation signals in the time-frequency domain, which are obtained by the source separation microphones 2104, to obtain the separation results independent of one another. Practically, the source separation results are obtained through the processing in accordance with the flowchart of FIG. 19.

In step S105, the separation results obtained in step S104 are projected back to the predetermined microphone. In this example, the separation results are projected back to the projection-back target microphones 2108 and 2109 illustrated in FIG. 21. A practical sequence of the projection-back process is executed in accordance with the flowchart of FIG. 20.

When the projection-back process is executed, one channel corresponding to the particular sound source is selected from among the separation results (this process corresponds to step S403 in the flow of FIG. 20), and signals obtained by projecting the selected separation result to the projection-back target microphones 2108 and 2109 are produced (this process corresponds to step S404 in the flow of FIG. 20).

Further, in step S106 in the flow of FIG. 17, the signals after the projection-back are re-converted to waveforms through inverse Fourier transform. In step S107 in the flow of FIG. 17, the waveforms are replayed from the loudspeakers built in the headphone. In such a way, the separation results projected back to the two projection-back target microphones 2108 and 2109 are replayed respectively from the loudspeakers 2110 and 2111 of the headphone 2101.

Sound outputs from the loudspeakers 2110 and 2111 are controlled by the control module of the signal processing apparatus. In other words, the control module of the signal processing apparatus controls individual output devices (loudspeakers) in outputting sound data corresponding to the projection-back signals for the projection-back target microphones which are set at the positions of the output devices.

For example, by selecting one of the separation results before the projection-back, which corresponds to the sound source 1 (2105), projecting the selected separation result back to the projection-back target microphones 2108 and 2109, and replaying the projection-back results through the headphone 2101, the user bearing the headphone 2101 can hear sounds as if only the sound source 1 (2105) is active on the right side, in spite of that the three sound sources are active at the same time. Stated another way, by projecting the separation result back to the projection-back target microphones 2108 and 2109, binaural signals representing the sound source 1 (2105) as being located on the right side of the headphone 2101 can be produced in spite of that the sound source 1 (2105) is positioned on the left side of the source separation microphones 2104. In addition, for the projection-back process, the observation signals of the projection-back target microphones 2108 and 2109 are just necessary while position information of the headphone 2101 (or the projection-back target microphones 2108 and 2109) is not necessary.

Similarly, by selecting one channel corresponding to the sound source 2 (2106) or the sound source 3 (2107) in step S403 of the flowchart illustrated in FIG. 20, the user can hear sounds as if only one of those sound sources is active in its position. Further, when the user bearing the headphone 2101 moves from one place to another, the location provided by the separation result is also changed correspondingly.

Although the processing can also be executed with the related-art configuration in which the microphones adapted for the source separation and the microphones used as the projection-back targets are set to be the same, the processing with the related-art configuration has problems. When the microphones adapted for the source separation and the microphones used as the projection-back targets are set to be the same, the processing is executed as follows. The projection-back target microphones 2108 and 2109 illustrated in FIG. 21 are themselves set as the source separation microphones for the source separation process. Further, the source separation process is executed by using the results of collecting sounds by the source separation microphones, and the separation results are projected back to the projection-back target microphones 2108 and 2109.

However, when the above-described processing is executed, the following two problems arise.

(1) In the environment illustrated in FIG. 21, because there are three sound sources (i.e., the sound source (2105) to the sound source 3 (2107), the sound sources are not completely separated from one another when only two microphones are used.

(2) Because the projection-back target microphones 2108 and 2109 illustrated in FIG. 21 are positioned respectively close to the speakers 2110 and 2111 of the headphone 2101, there is a possibility that the microphones 2108 and 2109 may collect the sounds generated from the speakers 2110 and 2111. In such a case, sound sources increase in number and the assumption of independency is not held, thus resulting in deterioration of the separation accuracy.

The related-art method can also be alternatively practiced in such a configuration that the projection-back target microphones 2108 and 2109 illustrated in FIG. 21 are set as the microphones for the source separation and the source separation microphones 2104 illustrated in FIG. 21 are further utilized as the microphones for the source separation. That configuration can increase the accuracy of the source separation process because the source separation microphones are set in number larger than the number of sound sources (three). In one example, all of the six microphones in total are used. In another example, four microphones in total, i.e., the two microphones 2108 and 2109 and two of the source separation microphones 2104, are used.

With the alternative related-art method, however, the above-mentioned problem (2) is not overcome. In other words, there is also a possibility that the projection-back target microphones 2108 and 2109 illustrated in FIG. 21 may collect the sounds generated from the speakers 2110 and 2111 of the headphone 2101 and the separation accuracy deteriorates.

Further, when the user bearing the headphone 2101 moves, the microphones 2108 and 2109 mounted to the headphone may be positioned far away from the microphones 2104 in some cases. As the gap between the microphones used for the source separation increases, the spatial aliasing tends to occur at lower frequencies as well, which also results in deterioration of the separation accuracy. In addition, the configuration using the six microphones for the source separation necessitates a higher computational cost than that of the configuration using the four microphones. Namely, the computational cost of the former is;

$$(4/6)^2=2.25 \text{ times that of the latter.}$$

Thus, the computational cost increases and the processing efficiency reduces. In contrast, the embodiments of the present invention can solve all of the above-mentioned problems through the process of setting the projection-back target microphones and the source separation microphones as separate microphones, and projecting the separation results, which are produced based on signals obtained by the source separation microphones, back to the projection-back target microphones.

A second arrangement example of the microphones and the output device in the fourth embodiment will be described below with reference to FIGS. 22A and 22B. The configuration illustrated in FIGS. 22A and 22B represents an arrangement example for producing the separation results, which can provide the surround-sound effect, with the projection-back, and it is featured in positions of the projection-back target microphones and playback devices.

Figure 22B:
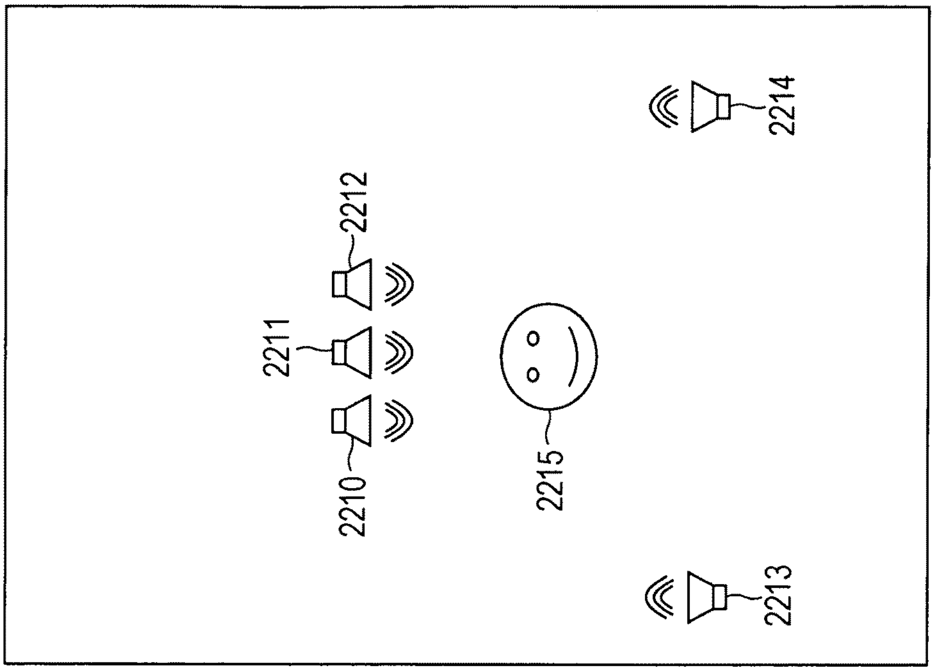
FIGS. 22A and 22B illustrate a second arrangement example of microphones and an output device in the signal processing apparatus, which are in different environments, according to the fourth embodiment of the present invention.
Figure 22A:
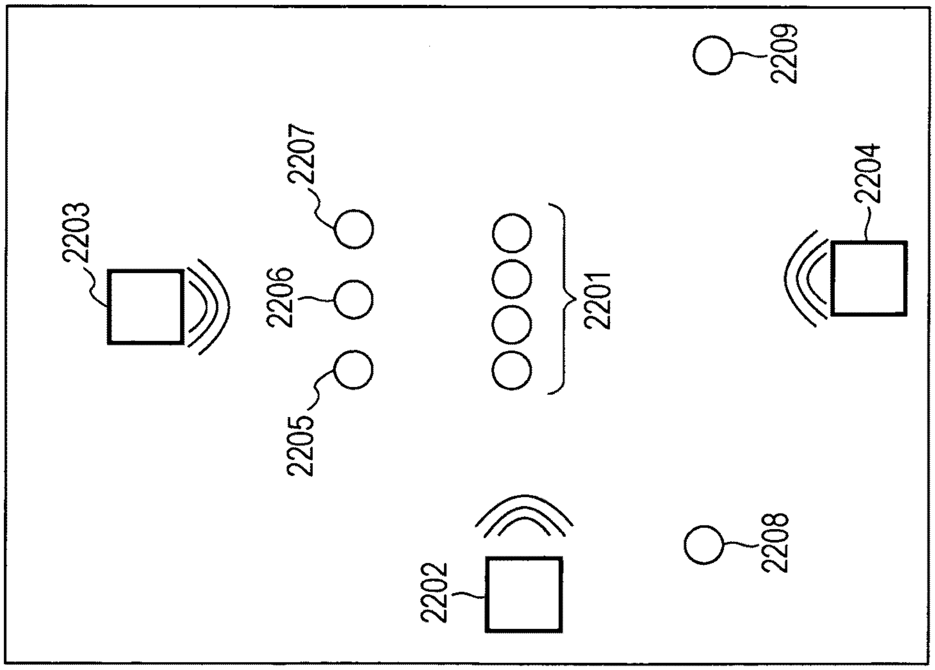

FIG. 22B represents an environment (reproducing environment) in which loudspeakers 2210 to 2214 are installed, and FIG. 22A represents an environment (sound collecting environment) in which three sound sources, i.e., a sound source 1 (2202) to a sound source 3 (2204), and microphones 2201 and 2205 to 2209 are installed. Those two environments differ from each other such that sounds output from the speakers 2210 to 2214 in the playback environment illustrated in FIG. 22B do not enter the microphones 2201 and 2205 to 2209 in the sound collecting environment illustrated in FIG. 22A.

The playback environment illustrated in FIG. 22B is first described. The playback speakers 2210 to 2214 are loudspeakers adapted for the surround-sound effect and are each arranged in a predetermined position. More specifically, the playback environment illustrated in FIG. 22B represents an environment in which speakers adapted for the 5.1-channel surround-sound effect are installed except for a sub-woofer.

The sound collecting environment illustrated in FIG. 22A is next described. The projection-back target microphones 2205 to 2209 are installed respectively corresponding to the playback speakers 2210 to 2214 in the playback environment illustrated in FIG. 22B. The source separation microphones 2201 are similar to the source separation microphones 2104 illustrated in FIG. 21, and they may be the directional microphones or the omnidirectional microphones. The number of microphones is preferably set to be larger than the number of sound sources in order to obtain sufficient separation performance.

The processing performed in the configuration of FIG. 22 is similar to that in the configuration of FIG. 21 and is executed in accordance with the flow of FIG. 17. The source separation process is executed in accordance with the flow of FIG. 19, and the projection-back process is executed in accordance with the flow of FIG. 20. In the channel selection process in step S403 in the flow of FIG. 20, one of the separation results, which corresponds to a particular sound source, is selected. In step S404, the selected separation result is projected back to the projection-back target microphones 2205 to 2209 illustrated in FIG. 22A.

By reproducing the respective projected-back signals from the reproducing speakers 2210 to 2214 in the reproducing environment illustrated in FIG. 22B, a listener 2215 can experience sounds as if only one source is active in the surroundings.

(8.3 Embodiment Employing a Plurality of Source Separation Systems (Fifth Embodiment))

While any of the embodiments described above includes one source separation system, a plurality of source separation systems may share common projection-back target microphones in another embodiment. The following description is made about, as an application of such a sharing manner, an embodiment which includes a plurality of source separation systems having different microphone arrangements.

Figure 23:
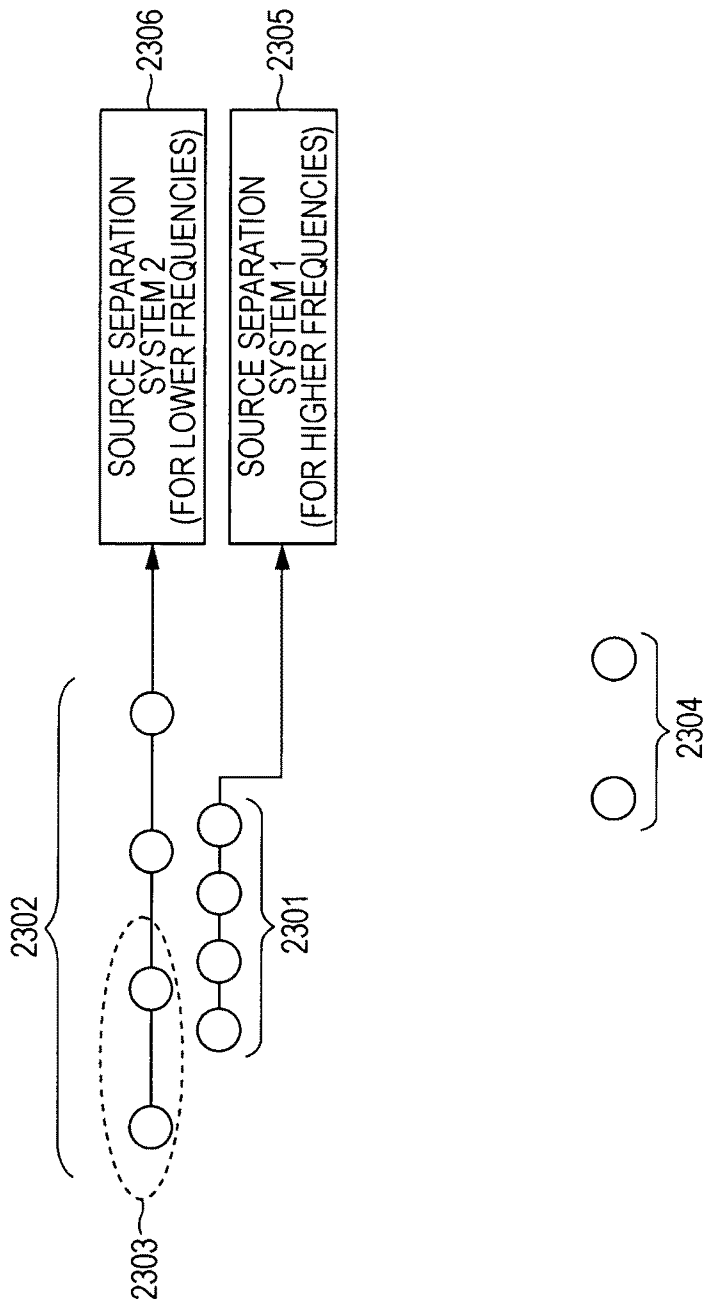
FIG. 23 illustrates the configuration of a signal processing apparatus including a plurality of source separation systems.

FIG. 23 illustrates the configuration of a signal processing apparatus including a plurality of source separation systems. The signal processing apparatus illustrated in FIG. 23 includes two source separation systems, i.e., a source separation system 1 (denoted by 2305) (for higher frequencies) and a source separation system 2 (denoted by 2306) (for lower frequencies).

The two source separation systems, i.e., the source separation system 1 (2305) (for higher frequencies) and the source separation system 2 (2306) (for lower frequencies), include microphones installed in different arrangements.

More specifically, there are two groups of microphones for the source separation. Source separation microphones (at narrower intervals) 2301 belonging to one group and arranged at narrower intervals therebetween are connected to the source separation system 1 (2305) (for higher frequencies), and source separation microphones (at wider intervals) 2302 belonging to the other group and arranged at wider intervals therebetween are connected to the source separation system 2 (2306) (for lower frequencies).

The projection-back target microphones may be provided by setting some of the source separation microphones as projection-back target microphones (a) 2303 as illustrated in FIG. 23, or may be provided by using other independent projection-back target microphones (b) 2304.

A method of combining respective sets of separation results obtained with the two source separation systems 2305 and 2306 together, illustrated in FIG. 23, will be described below with reference to FIG. 24. A separation result spectrogram 2402 before the projection-back, which is produced by a higher-frequency source separation system 1 (2401) (corresponding to the source separation system 1 (2305) (for higher frequencies) illustrated in FIG. 23), is divided into two bands of lower frequencies and higher frequencies, and only higher-frequency data 2403, i.e., a higher-frequency partial spectrogram, is selectively extracted.

On the other hand, a separation result spectrogram 2406 produced by a lower-frequency source separation system 2 (2405) (corresponding to the source separation system 2 (2306) (for lower frequencies) illustrated in FIG. 23), is also divided into two bands of lower frequencies and higher frequencies, and only lower-frequency data 2407, i.e., a lower-frequency partial spectrogram, is selectively extracted.

The projection-back is performed for each of the extracted partial spectrograms in accordance with the method described above in the embodiments of the present invention. By combining two spectrograms 2404 and 2408 after the projection-back together, an all-band spectrogram 2409 can be obtained.

The signal processing apparatus described above with reference to FIGS. 23 and 24 includes a plurality of source separation systems in which their source separation modules receive signals taken by respective sets of source separation microphones differing from each other in at least parts thereof, thus producing respective sets of separation signals. Their signal projection-back modules receive the respective sets of separation signals produced by the plurality of source separation systems and the observation signals of the projection-back target microphones to produce plural sets of projection-back signals (projection-back results 2404 and 2408 indicated in FIG. 24) corresponding to the source separation systems, respectively, and further combine the plural sets of produced projection-back signals together to produce final projection-back signals (projection-back result 2409 indicated in FIG. 24) corresponding to the projection-back target microphones.

The reason why the projection-back is necessary in the above-described processing will be described below.

There is a related-art configuration including a plurality of source separation systems which have different microphone arrangements. For example, Japanese Unexamined Patent Application Publication No. 2003-263189 discloses a technique of executing the source separation process at lower frequencies by utilizing sound signals collected by a plurality of microphones which are arranged in an array with wider intervals set between the microphones, executing the source separation process at higher frequencies by utilizing sound signals collected by a plurality of microphones which are arranged in an array with narrower intervals set between the microphones, and finally combining respective separation results at both the higher and lower frequencies together. Also, Japanese Patent Application No. 2008-92363, which has been previously filed by the same applicant as in this application, discloses a technique of, when a plurality of source separation systems are operated at the same time, making output channels correspond to one another (such as outputting signals attributable to the same sound source as respective outputs Y1 of the plurality of source separation systems).

In those related-art techniques, however, the projection-back to microphones used for the source separation is performed as a method of rescaling the separation results. Therefore, a phase gap is present between the separation result at lower frequencies obtained by the microphones, which are arranged at the wider intervals, and the separation result at higher frequencies obtained by the microphones, which are arranged at the narrower intervals. The phase gap causes a serious problem in producing the separation results with the sense of sound localization. Further, microphones have individual differences in their gains even though the microphones are the same model. Thus, there is a possibility that, if input gains differ between the microphones arranged at the wider intervals and the microphones arranged at the narrower intervals, finally combined signals are heard as unnatural sounds.

Figure 24:
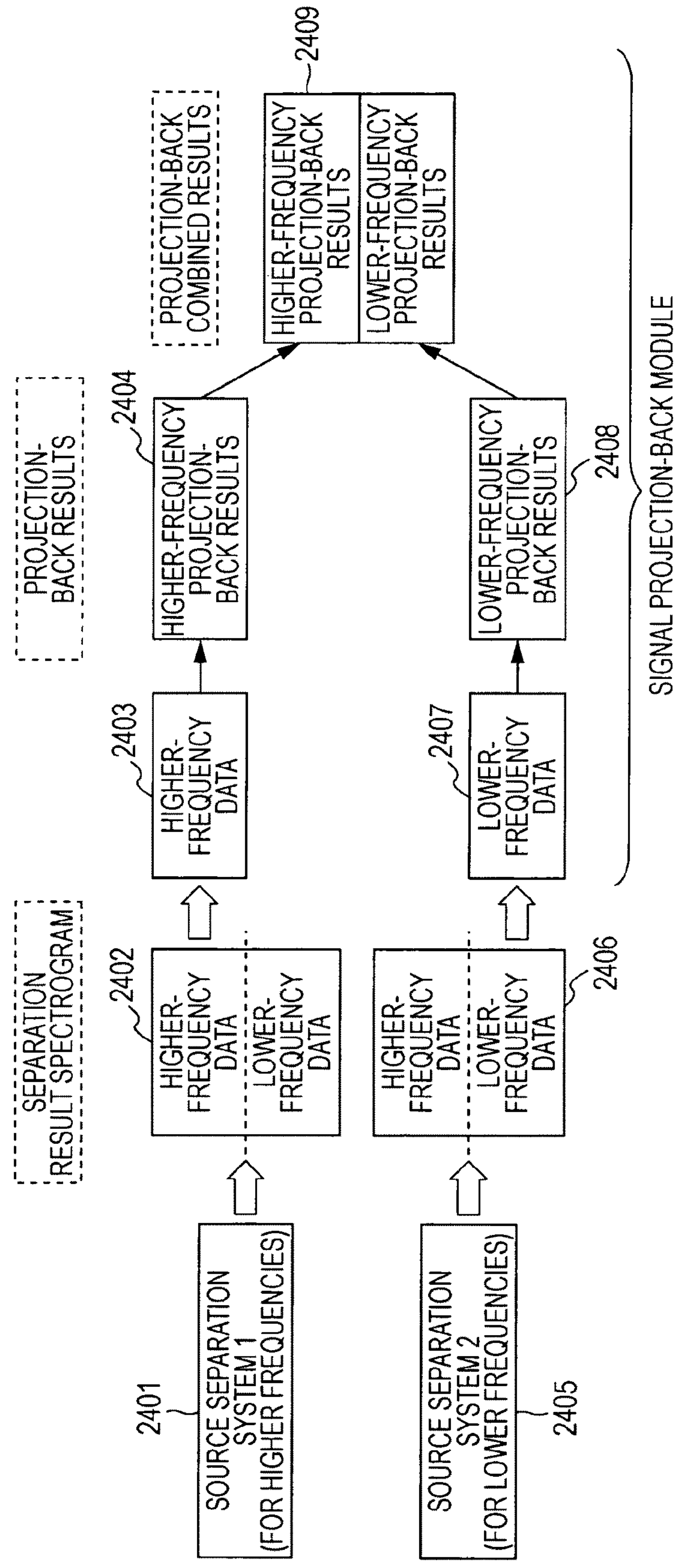
FIG. 24 illustrates a processing example in the signal processing apparatus including the plurality of source separation systems.

In contrast, according to the embodiment of the present invention illustrated in FIGS. 23 and 24, the plurality of source separation systems operate so as to project the respective sets of separation results back to the common projection-back target microphones and then combine the projection-back results together. In the configuration illustrated in FIG. 23, for example, the projection-back target microphones (a) 2303 or the projection-back target microphones (b) 2304 are the projection-back targets, which are common to the plurality of source separation systems 2304 and 2305. As a result, the problem of the phase gap and the problem of the individual differences in microphone gains can be both solved, and the separation results can be produced with the sense of sound localization.

[9. Summary of Features and Advantages of the Signal Processing Apparatuses According to the Embodiments of the Present Invention]

In the signal processing apparatuses according to the embodiments of the present invention, as described above, the source separation microphones and the projection-back target microphones are set independently of each other. In other words, the projection-back target microphones can be set as microphones differing from the source separation microphones.

The source separation process is executed based on data collected by the source separation microphones to obtain the separation results, and the obtained separation results are projected back to the projection-back target microphones. The projection-back process is executed by using the cross-covariance matrices between the observation signals obtained by the projection-back target microphones and the separation results, and the covariance matrices between the separation results themselves.

The signal processing apparatuses according to the embodiments of the present invention have, for example, the following advantages.

1. The problem of frequency dependency of directional microphones can be solved by executing the source separation on signals observed by the directional microphones (or virtual directional microphones each of which is formed by a plurality of omnidirectional microphones) and projecting the separation results back to omnidirectional microphones.

2. The contradictory dilemma caused in the microphone arrangement between the source separation and the DOA (or source position) estimation can be overcome by performing the source separation on signals observed by the microphones which are arranged to be adapted for the source separation, and projecting the separation results back to the microphones which are arranged to be adapted for the DOA estimation (or the source position estimation).

3. By arranging the projection-back target microphones similarly to the playback speakers and projecting the separation results back to those microphones, it is possible to obtain the separation results capable of providing the sound location and to overcome the problem caused when the projection-back target microphones are used as the microphones for the source separation.

4. By preparing common projection-back target microphones shared by a plurality of source separation systems and projecting the separation results to those common microphones, the problems attributable to the phase difference gap and the individual differences in the microphone gain can be overcome which are caused when the separation results are projected back to the microphones for the source separation.

The present invention has been described in detail above in connection with the particular embodiments. It is, however, apparent that the embodiments can be modified into or replaced with other suitable forms by those skilled in the art without departing from the scope of the present invention. In other words, the foregoing embodiments of the present invention have been disclosed by way of illustrative examples and are not to be considered in a limiting way. The gist of the present invention is to be determined by referring to the claims.

The various series of processes described above in this specification can be executed with hardware, software, or a combined configuration of hardware and software. When software is used to execute the processes, the processes can be executed by installing programs, which record relevant processing sequences, in a memory within a computer built in dedicated hardware, or by installing the programs in a universal computer which can execute various kinds of processes. For example, the programs can be previously recorded on a recording medium. In addition to installing the programs in a computer from the recording medium, it is also possible to receive the programs via a network, such as a LAN (Local Area Network) or the Internet, and to install the received programs in a recording medium, such as a built-in hard disk.

Be it noted that the various types of processes described in this specification may be executed not only in a time-serial manner according to the described sequences, but also in parallel or in separate ways depending on processing abilities of apparatuses used to execute the processes or in response to the necessity. Also, the term "system" used in this specification implies a logical assembly of plural apparatuses and is not limited to such a configuration that apparatuses having respective functions are installed in the same housing.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus comprising:

a source separation module for producing respective separation signals corresponding to a plurality of sound sources by applying ICA (Independent Component Analysis) to observation signals produced based on mixture signals from the sound sources, which are taken by microphones for the source separation, to thereby execute a separation process of the mixture signals; and a signal projection-back module for receiving observation signals of projection-back target microphones and the separation signals produced by the source separation module, and for producing projection-back signals as respective separation signals corresponding to the sound sources, which are to be taken by the projection-back target microphones, wherein the signal projection-back module produces the projection-back signals by receiving the observation signals of the projection-back target microphones which differ from the source separation microphones.

2. The signal processing apparatus according to claim 1, wherein the source separation module executes the ICA on the observation signals, which are obtained by converting the signals taken by the microphones for the source separation to the time-frequency domain, to thereby produce respective separation signals in the time-frequency domain corresponding to the sound sources, and wherein the signal projection-back module calculates the projection-back signals by calculating projection-back coefficients which minimize an error between the total sum of respective projection-back signals corresponding to each of the sound sources, which are calculated by multiplying the separation signals in the time-frequency domain by the projection-back coefficients, and the individual observation signals of the projection-back target microphones, and by multiplying the separation signals by the calculated projection-back coefficients.

3. The signal processing apparatus according to claim 2, wherein the signal projection-back module employs the least squares approximation in a process of calculating the projection-back coefficients which minimize the error.

4. The signal processing apparatus according to claim 1, wherein the source separation module receives the signals taken by the source separation microphones which are constituted by a plurality of directional microphones, and executes a process of producing the respective separation signals corresponding to the sound sources, and wherein the signal projection-back module receives the observation signals of the projection-back target microphones which are omnidirectional microphones and the separation signals produced by the source separation module, and produces the projection-back signals for the projection-back target microphones which are omnidirectional microphones.

5. The signal processing apparatus according to claim 1, further comprising a directivity forming module for receiving the signals taken by the source separation microphones which are constituted by a plurality of omnidirectional microphones, and for producing an output signal of a virtual directional microphone by delaying a phase of one of paired microphones, which are provided by two among the plurality of omnidirectional microphones, depending on a distance between the paired microphones, wherein the source separation module receives the output signal produced by the directivity forming module and produces the separation signals.

6. The signal processing apparatus according to claim 1, further comprising a direction-of-arrival estimation module for receiving the projection-back signals produced by the signal projection-back module, and for executing a process of calculating a direction of arrival based on a phase difference between the projection-back signals for the plural projection-back target microphones at different positions.

7. The signal processing apparatus according to claim 1, further comprising a source position estimation module for receiving the projection-back signals produced by the signal projection-back module, executing a process of calculating a direction of arrival based on a phase difference between the projection-back signals for the plural projection-back target microphones at different positions, and further calculating a source position based on combined data of the directions of arrival, which are calculated from the projection-back signals for the plural projection-back target microphones at the different positions.

8. The signal processing apparatus according to claim 2, further comprising a direction-of-arrival estimation module for receiving the projection-back coefficients produced by the signal projection-back module, and for executing calculations employing the received projection-back coefficients, to thereby execute a process of calculating a direction of arrival or a source position.

9. The signal processing apparatus according to claim 1, further comprising an output device set at a position corresponding to the projection-back target microphones; and a control module for executing control to output the projection-back signals for the projection-back target microphones which correspond to the position of the output device.

10. The signal processing apparatus according to claim 1, wherein the source separation module includes a plurality of source separation modules for receiving signals taken by respective sets of source separation microphones, which differ from one another at least in parts thereof, and for producing respective sets of separation signals, and wherein the signal projection-back module receives the respective sets of separation signals produced by the plurality of the source separation modules and the observation signals of the projection-back target microphones, produces plural sets of projection-back signals corresponding to the source separation modules, and combines the produced plural sets of projection-back signals together, to thereby produce final projection-back signals for the projection-back target microphones.

11. A signal processing method executed in a signal processing apparatus, the method comprising the steps of:

causing a source separation module to produce respective separation signals corresponding to a plurality of sound sources by applying an ICA (Independent Component Analysis) to observation signals produced based on mixture signals from the sound sources, which are taken by source separation microphones, to thereby execute a separation process of the mixture signals; and causing a signal projection-back module to receive observation signals of projection-back target microphones and the separation signals produced by the source separation module, and to produce projection-back signals as respective separation signals corresponding to the sound sources, which are to be taken by the projection-back target microphones, wherein the projection-back signals are produced by receiving the observation signals of the projection-back target microphones which differ from the source separation microphones.

12. A non-transitory computer readable recording medium having stored thereon a program for executing signal processing in a signal processing apparatus, the program comprising the steps of:

causing a source separation module to produce respective separation signals corresponding to a plurality of sound sources by applying an ICA (Independent Component Analysis) to observation signals produced based on mixture signals from the sound sources, which are taken by source separation microphones, to thereby execute a separation process of the mixture signals; and causing a signal projection-back module to receive observation signals of projection-back target microphones and the separation signals produced by the source separation module, and to produce projection-back signals as respective separation signals corresponding to the sound sources, which are to be taken by the projection-back target microphones, wherein the projection-back signals are produced by receiving the observation signals of the projection-back target microphones which differ from the source separation microphones.

* * * * *